US011178662B2

(12) United States Patent
Chen et al.

(10) Patent No.: US 11,178,662 B2
(45) Date of Patent: Nov. 16, 2021

(54) NETWORK TOPOLOGY INITIALIZATION PROTOCOL FOR WIRELESS MESH NETWORK

(71) Applicant: Samsung Electronics Co., Ltd, Suwon-si (KR)

(72) Inventors: Hao Chen, Allen, TX (US); Wenxun Qiu, Allen, TX (US); Jianhua Mo, Garland, TX (US); Prasad P. Netalkar, Ozone Park, NY (US); Boon Loong Ng, Plano, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 114 days.

(21) Appl. No.: 16/181,272

(22) Filed: Nov. 5, 2018

(65) Prior Publication Data
US 2019/0141708 A1 May 9, 2019

Related U.S. Application Data

(60) Provisional application No. 62/582,677, filed on Nov. 7, 2017, provisional application No. 62/623,741, filed
(Continued)

(51) Int. Cl.
*H04W 72/04* (2009.01)
*H04L 12/24* (2006.01)
(Continued)

(52) U.S. Cl.
CPC ......... *H04W 72/0453* (2013.01); *H04L 41/12* (2013.01); *H04W 40/00* (2013.01); *H04W 84/18* (2013.01)

(58) Field of Classification Search
CPC .. H04L 41/12; H04W 40/00; H04W 72/0453; H04W 84/18
See application file for complete search history.

(56) References Cited

U.S. PATENT DOCUMENTS

2007/0189191 A1  8/2007  Ades
2008/0232256 A1  9/2008  Douglas et al.
(Continued)

FOREIGN PATENT DOCUMENTS

WO   2006/099023 A2   9/2006

OTHER PUBLICATIONS

International Search Report dated Jan. 21, 2020 in connection with International Patent Application No. PCT/KR2019/013213, 4 pages.
(Continued)

*Primary Examiner* — Elton Williams

(57) ABSTRACT

A method of a network entity for communicating with a mesh network is provided. The method comprises receiving, from a communication node in the mesh network, information including a network topology of the mesh network and an angle separation of antenna panels of a plurality of communication nodes in the mesh network; identifying a value associated with a number of links of each communication node of the plurality of communication nodes in the mesh network; determining whether a number of available channels is greater than or equal to the value plus one; identifying at least one potential connection of the plurality of communication nodes based on a threshold and the network topology of the mesh network when the number of available channels is less than the value plus one; and transmitting, to the communication node in the mesh network, a channel allocation decision based on the at least one potential connection of the communication node.

20 Claims, 54 Drawing Sheets

Related U.S. Application Data on Jan. 30, 2018, provisional application No. 62/743,324, filed on Oct. 9, 2018.

(51) Int. Cl.
*H04W 40/00* (2009.01)
*H04W 84/18* (2009.01)

(56) References Cited

U.S. PATENT DOCUMENTS

| | | | |
|---|---|---|---|
| 2010/0260118 A1 | 10/2010 | Taoka et al. | |
| 2014/0068059 A1* | 3/2014 | Cole | H04L 43/10 709/224 |
| 2016/0029403 A1* | 1/2016 | Roy | H04W 72/0406 370/336 |
| 2016/0192403 A1* | 6/2016 | Gupta | H04W 8/005 455/411 |
| 2018/0227243 A1* | 8/2018 | Zhang | H04L 43/0852 |
| 2018/0285478 A1* | 10/2018 | Wright | G06F 16/9024 |

OTHER PUBLICATIONS

Written Opinion of the International Searching Authority dated Jan. 21, 2020 in connection with International Patent Application No. PCT/KR2019/013213, 4 pages.
Land, A. et al., "An Automatic Method of Solving Discrete Programming Problems," Econometrica, vol. 28, No. 3, Jul. 1960, pp. 497-520.
Raman, B., et al., "Design and Evaluation of a New MAC Protocol for Long-Distance 802.11 Mesh Networks," MobiCom '05, Cologne, Germany, Aug. 28-Sep. 2, 2005, 14 pages.
Scheinerman, E., "A Simple Graph Type for Julia," 2018 GitHub, Inc., 12 pages.
"Vizing's Theorem," Wikipedia, May 10, 2018, 5 pages.
"3rd Generation Partnership Project; Technical Specification Group Radio Access Network; Evolved Universal Terrestrial Radio Access (E-UTRA); Physical Channels and Modulation (Release 12)," 3GPP TS 36.211 V12.3.0, Sep. 2014, 124 pages.
"3rd Generation Partnership Project; Technical Specification Group Radio Access Network; Evolved Universal Terrestrial Radio Access (E-UTRA); Multiplexing and Channel Coding (Release 12)," 3GPP TS 36.212 V12.2.0, Sep. 2014, 89 pages.
"LTE; Evolved Universal Terrestrial Radio Access (E-UTRA); Physical Layer Procedures (3GPP TS 36.213 version 12.30 Rel;ease 12)," ETSI TS 136 213 V12.3.0, Oct. 2014, 214 pages.
"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331 V12.3.0, Sep. 2014, 378 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description Stage 2 (Release 15)," 3GPP TS 36.300 V15.3.0, Sep. 2018, 358 pages.

* cited by examiner

NETWORK TOPOLOGY INITIALIZATION PROTOCOL FOR WIRELESS MESH NETWORK

CROSS-REFERENCE TO RELATED APPLICATION(S) AND CLAIM OF PRIORITY

The present application claims priority to: U.S. Provisional Patent Application Ser. No. 62/582,677, filed on Nov. 7, 2017; U.S. Provisional Patent Application Ser. No. 62/623,741, filed on Jan. 30, 2018; and U.S. Provisional Patent Application Ser. No. 62/743,324, filed on Oct. 9, 2018. The content of the above-identified patent documents are incorporated herein by reference.

TECHNICAL FIELD

The present application relates generally to network topology initialization protocol. More specifically, this disclosure relates to network topology initialization protocol for wireless mesh network.

BACKGROUND

E-UTRAN supports relaying operation using a relay node (RN) or relay base station (BS) wirelessly connected to an eNB serving the RN, called donor eNB (DeNB) or donor BS. For next generation-radio access network (NG-RAN), a wireless backhaul link or a network support is expected to be a part of the advanced LTE specification of the new radio (NR) standards. The operating frequency band for the wireless backhaul link or the network can be in ultra high frequency (UHF) (300 MHz-3 GHz), super high frequency (SHF) (3 GHz-30 GHz) or Extremely high frequency (EHF) (30-300 GHz). The wireless backhaul link or the network can be based on radio technology such as IEEE 802.11ac, 802.11ax, 802.11ad, and/or 802.11 ay.

SUMMARY

Embodiments of the present disclosure provide a network topology initialization protocol for wireless mesh network.

In one embodiment, a network entity for communicating with a mesh network is provided. The network entity comprises a transceiver configured to receive, from a communication node in the mesh network, information including a network topology of the mesh network and an angle separation of antenna panels of a plurality of communication nodes in the mesh network. The network entity further comprises a processor operably connected to the transceiver, the processor configured to identify a value associated with a number of links of each communication node of the plurality of communication nodes in the mesh network; determine whether a number of available channels is greater than or equal to the value plus one; and identify at least one potential connection of the plurality of communication nodes based on a threshold and the network topology of the mesh network when the number of available channels is less than the value plus one. The transceiver is further configured to transmit, to the communication node in the mesh network, a channel allocation decision based on the at least one potential connection of the communication node.

In another embodiment, a communication node of a mesh network is provided. The communication node comprises a transceiver configured to transmit, to a network entity, information including a network topology of the mesh network and an angle separation of antenna panels of a plurality of communication nodes in the mesh network, and receive, from the network entity, a channel allocation decision based on at least one potential connection of the communication node. By the network node, the channel allocation decision is determined based on whether a number of available channels is greater than or equal to a value plus one; the at least one potential connection of the plurality of communication nodes is identified based on a threshold and the network topology of the mesh network when the number of available channels is less than the value plus one; and the value associated with a number of links of each communication node of the plurality of communication nodes in the mesh network is identified.

In yet another embodiment, a method of a network entity for communicating with a mesh network is provided. The method comprises receiving, from a communication node in the mesh network, information including a network topology of the mesh network and an angle separation of antenna panels of a plurality of communication nodes in the mesh network; identifying a value associated with a number of links of each communication node of the plurality of communication nodes in the mesh network; determining whether a number of available channels is greater than or equal to the value plus one; identifying at least one potential connection of the plurality of communication nodes based on a threshold and the network topology of the mesh network when the number of available channels is less than the value plus one; and transmitting, to the communication node in the mesh network, a channel allocation decision based on the at least one potential connection of the communication node.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 51D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.212 v12.2.0, "E-UTRA, Multiplexing and Channel coding;" 3GPP TS 36.213 v12.3.0, "E-UTRA, Physical Layer Procedures;" 3GPP TS 36.331 v12.3.0, "E-UTRA, Radio Resource Control (RRC) Protocol Specification;" and 3GPP TS 36.300 v15.3.0, "E-UTRA and E-UTRAN, Overall description, Stage 2."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD- MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
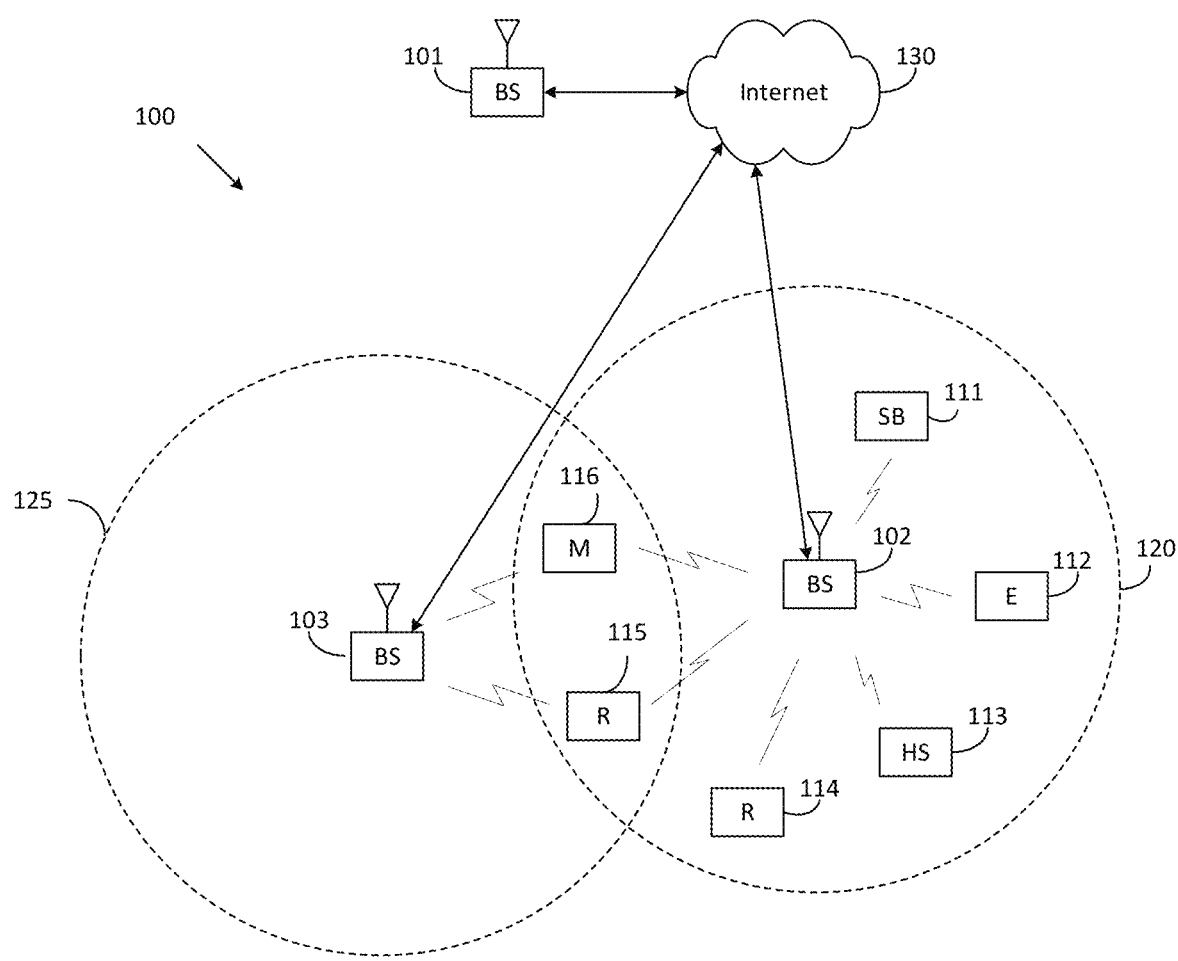
FIG. 1 illustrates an example wireless network according to embodiments of the present disclosure.
Figure 2:
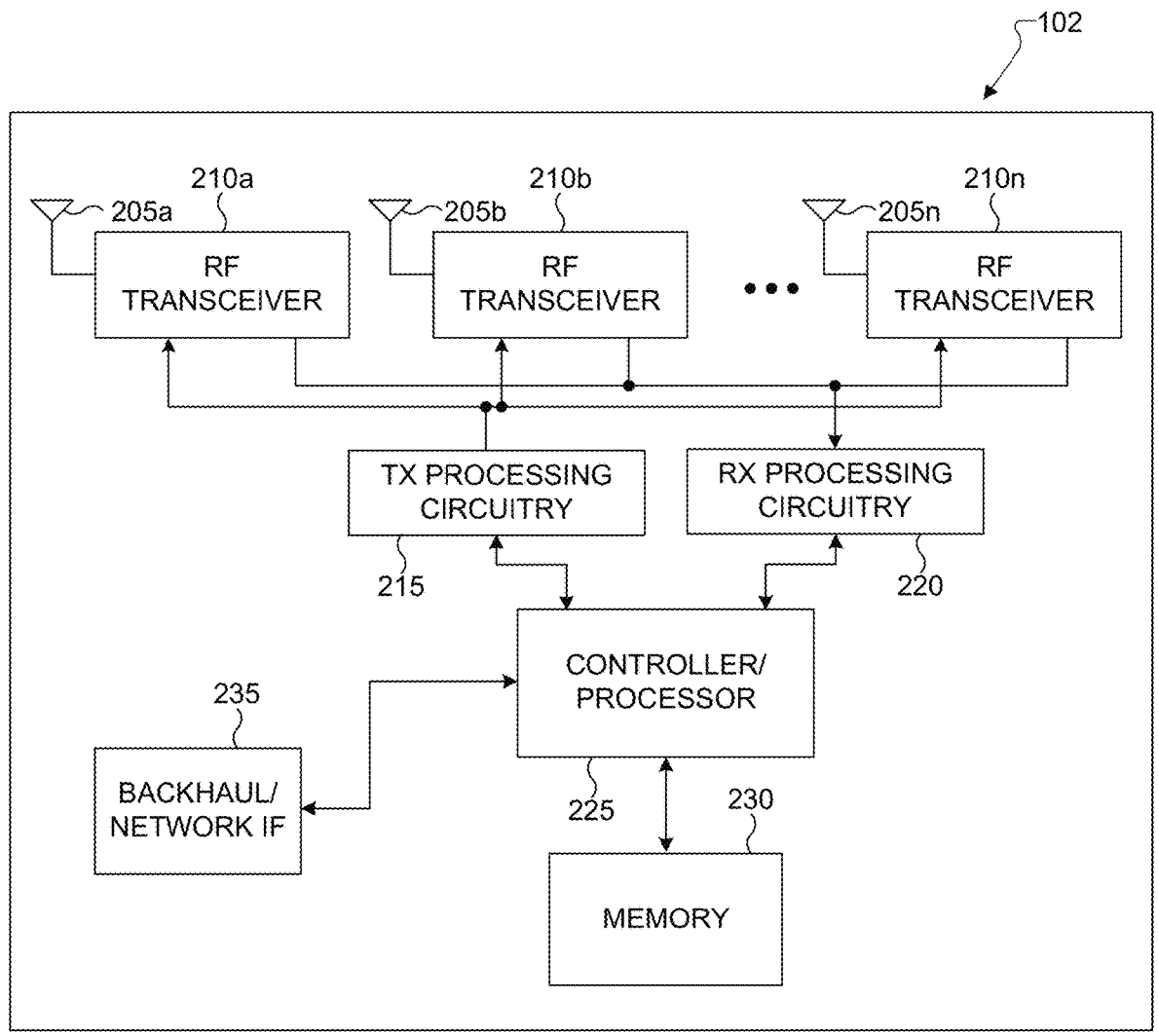
FIG. 2 illustrates an example eNB according to embodiments of the present disclosure.
Figure 3:
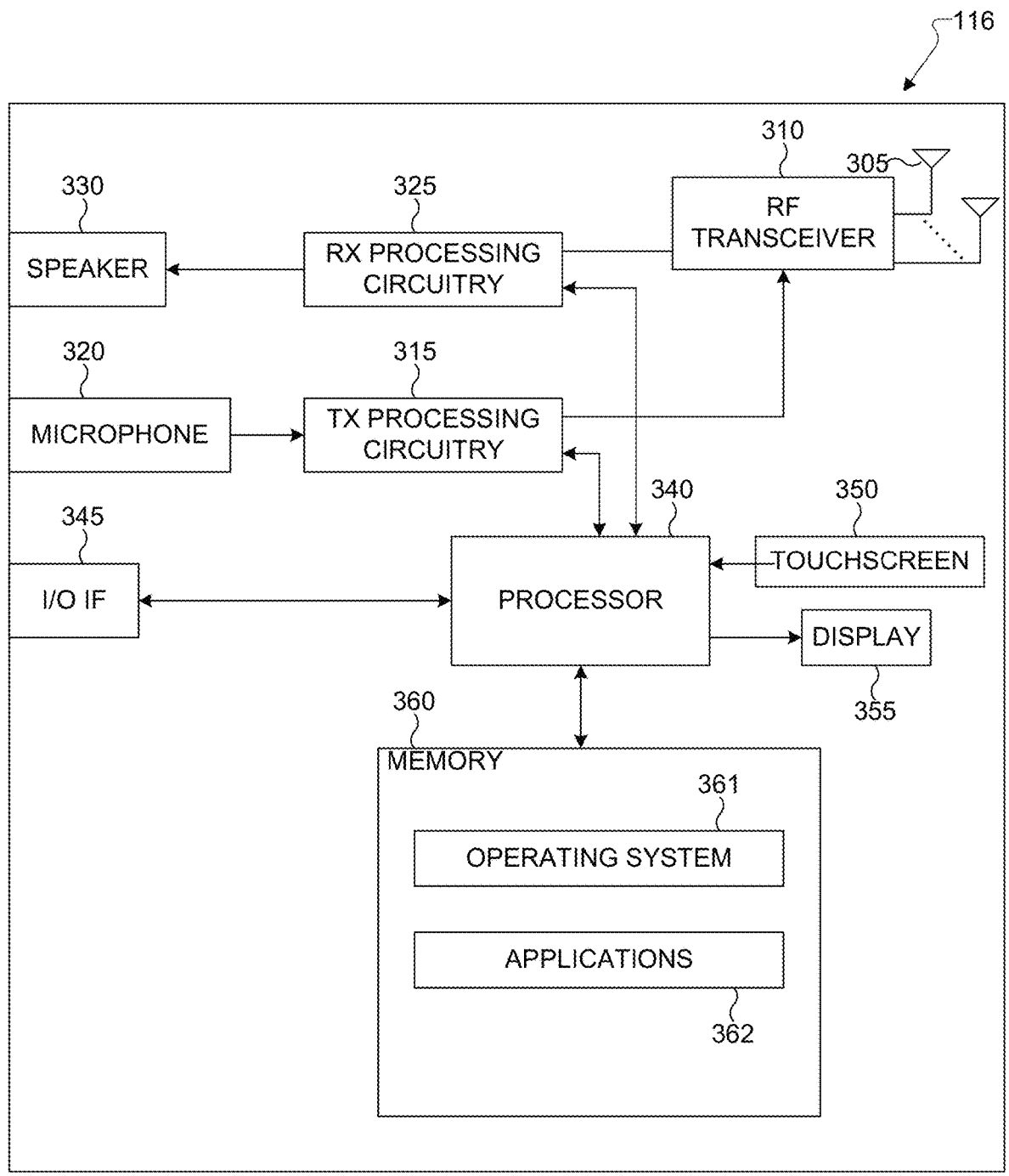
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of UEs within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient network topology initialization protocol in a wireless communication system. In certain embodiments, and one or more of the eNBs 101-103 includes circuitry, programing, or a combination thereof, for efficient network topology initialization procedures in a wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or 1F signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on PUCCH. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
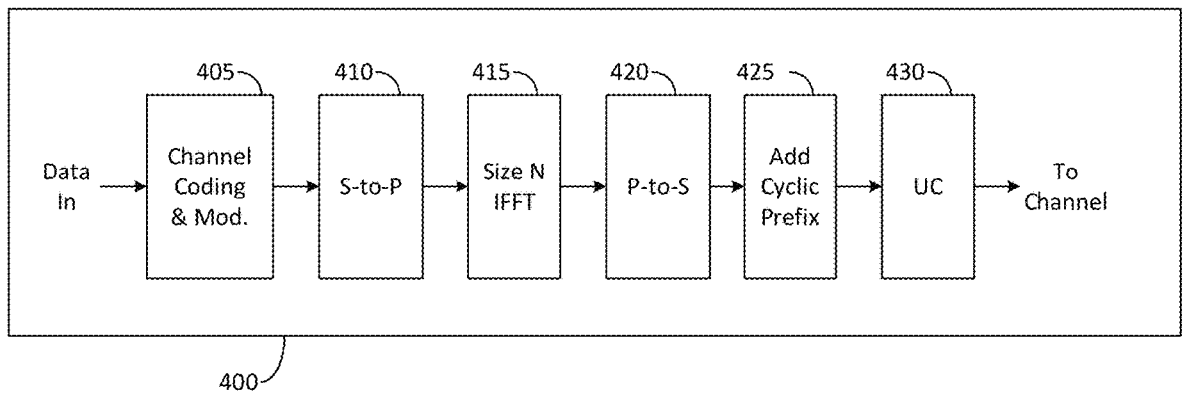
FIG. 4A illustrates a high-level diagram of an orthogonal frequency division multiple access transmit path according to embodiments of the present disclosure.
Figure 4B:
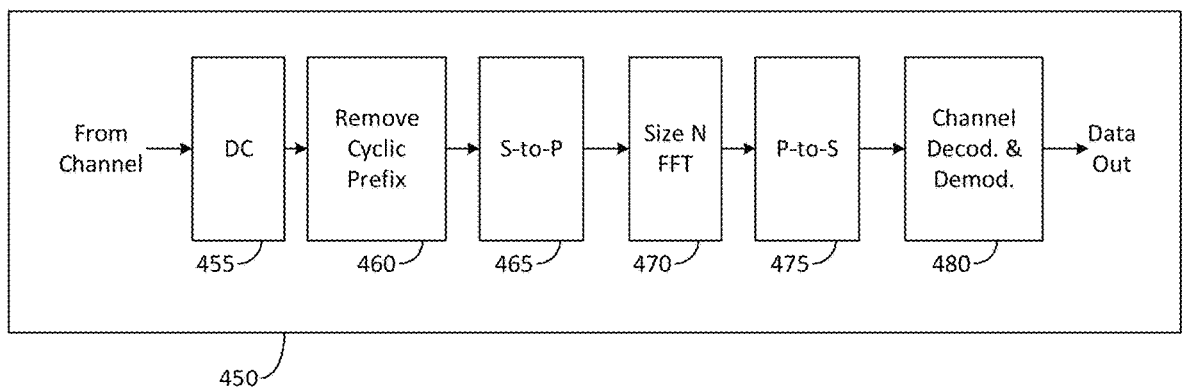
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

A communication system includes a downlink (DL) that conveys signals from transmission points such as base stations (BSs) or eNodeBs to user equipments (UEs) and an uplink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology.

Figure 5:
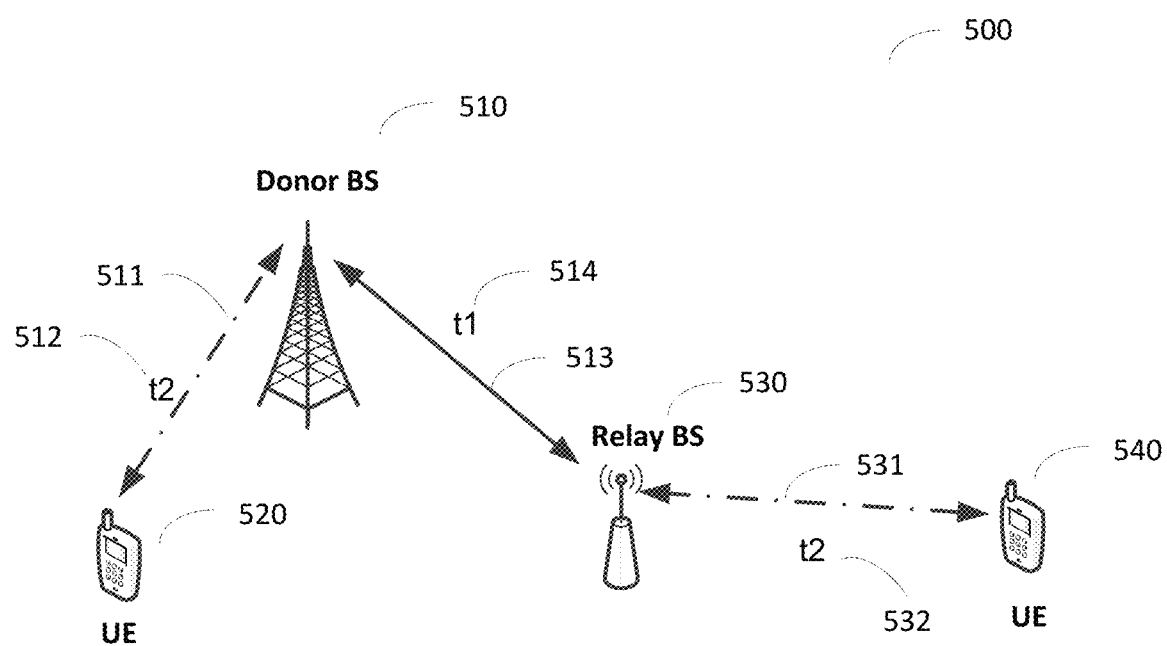
FIG. 5 illustrates a wireless network with relay BS according to embodiments of the present disclosure.

FIG. 5 illustrates a wireless network 500 with relay BS according to embodiments of the present disclosure. The embodiment of the wireless network 500 illustrated in FIG. 5 is for illustration only. FIG. 5 does not limit the scope of this disclosure.

Referring to FIG. 5, a RN 530 is wirelessly connect to an eNB serving the RN, called donor eNB (DeNB) or donor BS 510, via the Un interface 513, which is also be referred to as the backhaul for the RN. The RN supports the eNB functionality, i.e. it terminates the radio protocols of the E-UTRA radio interface, and the S1 and X2 interfaces. In addition to the eNB functionality, the RN also supports a subset of the UE functionality, e.g. physical layer, layer-2, RRC, and NAS functionality, in order to wirelessly connect to the DeNB. A UE can be served directly by the DeNB, such as UE 520, or it can be served by a RN, such as a UE 540. For in-band relay operation, the wireless backhaul link (UN interface 513) for the RN and the wireless access links 511 and 53 for the DeNB and the RN share the same frequency band.

Figure 6:
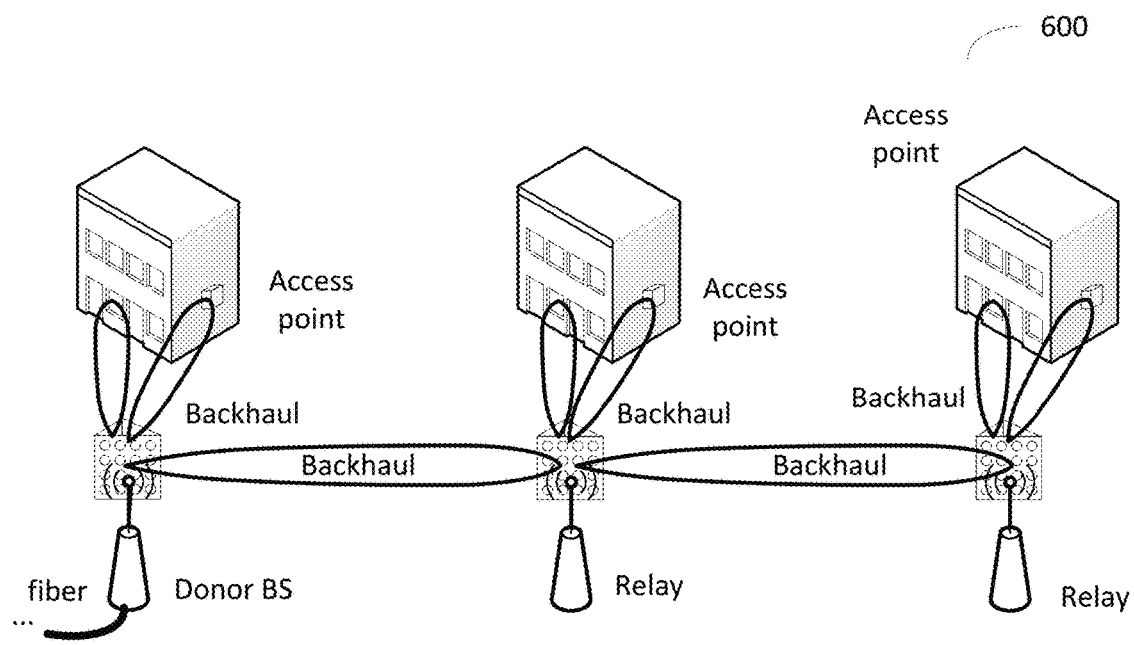
FIG. 6 illustrates a multi-hop backhaul network according to embodiments of the present disclosure.

FIG. 6 illustrates a multi-hop backhaul network 600 according to embodiments of the present disclosure. The embodiment of the multi-hop backhaul network 600 illustrated in FIG. 6 is for illustration only. FIG. 6 does not limit the scope of this disclosure.

With a network of one or more donor BSs and one or more relays, a wireless multi-hop or a mesh network can be formed. In one example use case, the mesh backhaul network transports traffic from fiber gateway to fixed access points (distribution point to local network in building/home) as shown in FIG. 6.

Figure 7:
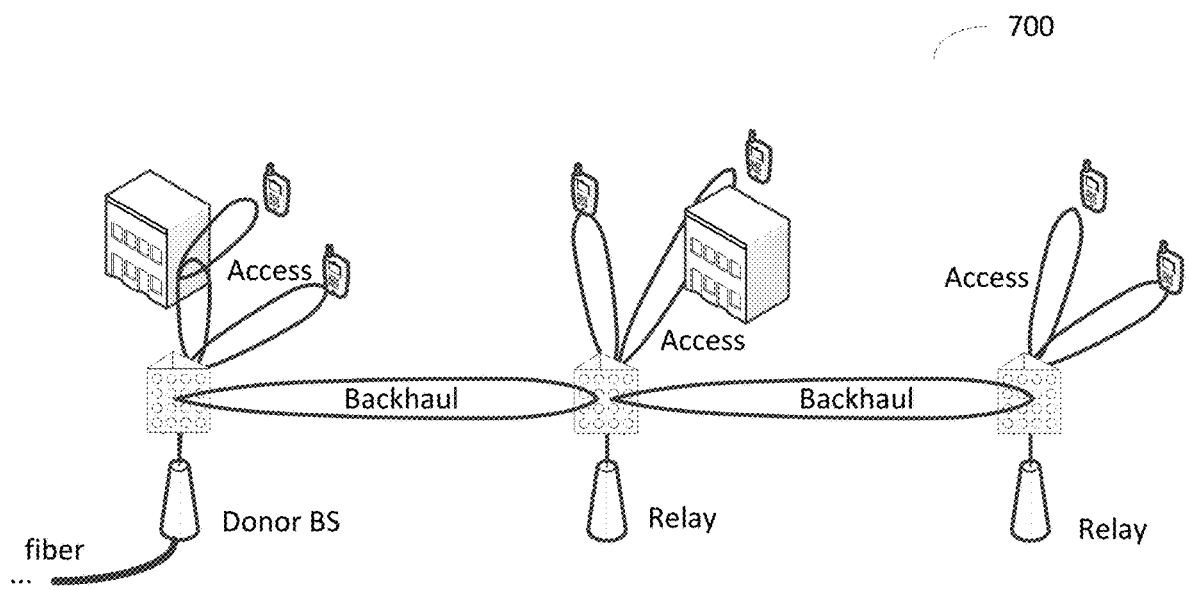
FIG. 7 illustrates a multi-hop backhaul and access network according to embodiments of the present disclosure.

FIG. 7 illustrates a multi-hop backhaul and access network 700 according to embodiments of the present disclosure. The embodiment of the multi-hop backhaul and access network 700 illustrated in FIG. 7 is for illustration only. FIG. 7 does not limit the scope of this disclosure.

In another example use case, the relay nodes serve as mesh network node for backhaul as well as access point to mobile users as shown in FIG. 7. The access frequency and backhaul frequency may or may not be the same.

Describe construction and operation of the disclosure, focusing on the key features identified in item 8(f). Please provide at least one diagram of the disclosure with the key features clearly labeled. For algorithm or process-related disclosures, also provide at least one flow chart (or pseudo code). Additional materials, such as reports, emails, specifications, schematics, models or test results may be attached but be sure to reference them in this section.

To deploy a wireless network of donor BSs and relay nodes, there is a need for a protocol to initialize or set up a network connecting the one or more donor BSs and the one or more relay nodes. The goal of the protocol is to perform network node discovery and determine if one or more links may be established between any pair of discovered nodes. There can be more than one link established between two nodes e.g. if each node is equipped with multiple panels or sectors, where each panel or sector can be used for a link. In another example, a panel or sector of a node can also establish multiple links, e.g. if the node is capable of multiple access operation such as when the node is an AP or an eNB or a gNB.

Figure 8:
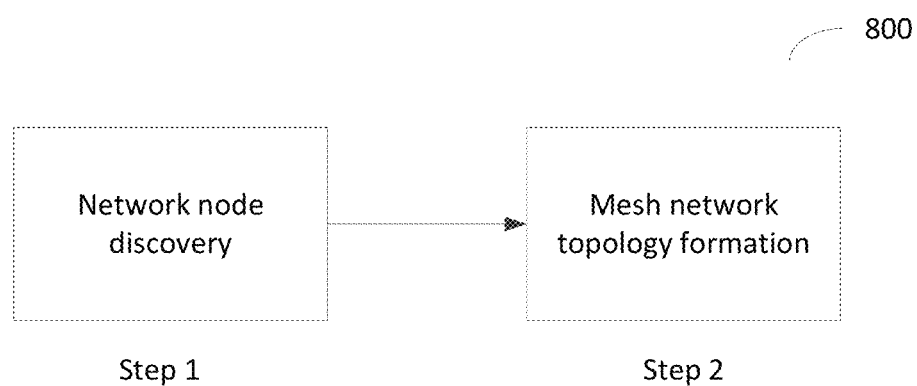
FIG. 8 illustrates a network initialization steps according to embodiments of the present disclosure.

FIG. 8 illustrates a network initialization step 800 according to embodiments of the present disclosure. The embodiment of the network initialization step 800 illustrated in FIG. 8 is for illustration only. FIG. 8 does not limit the scope of this disclosure.

The network initialization can be formulated as a two-step procedure, namely the network node discovery in step 1 and the mesh network topology formation in step 2 as illustrated in FIG. 8.

The protocols described in the present disclosure can also be applied as a network topology update mechanism. The physical signal/channel used for node discovery is referred to as the discovery radio signal. The discovery radio signal can be the beacon signal as defined in IEEE 802.11 RATs or the synchronization signals for LTE (primary synchronization signal, secondary synchronization signal, common reference signal, discovery signal) or NR (synchronization signals block, tracking reference signal).

In a first approach of the network discovery, the nodes in the network takes turn to be configured as the transmitter that transmits a discovery radio signal for detection and measurement by the rest of the nodes that are configured as receiver. For example, in a first time instance a first node is configured to broadcast a radio signal, while the other nodes are configured to detect and measure the radio signal transmitted by the first node.

In a second time instance, a second node is configured to broadcast a radio signal, while the other nodes (including the first node) are configured to attempt to detect and measure the radio signal transmitted by the second node (if detected). At each time instance, only one node is configured as the broadcasting node and the other nodes are the listening nodes. Assuming there are N nodes, the protocol can be completed in N time instances where each node has one time instance to broadcast a radio signal, and N−1 time instances to detect and measure the radio signals.

The link quality measurement metrics can be the radio signal strength (e.g. reference signal received power (RSRP) in LTE or NR, or received signal strength (RSS) or received signal strength indicator (RSSI) for Wi-Fi or WiGig), or the signal-to-noise-ratio (SNR), or the signal-to-interference-and-noise-ratio (SINR). The link quality measurements can be reported by the nodes to a network controller node. The measurement reports can be sent to the network controller node via another channel such as over the Ethernet or over another wireless channel.

Figure 9:
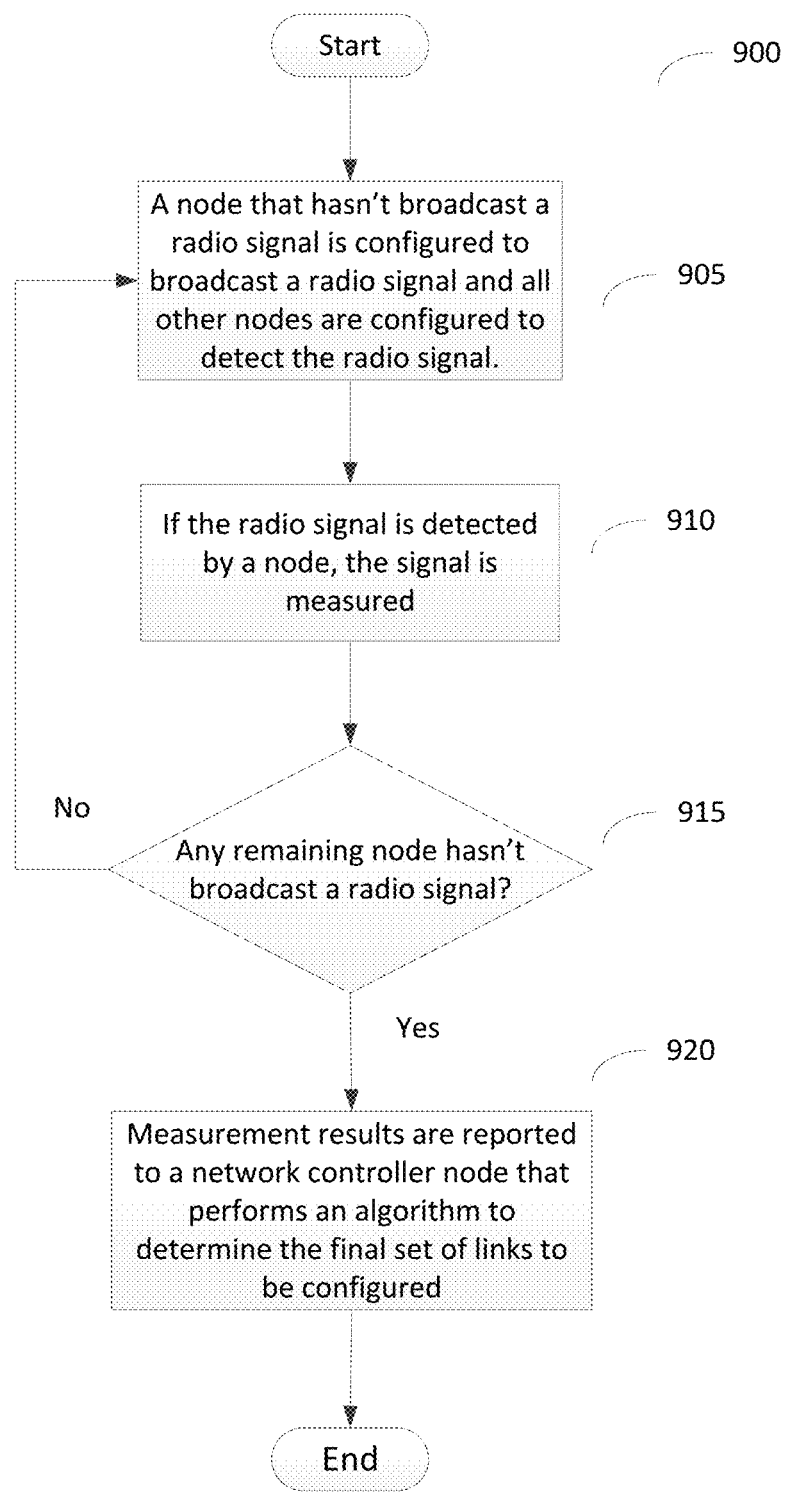
FIG. 9 illustrates the first approach of network initialization protocol according to embodiments of the present disclosure.

FIG. 9 illustrates the first approach 900 of network initialization protocol according to embodiments of the present disclosure. The embodiment of the first approach 900 illustrated in FIG. 9 is for illustration only. FIG. 9 does not limit the scope of this disclosure.

As illustrated in FIG. 9, at step 905, a node that hasn't broadcast a radio signal is configured to broadcast a radio signal and all other nodes are configured to detect the radio signal. At step 910, if the radio signal is detected by a node, the signal is measured. At step 915, it is determined whether any remaining node hasn't broadcast a radio signal. At step 915, if remaining node has broadcast a radio signal, perform step 905. At step 915, if remaining node has not broadcast a radio signal, perform step 920. Finally, at step 920, measurement results are reported to a network controller node that performs an algorithm to determine the final set of links to be configured.

To manage the reporting overhead, only measurement results that are above a predefined or preconfigured threshold need to be reported. In the network topology formation step, the network controller node performs an algorithm to determine the final set of links that may be configured according to the link measurement results and the network performance objective. A diagram of the protocol is shown in FIG. 9. Instead of measurement reporting after all nodes have completed the transmission step, the reporting of the measurement results can also be performed immediately after the radio signal has been detected and measured.

Figure 10A:
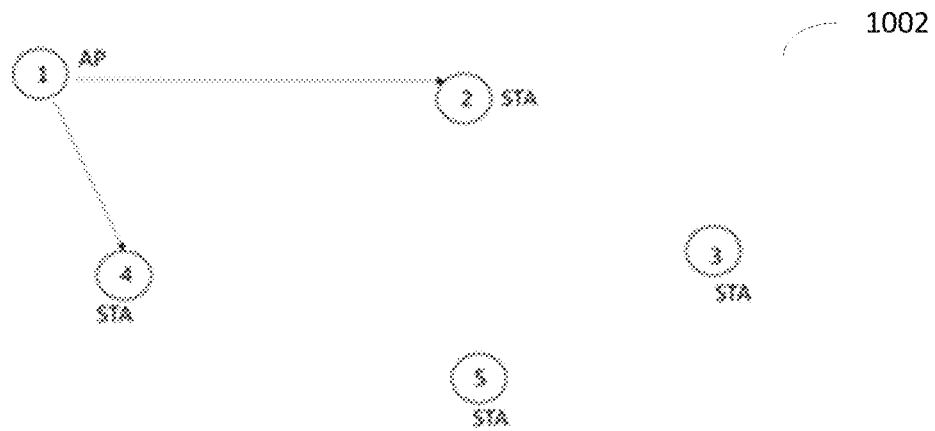
FIG. 10A illustrates the first approach of network initialization protocol of time instance 1 for five nodes according to embodiments of the present disclosure.

FIG. 10A illustrates the first approach 1002 of network initialization protocol of time instance 1 for five nodes according to embodiments of the present disclosure. The embodiment of the first approach 1002 illustrated in FIG. 10A is for illustration only. FIG. 10A does not limit the scope of this disclosure. As illustrated in FIG. 10A, node 1 is configured as AP and transmits radio signal which is detected by node 2 and node 4.

Figure 10B:
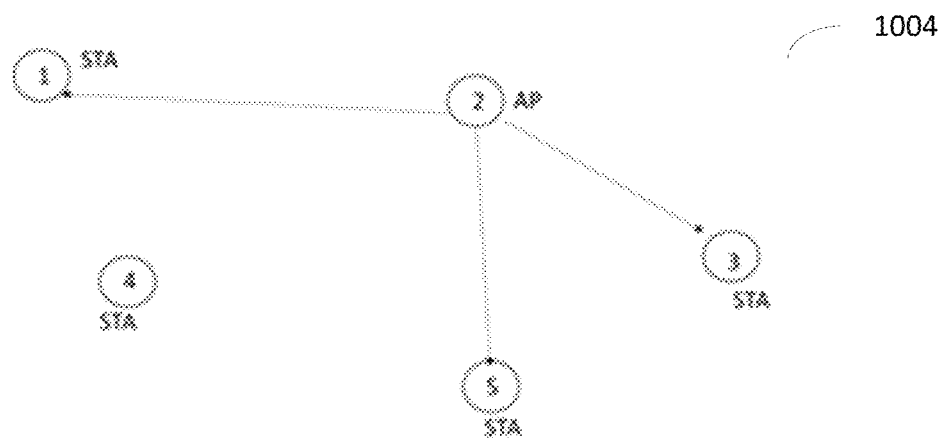
FIG. 10B illustrates the first approach of network initialization protocol of time instance 2 for five nodes according to embodiments of the present disclosure.

FIG. 10B illustrates the first approach 1004 of network initialization protocol of time instance 2 for five nodes according to embodiments of the present disclosure. The embodiment of the first approach 1004 illustrated in FIG. 10B is for illustration only. FIG. 10B does not limit the scope of this disclosure. As illustrated in FIG. 10B, node 2 is configured as AP and transmits radio signal which is detected by node 3 and node 5.

Figure 10C:
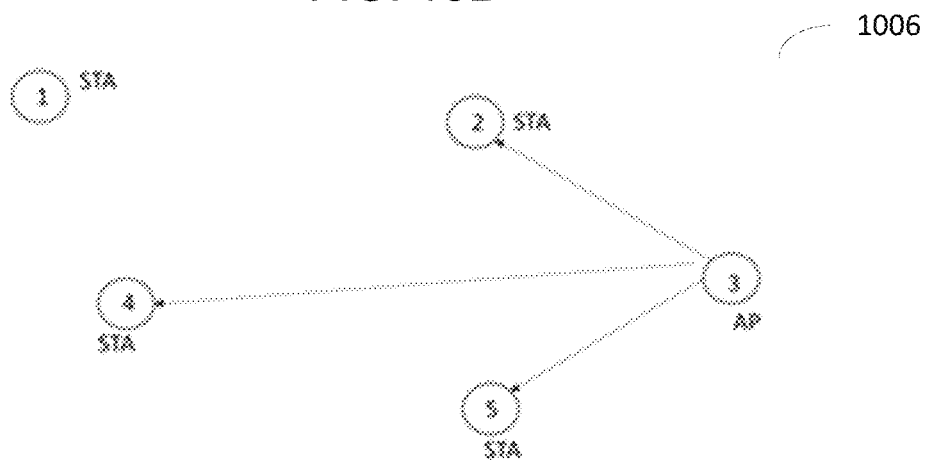
FIG. 10C illustrates the first approach of network initialization protocol of time instance 3 for five nodes according to embodiments of the present disclosure.

FIG. 10C illustrates the first approach 1006 of network initialization protocol of time instance 3 for five nodes according to embodiments of the present disclosure. The embodiment of the first approach 1006 illustrated in FIG. 10C is for illustration only. FIG. 10C does not limit the scope of this disclosure. As illustrated in FIG. 10C, node 3 is configured as AP and transmits radio signal which is detected by node 2, node 4 and node 5.

Figure 10D:
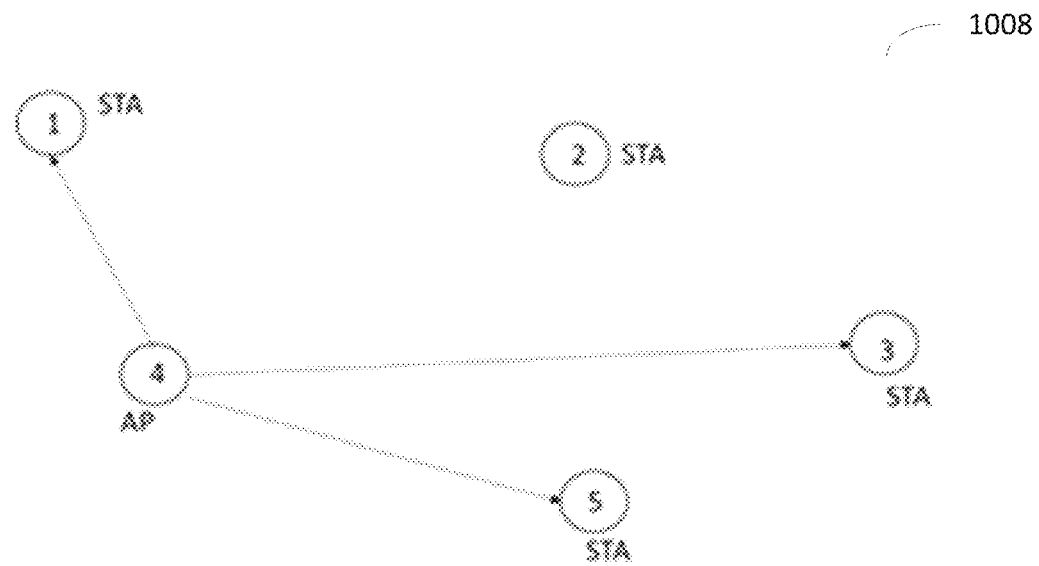
FIG. 10D illustrates the first approach of network initialization protocol of time instance 4 for five nodes according to embodiments of the present disclosure.

FIG. 10D illustrates the first approach 1008 of network initialization protocol of time instance 4 for five nodes according to embodiments of the present disclosure. The embodiment of the first approach 1008 illustrated in FIG. 10D is for illustration only. FIG. 10D does not limit the scope of this disclosure. As illustrated in FIG. 10D, node 4 is configured as AP and transmits radio signal which is detected by node 1, node 3 and node 5.

Figure 10E:
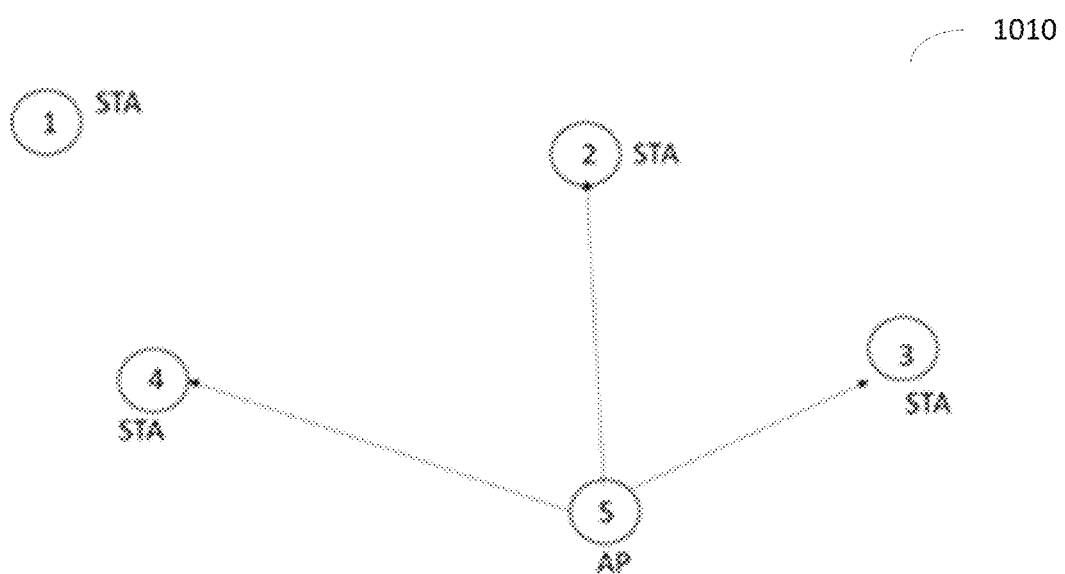
FIG. 10E illustrates the first approach of network initialization protocol of time instance 5 for five nodes according to embodiments of the present disclosure.

FIG. 10E illustrates the first approach 1010 of network initialization protocol of time instance 5 for five nodes according to embodiments of the present disclosure. The embodiment of the first approach 1010 illustrated in FIG. 10E is for illustration only. FIG. 10E does not limit the scope of this disclosure. As illustrated in FIG. 10E, node 5 is configured as AP and transmits radio signal which is detected by node 2, node 3 and node 4.

The protocol is further illustrated in FIG. 10A to 10E with the following example of 5 nodes. In this example, Wi-Fi or WiGig technology is assumed where the node that is configured to perform the discovery signal broadcast is configured as an AP, whereas the nodes that are configured to detect and measure the signal are configured to be STA. The nodes can be replaced with eNB/gNB and a UE for the transmitter and the receiver node, respectively, for LTE or NR technology. It can be extended to nodes that operate with peer-to-peer mode, where the STA is capable of discovery signal broadcast. Alternatively, the nodes need not assume the identity of AP or STA, and instead the nodes are just classified as either transmitter or receiver. The arrows in FIG. 10A to 10E represent activity of detection and measurement of the radio signals from the transmitter node.

The measurement results obtained from each time instance are shown in the following five tables. The values in TABLE 1 are indicative of signal strength where larger value implies better signal strength.

TABLE 1A

Measurements achieved at each time instance - Measurement at time instance 1

| Nodes {row: TX (AP), column: RX (STA)} | 1 | 2 | 3 | 4 | 5 |
|---|---|---|---|---|---|
| 1 | — | 32.7 | — | 36.3 | — |
| 2 | — | — | — | — | — |
| 3 | — | — | — | — | — |
| 4 | — | — | — | — | — |
| 5 | — | — | — | — | — |

TABLE 1B

Measurements achieved at each time instance - Measurement at time instance 2

| Nodes {row: TX (AP), column: RX (STA)} | 1 | 2 | 3 | 4 | 5 |
|---|---|---|---|---|---|
| 1 | — | 32.7 | — | 36.3 | — |
| 2 | 31.9 | — | 42.1 | — | 26 |
| 3 | — | — | — | — | — |
| 4 | — | — | — | — | — |
| 5 | — | — | — | — | — |

TABLE 1C

Measurements achieved at each time instance - Measurement at time instance 3

| Nodes {row: TX (AP), column: RX (STA)} | 1 | 2 | 3 | 4 | 5 |
|---|---|---|---|---|---|
| 1 | — | 32.7 | — | 36.3 | — |
| 2 | 31.9 | — | 42.1 | — | 26 |
| 3 | — | 41.4 | — | 20.3 | 38.6 |
| 4 | — | — | — | — | — |
| 5 | — | — | — | — | — |

TABLE 1D

Measurements achieved at each time instance - Measurement at time instance 4

| Nodes {row: TX (AP), column: RX (STA)} | 1 | 2 | 3 | 4 | 5 |
|---|---|---|---|---|---|
| 1 | — | 32.7 | — | 36.3 | — |
| 2 | 31.9 | — | 42.1 | — | 26 |
| 3 | — | 41.4 | — | 20.3 | 38.6 |
| 4 | 36 | — | 19.7 | — | 27.3 |
| 5 | — | — | — | — | — |

TABLE 1E

Measurements achieved at each time instance - Measurement at time instance 5

| Nodes {row: TX (AP), column: RX (STA)} | 1 | 2 | 3 | 4 | 5 |
|---|---|---|---|---|---|
| 1 | — | 32.7 | — | 36.3 | — |
| 2 | 31.9 | — | 42.1 | — | 26 |
| 3 | — | 41.4 | — | 20.3 | 38.6 |
| 4 | 36 | — | 19.7 | — | 27.3 |
| 5 | — | 25.8 | 38 | 28 | — |

Figure 11:
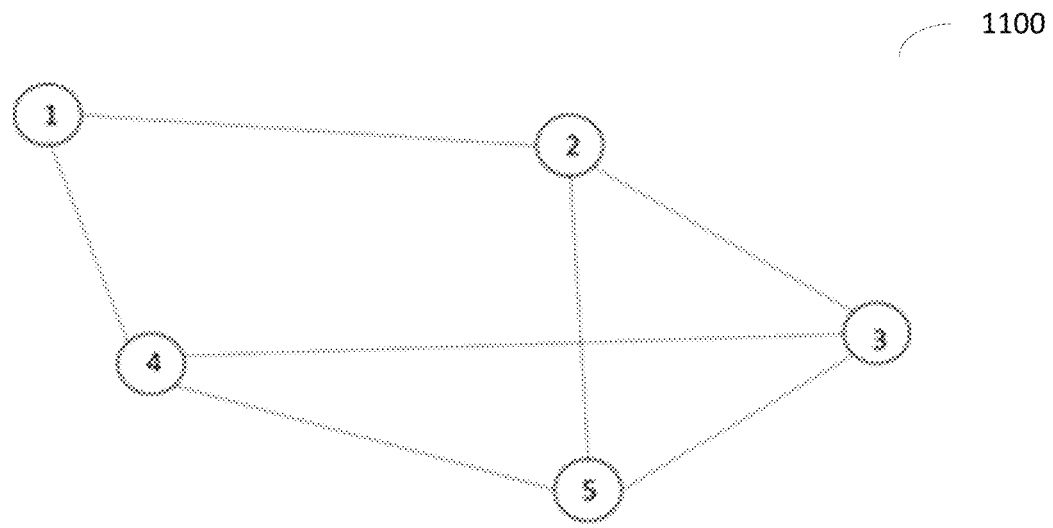
FIG. 11 illustrates a network topology after measurements according to embodiments of the present disclosure.

FIG. 11 illustrates a network topology 1100 after measurements according to embodiments of the present disclosure. The embodiment of the network topology 1100 illustrated in FIG. 11 is for illustration only. FIG. 11 does not limit the scope of this disclosure.

After reporting of the measurement results, the results as represented by TABLE 1E are available at the network controller node which performs the final link selection. The network topology representation is illustrated in FIG. 11.

When a large number of nodes are deployed, the network initialization protocol can be performed simultaneously for multiple clusters of nodes. The cluster of nodes can be non-overlapping spatially (sufficiently far apart geographically).

In a second approach of the network discovery, the nodes are sequentially configured to become a broadcasting or discovery radio signal transmitter node. Unlike the first approach, once a node has been configured to be a broadcasting node, the node does not need to perform detection and measurement of new radio links at least in the node discovery step. The tier assignment to build a bipartite graph can also be performed in conjunction. In one variation, bipartite graph generation is not performed in conjunction and the tier assignment is only for facilitating the topology discovery procedure.

It is assumed here that a node is equipped with multiple sectors, and each sector can be configured to be an AP or an STA. The steps are described assuming the broadcasting sector may be configured as an AP and the listening sector may be configured as an STA, but the approach can also be applied to the nodes operating in a peer-to-peer mode, where instead of AP or STA, the configuration is to be a discovery radio signal transmitter or a receiver.

Step 1: Denote n=tier index=0. Set the node with wired connection to the gateway as the $T_0$ node. The node's sectors are configured as APs. All the other nodes' sectors are configured as STAs.

Step 2: All the STA sectors attempt to detect and measure $T_n$ AP (denoted as $T_n$ measurements). The $T_n$ measurement results which are generated for each sector of the node are reported to a network controller node. This is one measurement period for generating $T_n$ measurements.

Step 3: The $T_n$ measurement results are sorted from the strongest to the weakest. The sorted list is denoted as the $T_n$ list, which presents the discovered node list in response to the discovery radio signal broadcast of a node of tier n. This step can be performed at the network controller node.

Step 4: While the $T_n$ list is not empty, the sector corresponding to the first entry in the $T_n$ list (strongest) is configured as $T_{n+1}$ STA, all other sectors of the same node configured as $T_{n+1}$ AP.

In one variation, all the sectors of the same node corresponding to the first entry in the $T_n$ list are configured as APs. This has the advantage of enlarging node discovery area/range for the node.

all remaining STAs measure the new $T_{n+1}$ AP and report the results to the network controller node.

if any sector measures and reports a stronger $T_{n+1}$ measurement than the $T_n$ measurement, the corresponding node is a $T_{n+2}$ node. Remove this node (and the corresponding sectors) from the $T_n$ list and add the node (and the corresponding sectors) to the $T_{n+1}$ list.

remove the first entry in the $T_n$ list and all sectors belonging to the corresponding node from the $T_n$ list.

End While n:=n+1.

Step 5: If $T_n$ list is empty, terminate algorithm; else repeat Step 4.

After a node is configured as the broadcasting node, the node may continuously broadcast the discovery radio signal until the node is commanded to stop (e.g. by the network controller node), or the node may only transmit the discovery radio signal for one detection or measurement period.

There can be a separate wired or wireless channel directly connecting each node to a network controller node for measurement reporting and sending control command, but it is not an essential assumption of the disclosure and can be easily extended to the case where such direct channel to the network controller node is not present.

Figure 12:
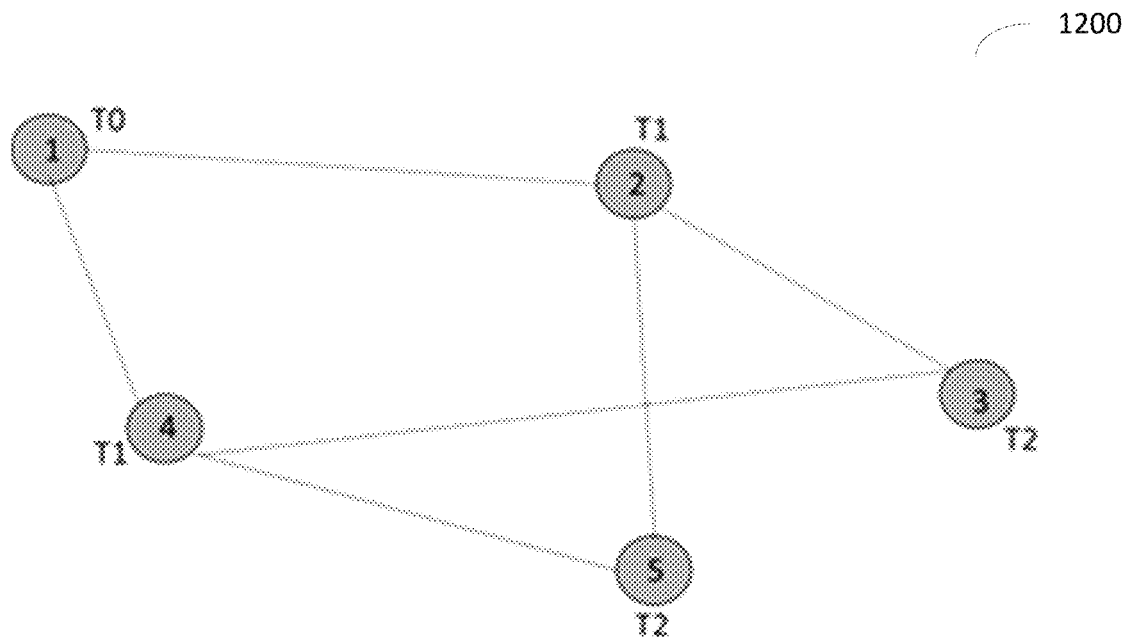
FIG. 12 illustrates a network topology after applying the second approach according to embodiments of the present disclosure.

FIG. 12 illustrates a network topology 1200 after applying the second approach according to embodiments of the present disclosure. The embodiment of the network topology 1200 illustrated in FIG. 12 is for illustration only. FIG. 12 does not limit the scope of this disclosure.

After applying the steps described on the example network as shown in FIG. 11, the final network topology is as illustrated in FIG. 12.

TABLE 2

Measurement tables available at the network controller node for the second approach

| Nodes {row: TX (AP), column: RX (STA)} | 1 | 2 | 3 | 4 | 5 |
|---|---|---|---|---|---|
| 1 (tier 0) | — | 32.7 | — | 36.3 | — |
| 2 (tier 1) | — | — | 42.1 | — | 26 |
| 3 (tier 2) | — | — | — | — | — |
| 4 (tier 1) | — | — | 19.7 | — | 27.3 |
| 5 (tier 2) | — | — | — | — | — |

The steps of the second approach are further illustrated with another example of five nodes where each node is equipped with two panels or sectors in FIG. 13. The discovery radio signal for detection and measurement is represented as the "beacon" signal.

Figure 13A:
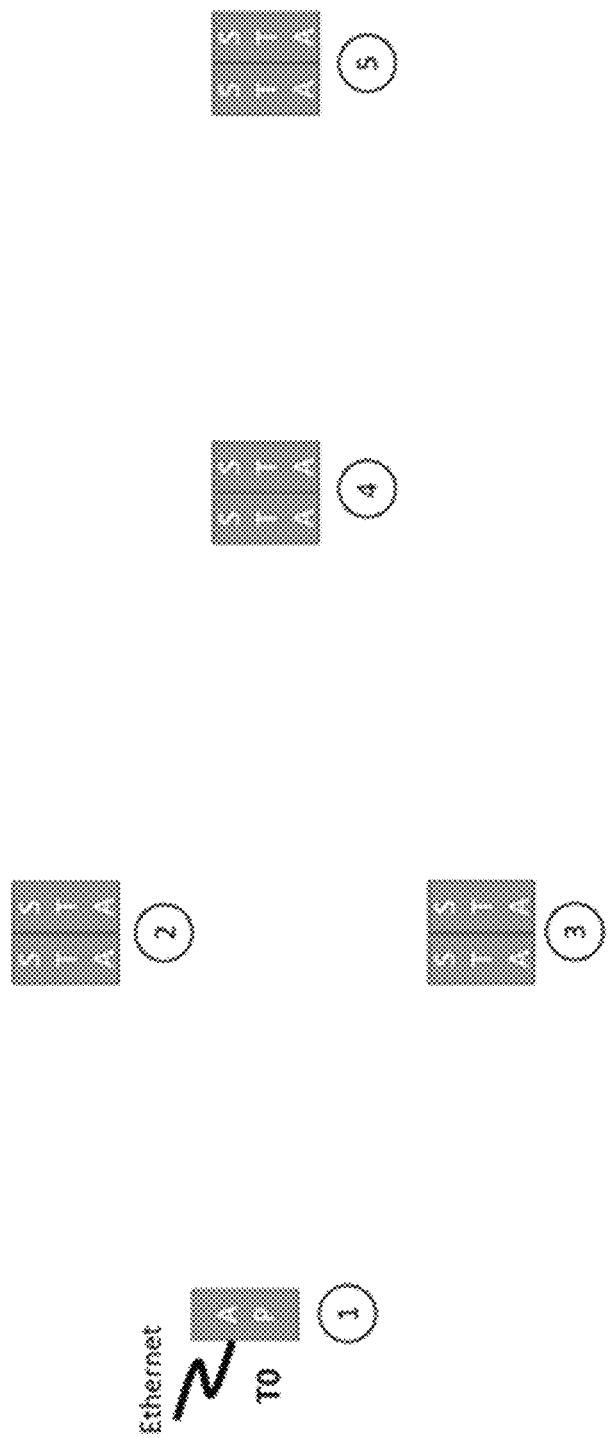
FIG. 13A illustrates the second approach of network initialization protocol for five nodes of time instance 1 according to embodiments of the present disclosure.

FIG. 13A illustrates the second approach 1302 of network initialization protocol for five nodes of time instance 1 according to embodiments of the present disclosure. The embodiment of the second approach 1302 illustrated in FIG. 13A is for illustration only. FIG. 13A does not limit the scope of this disclosure. FIG. 13A illustrates an initial state.

Figure 13B:
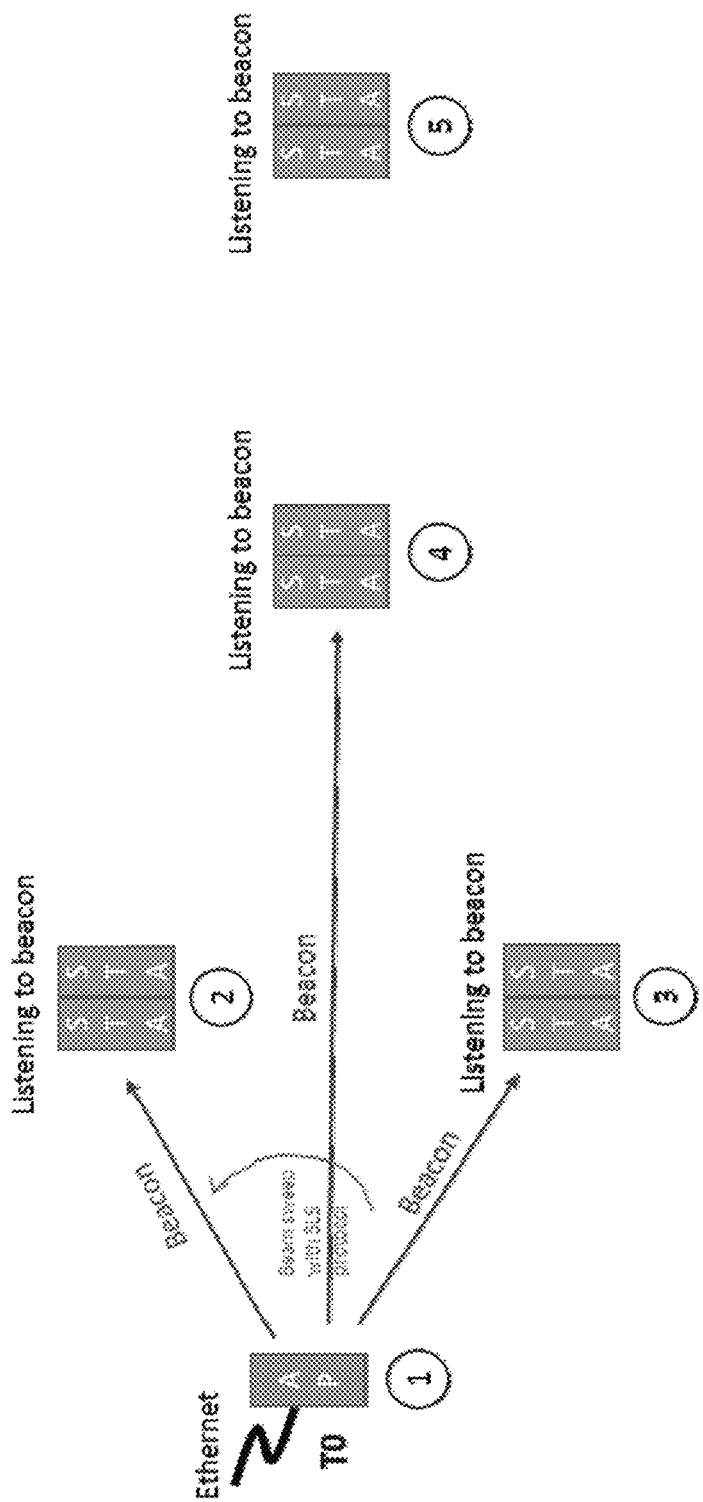
FIG. 13B illustrates the second approach of network initialization protocol for five nodes of time instance 2 according to embodiments of the present disclosure.

FIG. 13B illustrates the second approach 1304 of network initialization protocol for five nodes of time instance 2 according to embodiments of the present disclosure. The embodiment of the second approach 1304 illustrated in FIG. 13B is for illustration only. FIG. 13B does not limit the scope of this disclosure. FIG. 13B illustrates a node with wired connection is configured as AP and transmits beacons.

Figure 13C:
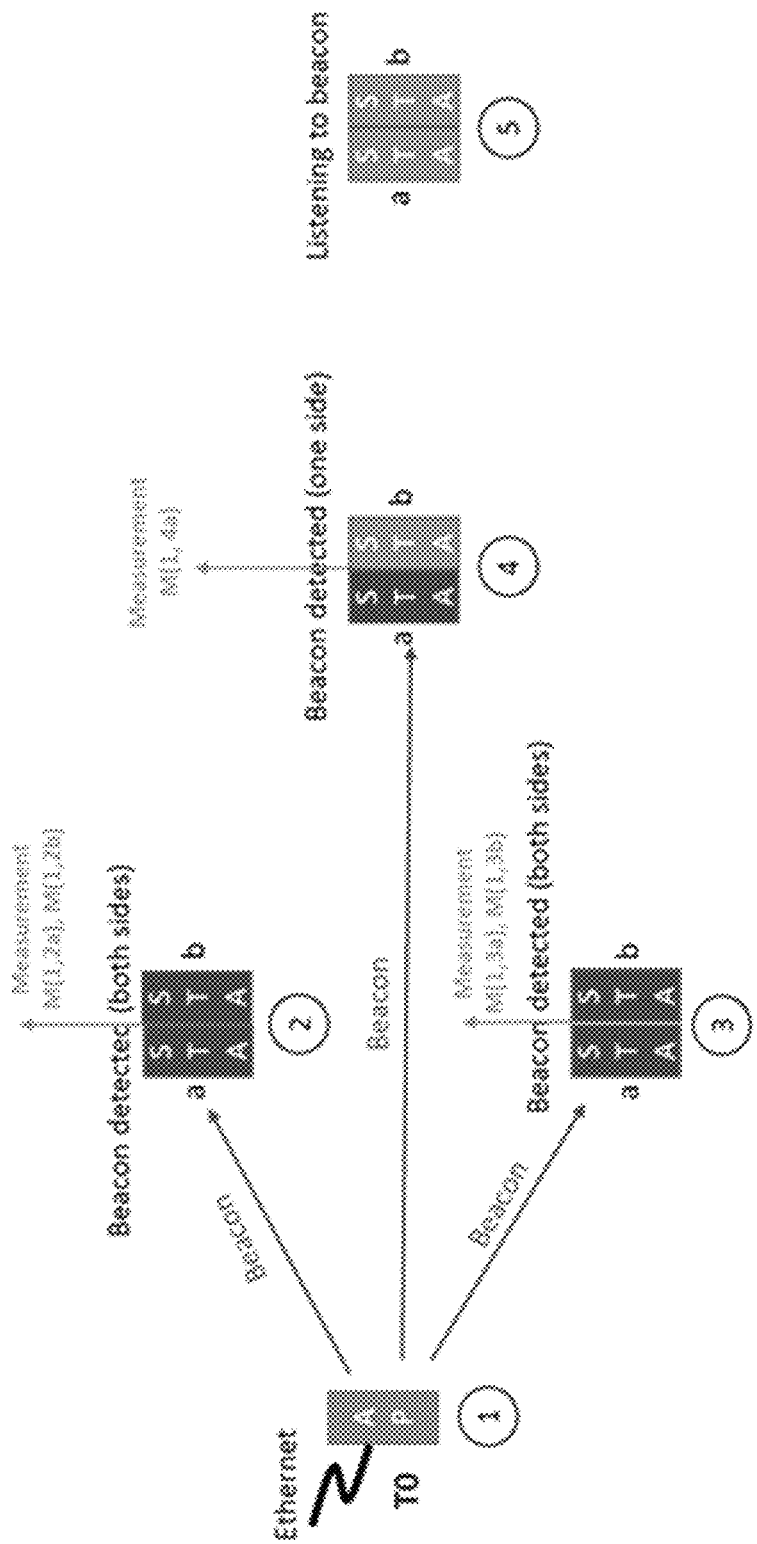
FIG. 13C illustrates the second approach of network initialization protocol for five nodes of time instance 3 according to embodiments of the present disclosure.

FIG. 13C illustrates the second approach 1306 of network initialization protocol for five nodes of time instance 3 according to embodiments of the present disclosure. The embodiment of the second approach 1306 illustrated in FIG. 13C is for illustration only. FIG. 13C does not limit the scope of this disclosure. FIG. 13C illustrates detection and measurement of beacon by STA 2a, 2b, 3a, 3b, 4a. SSID RSSI measurement results: M(1, 2a)>M(1, 3a)>M(1, 2b)>M(1, 3b)>M(1, 4a).

Figure 13D:
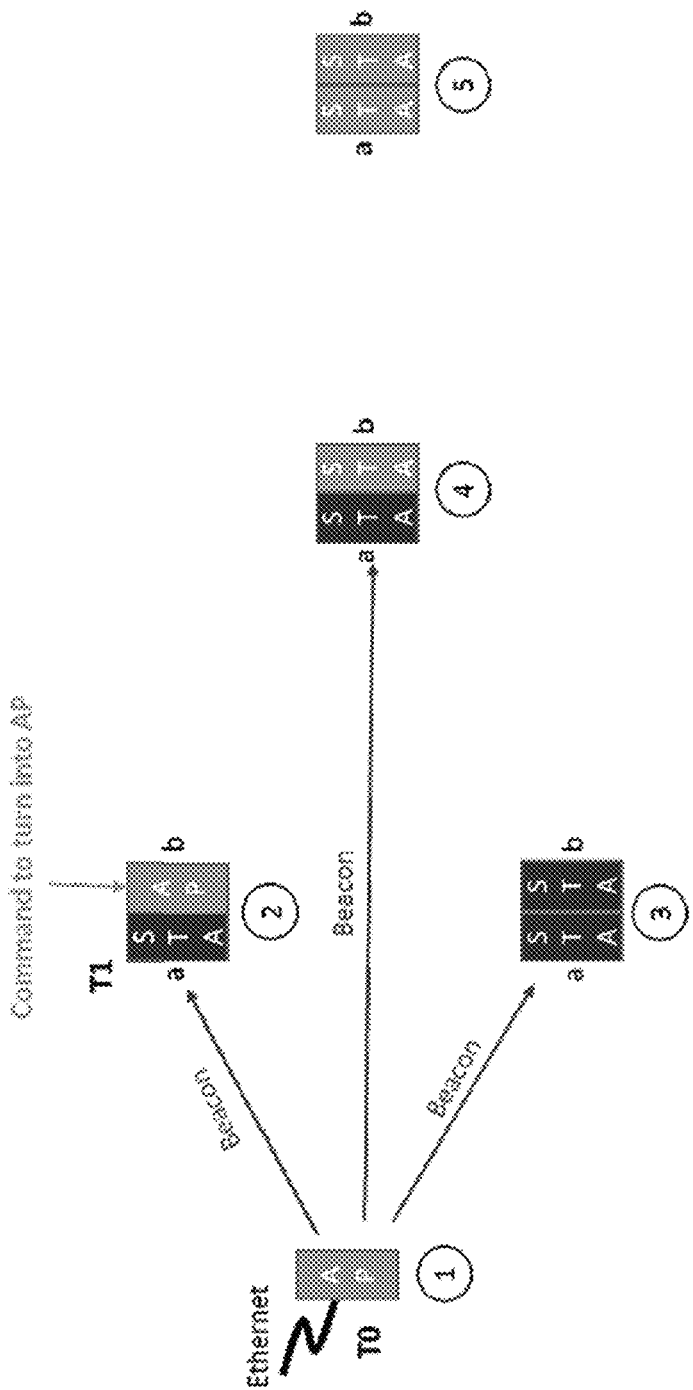
FIG. 13D illustrates the second approach of network initialization protocol for five nodes of time instance 4 according to embodiments of the present disclosure.

FIG. 13D illustrates the second approach 1308 of network initialization protocol for five nodes of time instance 4 according to embodiments of the present disclosure. The embodiment of the second approach 1308 illustrated in FIG. 13D is for illustration only. FIG. 13D does not limit the scope of this disclosure. As illustrated in FIG. 13D, for the node with the strongest sector measurement registered, turn the other sector of the same node into an A. Start with node 2 since M (1, 2a) is the strongest measurement.

Figure 13E:
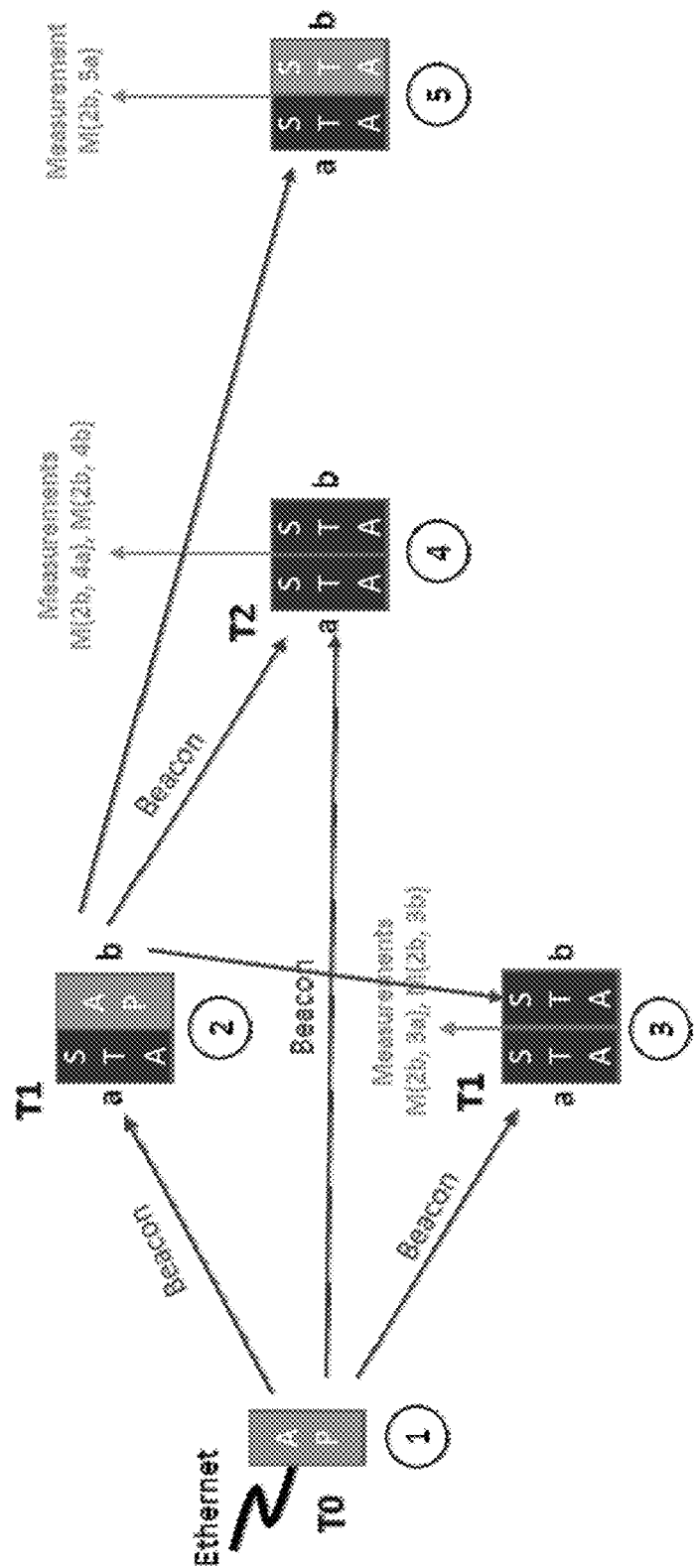
FIG. 13E illustrates the second approach of network initialization protocol for five nodes of time instance 5 according to embodiments of the present disclosure.

FIG. 13E illustrates the second approach 1310 of network initialization protocol for five nodes of time instance 5 according to embodiments of the present disclosure. The embodiment of the second approach 1310 illustrated in FIG. 13E is for illustration only. FIG. 13E does not limit the scope of this disclosure. As illustrated in FIG. 13E, since M (2b, 4a)>M (1, 4a), Node 4 is a $T_2$ node. M (1, 3a)>M (2b, 3a). M (1, 3b)<M (2b, 3b). Since M (1, 3a)>M (2b, 3a), node 3 is a $T_1$ node.

Figure 13F:
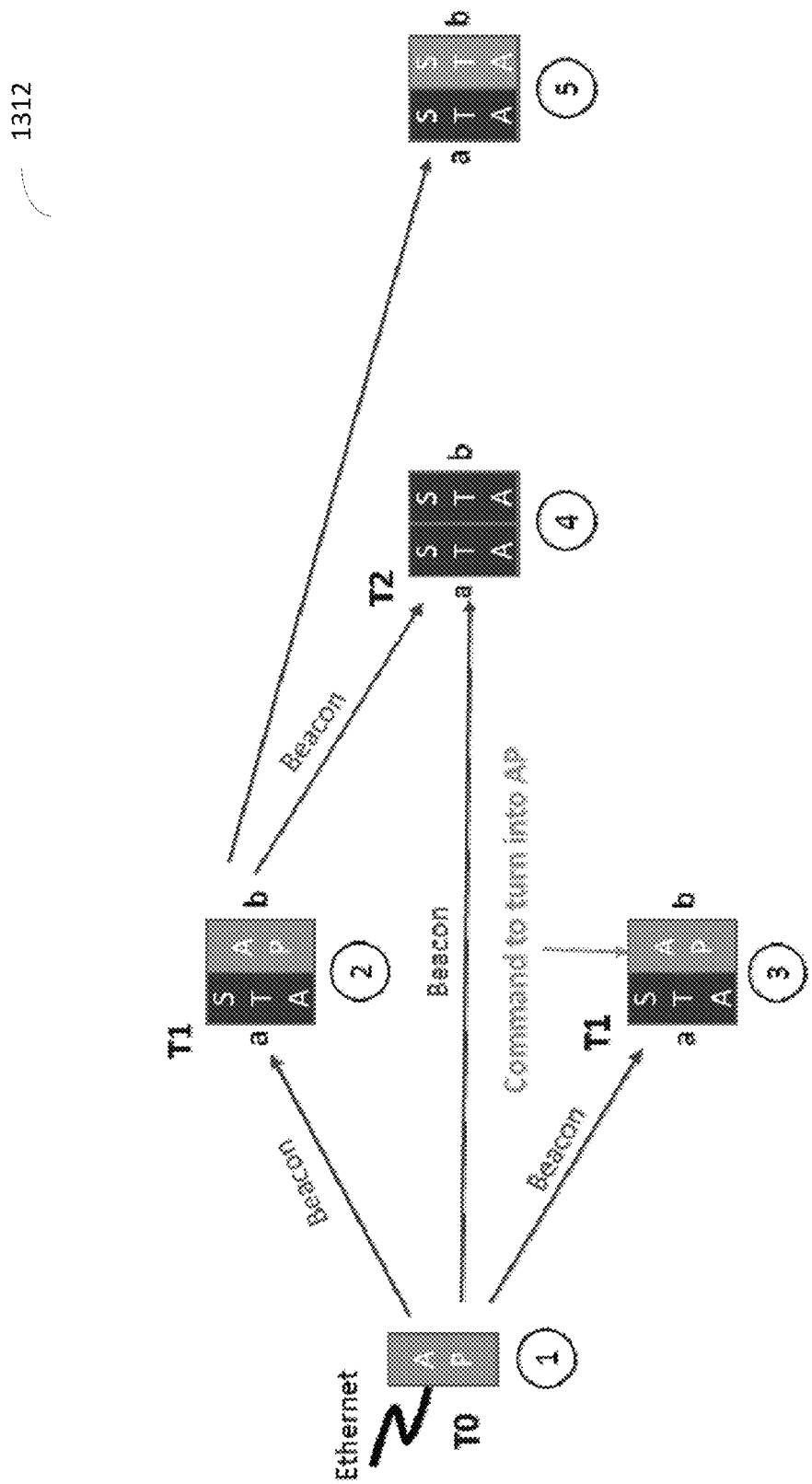
FIG. 13F illustrates the second approach of network initialization protocol for five nodes of time instance 6 according to embodiments of the present disclosure.

FIG. 13F illustrates the second approach 1312 of network initialization protocol for five nodes of time instance 6 according to embodiments of the present disclosure. The embodiment of the second approach 1312 illustrated in FIG.

13F is for illustration only. FIG. 13F does not limit the scope of this disclosure. FIG. 13F illustrates turn sector 3b into an AP.

Figure 13G:
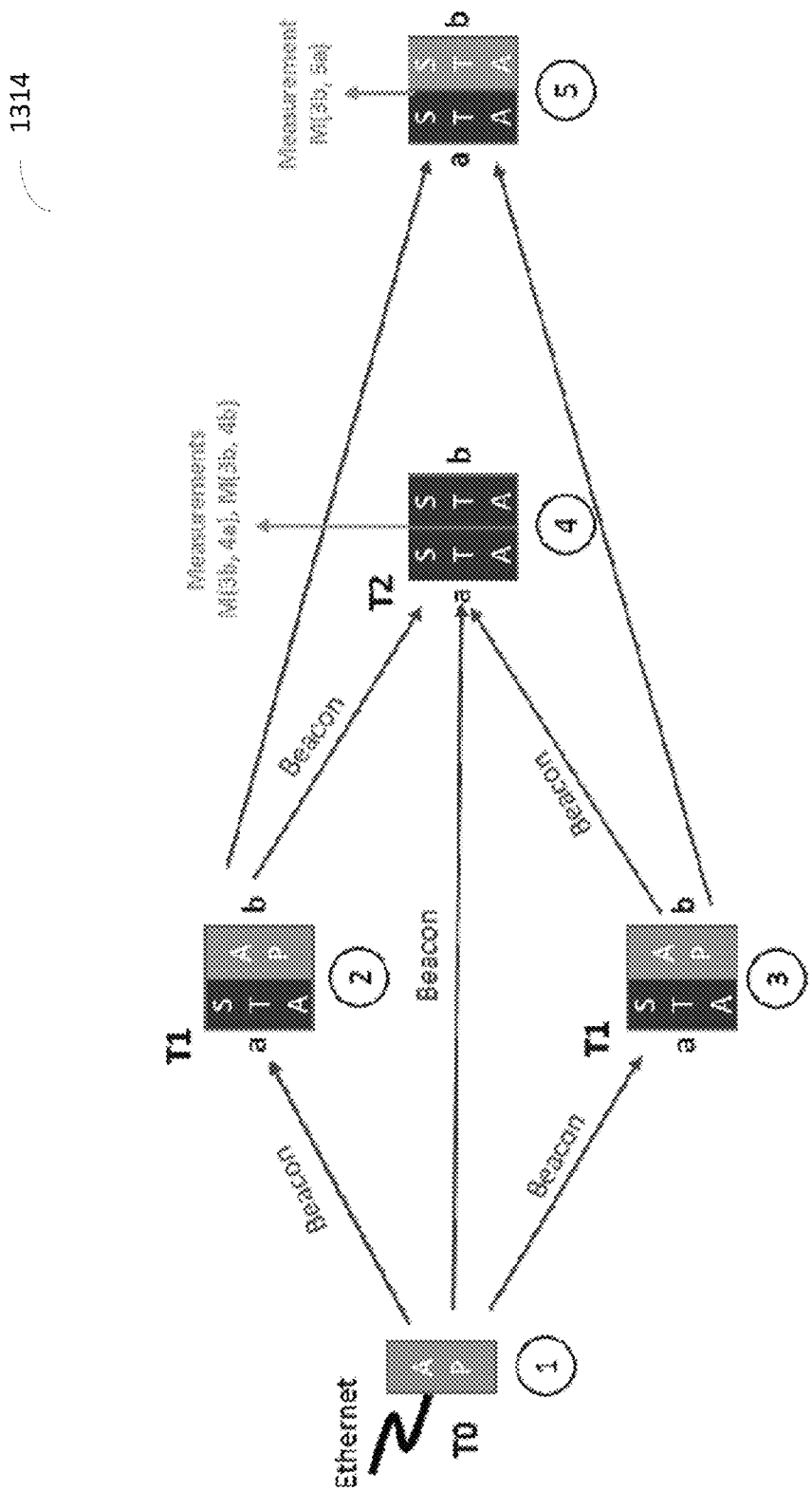
FIG. 13G illustrates the second approach of network initialization protocol for five nodes of time instance 7 according to embodiments of the present disclosure.

FIG. 13G illustrates the second approach 1314 of network initialization protocol for five nodes of time instance 7 according to embodiments of the present disclosure. The embodiment of the second approach 1314 illustrated in FIG. 13G is for illustration only. FIG. 13G does not limit the scope of this disclosure. As illustrated in FIG. 13G, measurements M (3b, 4a), M (3b, 4d) and M (3b, 5a) are obtained.

Figure 13H:
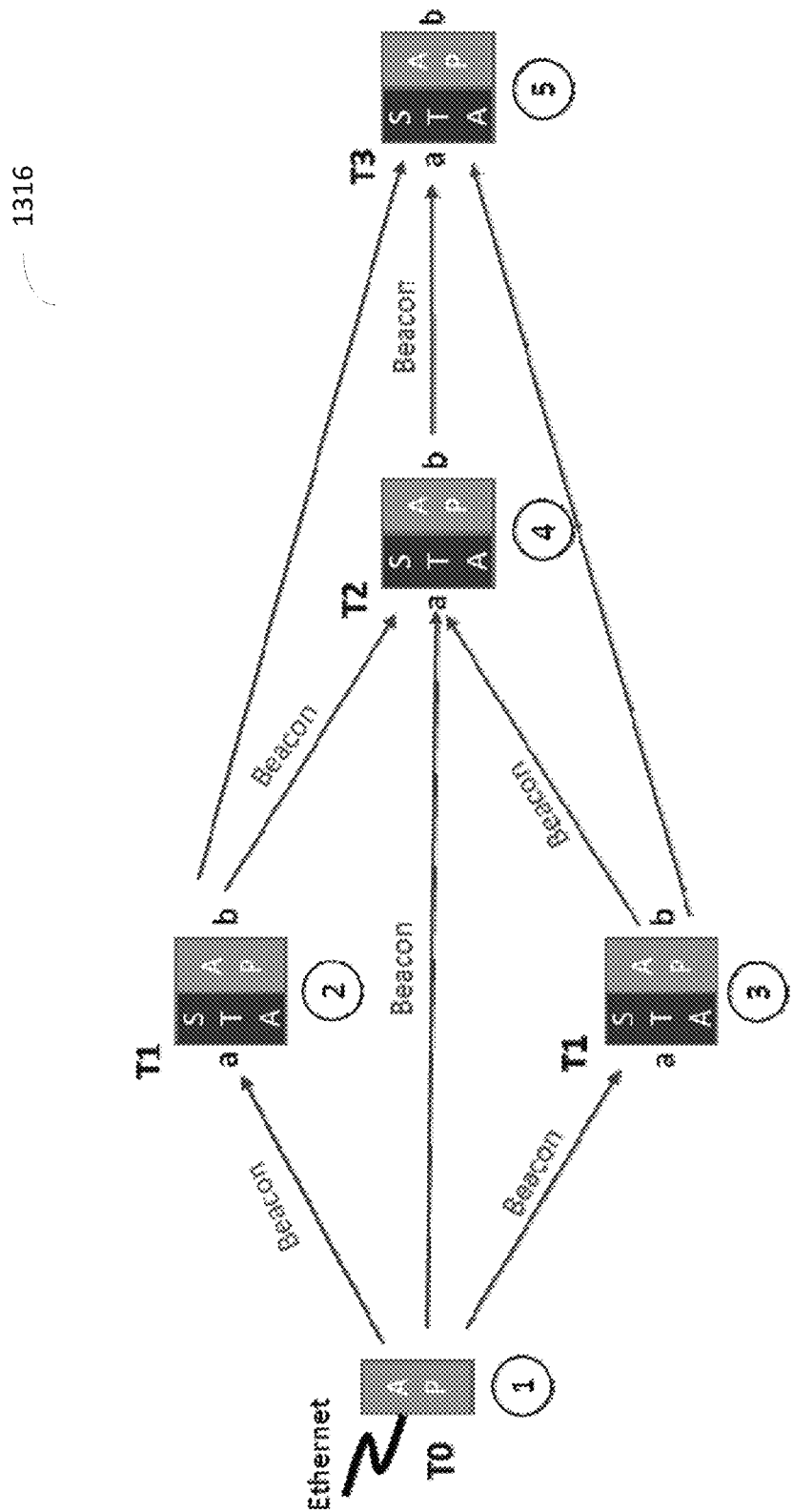
FIG. 13H illustrates the second approach of network initialization protocol for five nodes of time instance 8 according to embodiments of the present disclosure.

FIG. 13H illustrates the second approach 1316 of network initialization protocol for five nodes of time instance 8 according to embodiments of the present disclosure. The embodiment of the second approach 1316 illustrated in FIG. 13H is for illustration only. FIG. 13H does not limit the scope of this disclosure. As illustrated in FIG. 13H, turn sector 5b into an AP.

Figure 13I:
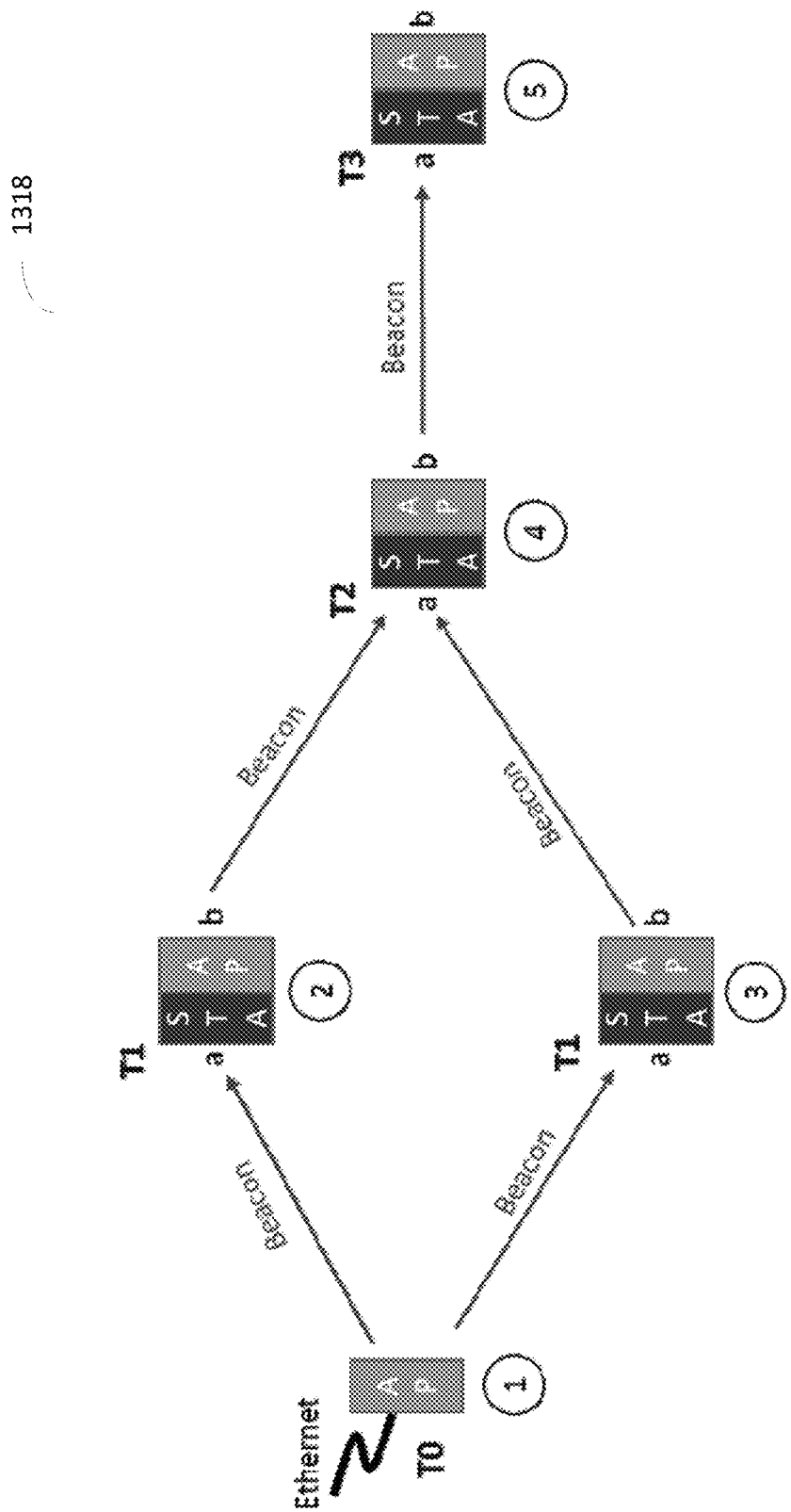
FIG. 13I illustrates the second approach of network initialization protocol for five nodes according to embodiments of the present disclosure.

FIG. 13I illustrates the second approach 1318 of network initialization protocol for five nodes according to embodiments of the present disclosure. The embodiment of the second approach 1318 illustrated in FIG. 13I is for illustration only. FIG. 13I does not limit the scope of this disclosure. As illustrated in FIG. 13I, based on tier assignment, the final mesh network is formed.

In a third approach of the network discovery, it can be assumed that nodes except the nodes with fiber connection are not equipped with the additional control channel (e.g. Ethernet or additional wireless channel). Only the fiber nodes have this out of band control channel. Starting from fiber nodes, the remaining nodes are to be discovered. During this discovery process each node performs discovery radio signal broadcast (e.g. the sector level sweeping (SLS) in WiGig, which it may assume for further description of the third approach) to discover neighbors at most once.

The discovery of a node is achieved when the node concerned reports the successful detection of the node performing the SLS and the associated information such as the node identity the measurement results, etc. In the due completion of this discovery process various measurement results can be obtained such as node/sector id, channel id of the node performing the SLS, and the corresponding SINR (with respect to the node performing SLS). The algorithm can be visualized in two ways, the first is order based discovery and the second is best-node-first discovery. In the case of order based discovery starting from fiber node, the SLS is performed to discover neighbors.

The first node discovered during the SLS may be the next one to perform SLS and this process keeps continuing till all the nodes are discovered or the required information about the measurement statistics are obtained. In the case of best-node-first discovery, starting from the fiber node it performs SLS to discover neighbors. Once the neighbors are discovered it may be found that which node is the best neighbor and that neighbor performs SLS to discover further nodes. By considering the best neighbor first, a relatively reliable control path from each and every node to the fiber node can be obtained. The fiber nodes collect all this measurement information and can be sent to a network controller node for further processing.

The algorithm is illustrated further in FIG. 14 to FIG. 21 with the help of an example having 5 nodes including 1 node as the fiber node. The arrows represent activity of detection and measurement of the radio signals from the transmitter node. Some of the key terms currently used in the algorithms are as follows: Queue (list of nodes yet to perform sector level sweeping. First element of queue represents the current node performing SLS); Visited (list of nodes which have already been discovered); Neighbor (list of nodes been discovered by current node); and Children (node for which a given node is the parent).

Figure 14:
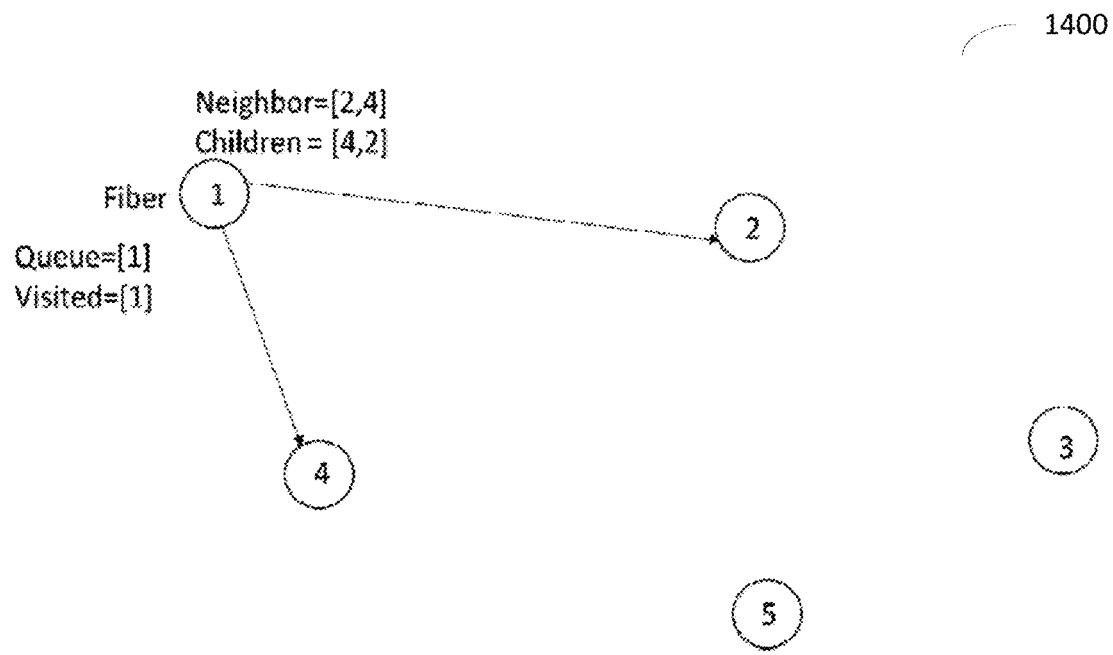
FIG. 14 illustrates a Step 1 of the third approach according to embodiments of the present disclosure.

FIG. 14 illustrates Step 1 of the third approach 1400 according to embodiments of the present disclosure. The embodiment of the Step 1 of the third approach 1400 illustrated in FIG. 14 is for illustration only. FIG. 14 does not limit the scope of this disclosure. As illustrated in FIG. 14, Step 1: Fiber node 1 performs SLS and discovers node 2 and node 4.

Figure 15:
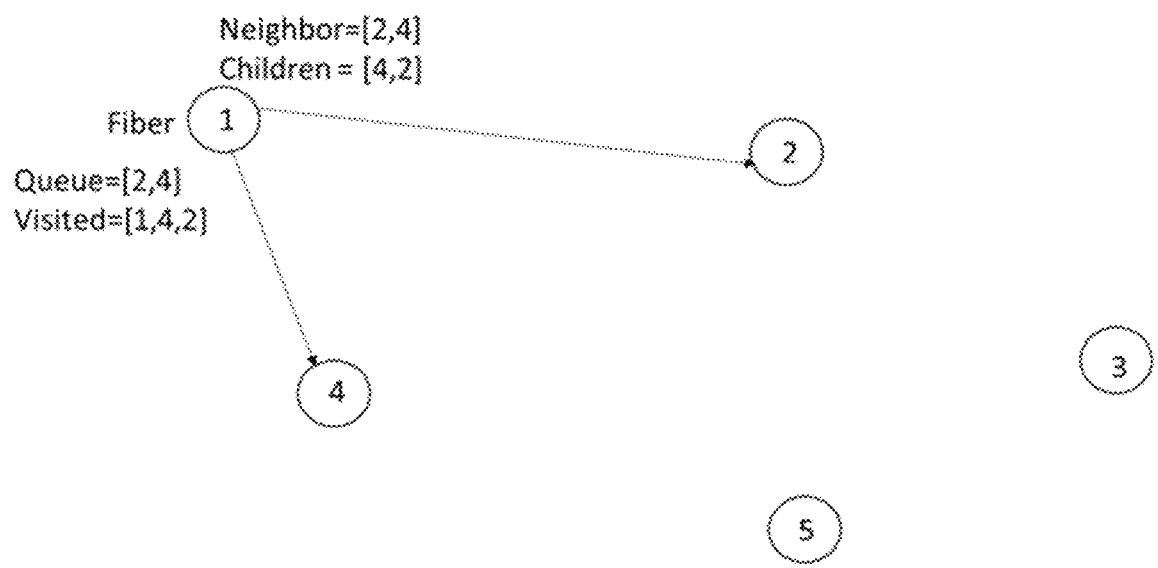
FIG. 15 illustrates a Step 2 of the third approach (order based discovery) according to embodiments of the present disclosure.

FIG. 15 illustrates Step 2 of the third approach (order based discovery) 1500 according to embodiments of the present disclosure. The embodiment of the Step 2 of the third approach (order based discovery) 1500 illustrated in FIG. 15 is for illustration only. FIG. 15 does not limit the scope of this disclosure. As illustrated in FIG. 15, Step 2: Based on the algorithms such as order based discovery or best-node-first discovery, either node 2 or node 4 may perform SLS next. In order based discovery if node 2 is the first node to be discovered then the node 2 may be the next node to perform SLS and discover neighbors. But in the case of best-node-first discovery if the link between node 1 and node 4 has a higher SINR (or other metric) it can be considered as the best node and node 4 may perform SLS next. As illustrated in FIG. 15, Order based discovery: Node 2 is put in the queue first and nodes 1, 4, 2 remain visited till now.

Figure 16:
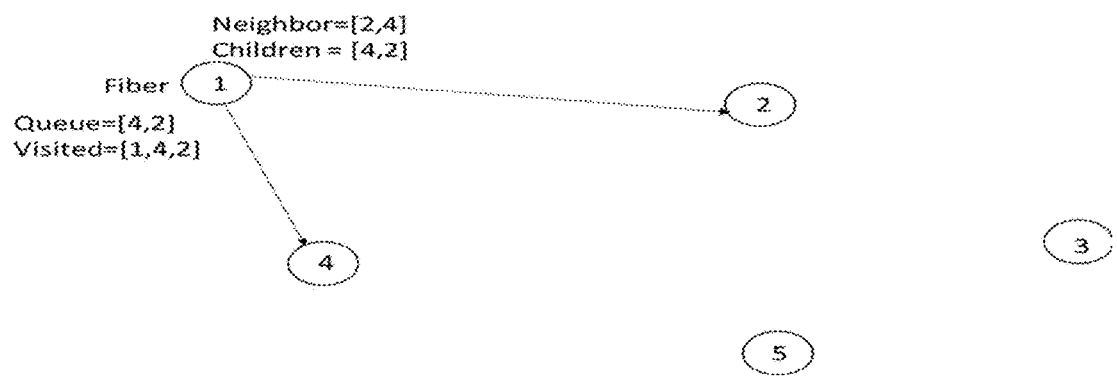
FIG. 16 illustrates a Step 2 of the third approach (best-node-first discovery) according to embodiments of the present disclosure.

FIG. 16 illustrates Step 2 of the third approach (best-node-first discovery) 1600 according to embodiments of the present disclosure. The embodiment of the Step 2 of the third approach (best-node-first discovery) 1600 illustrated in FIG. 16 is for illustration only. FIG. 16 does not limit the scope of this disclosure. As illustrated in FIG. 16, Best-node-first discovery: Node 4 is put in the queue first and nodes 1, 4, 2 remain visited till now.

Figure 17:
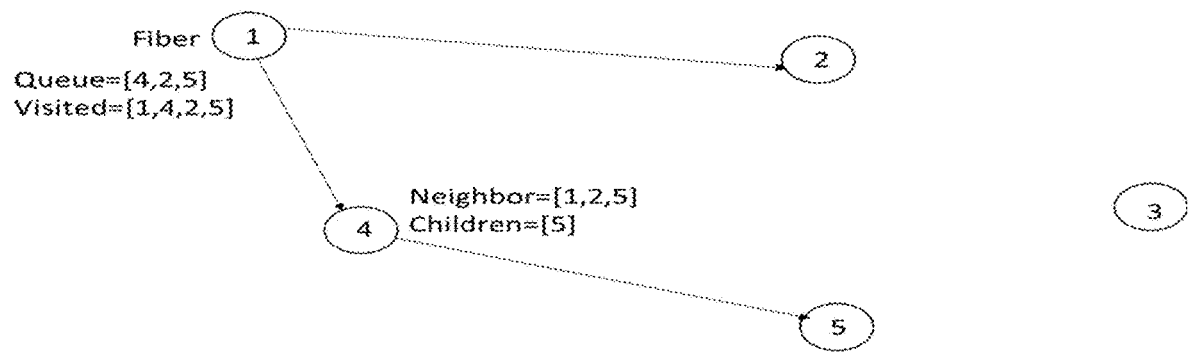
FIG. 17 illustrates a Step 3 of the third approach (best-node-first discovery) according to embodiments of the present disclosure.

FIG. 17 illustrates Step 3 of the third approach (best-node-first discovery) 1700 according to embodiments of the present disclosure. The embodiment of the Step 3 of the third approach (best-node-first discovery) 1700 illustrated in FIG. 17 is for illustration only. FIG. 17 does not limit the scope of this disclosure. In the further steps only best-node-first discovery algorithm is illustrated further. As illustrated in FIG. 17, Step 3: Node 4 may perform SLS and may discover neighbor nodes 1, 2 and 5. Since node 1 and node 2 have already been discovered the node 1 and the node may report that the node 1 and the node 2 have already been discovered but the node 1 and the node 2 report all the required measurement statistics and node 5 may be placed in the queue as selected by the node 4. Children=[5] represents the path to reach node 5 via node 4. Nodes 1, 4, 2, 5 remain visited.

Figure 18:
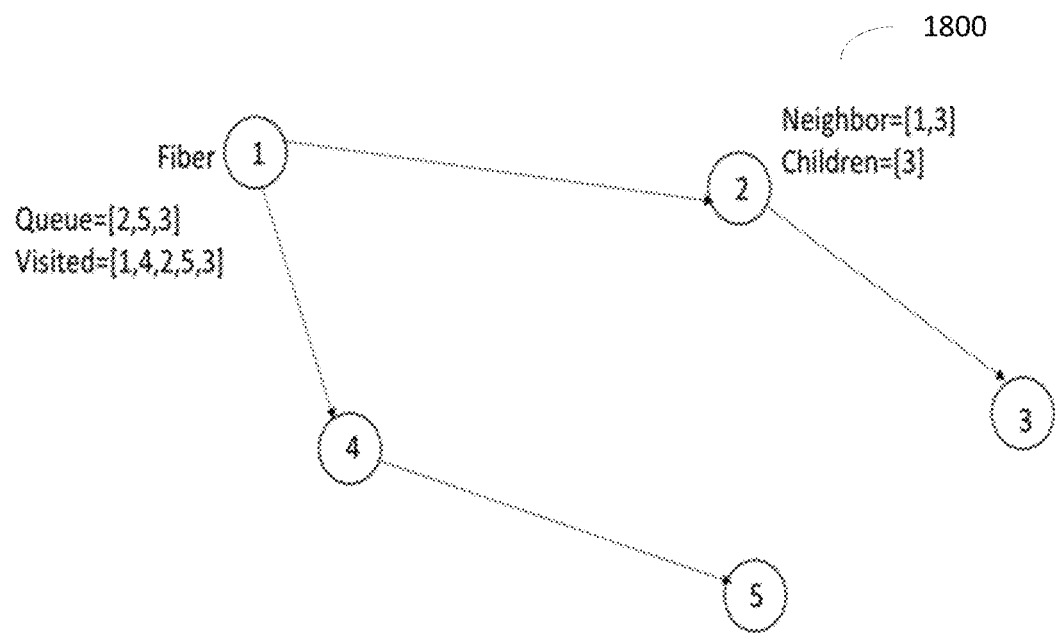
FIG. 18 illustrates a Step 4 of the third approach (best-node-first discovery) according to embodiments of the present disclosure.

FIG. 18 illustrates Step 4 of the third approach (best-node-first discovery) 1800 according to embodiments of the present disclosure. The embodiment of the Step 4 of the third approach (best-node-first discovery) 1800 illustrated in FIG. 18 is for illustration only. FIG. 18 does not limit the scope of this disclosure. As illustrated in FIG. 18, Step 4: Here node 2 performs SLS as the next element in the queue to be performed SLS. It may discover node 1 and node 3. But node 1 may report that the node 1 has already been discovered and thus only node 3 is considered in queue. Children=[3] represents path to reach node 3 via node 2. Nodes 1, 4, 2, 5, 3 remain visited.

Figure 19:
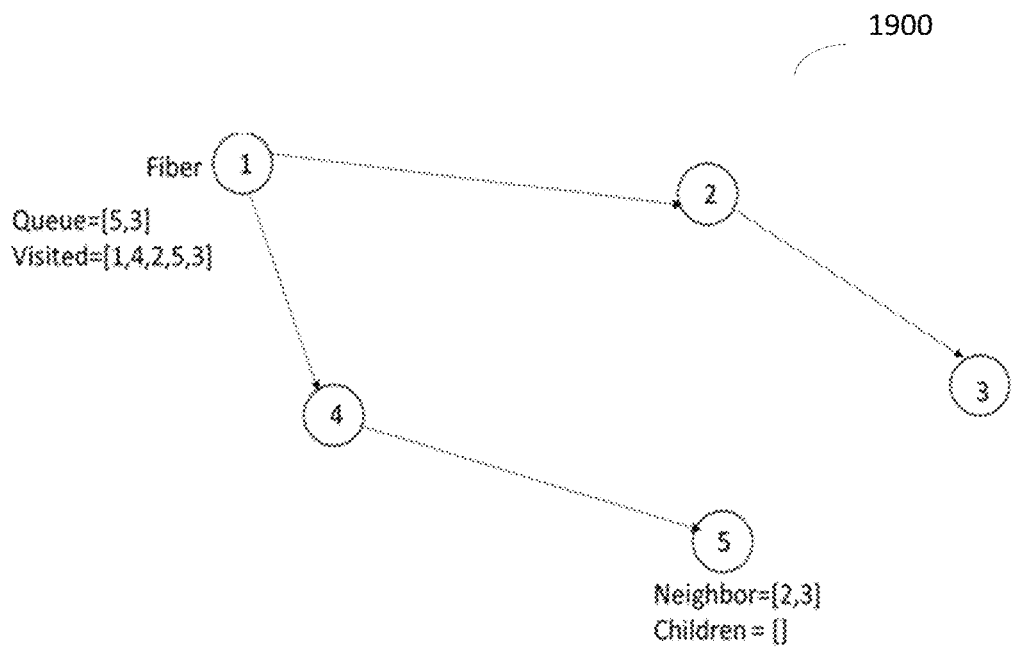
FIG. 19 illustrates a Step 5 of the third approach (best-node-first discovery) according to embodiments of the present disclosure.

FIG. 19 illustrates Step 5 of the third approach (best-node-first discovery) 1900 according to embodiments of the present disclosure. The embodiment of the Step 5 of the third approach (best-node-first discovery) 1900 illustrated in FIG. 19 is for illustration only. FIG. 19 does not limit the scope of this disclosure. As illustrated in FIG. 19, Step 5: Next element in the queue is 5 and performs SLS. It discovers neighbor node 2 and 3. But these nodes may report that these nodes have already been discovered and thus no nodes are placed in the queue. The required measurement metrics may be collected from the neighbor nodes but the required measurement metrics won't perform SLS again.

Figure 20:
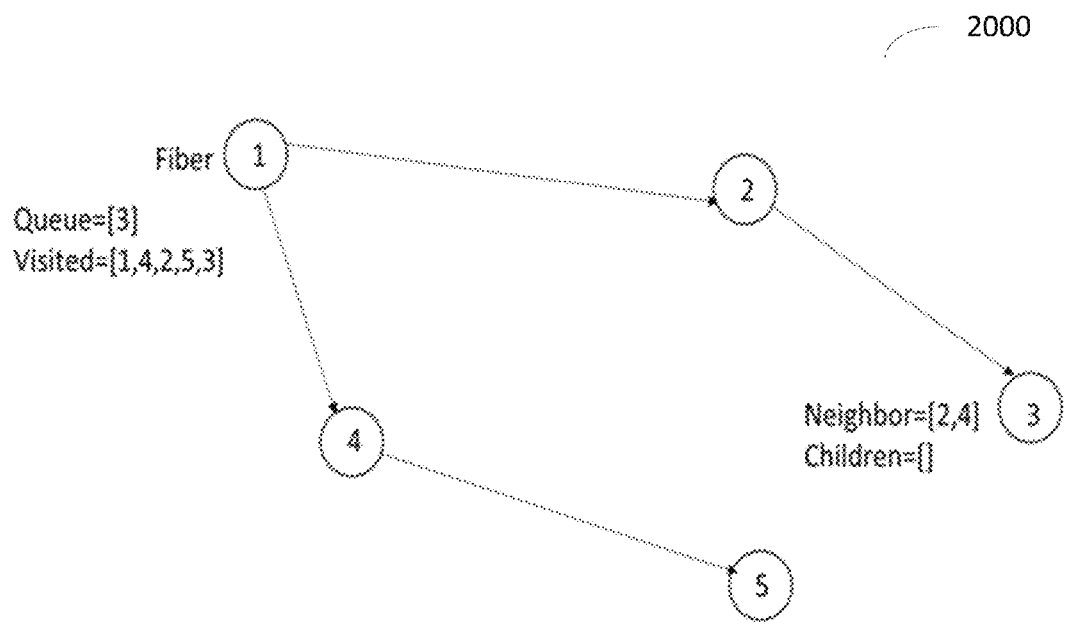
FIG. 20 illustrates another Step 5 of the third approach (best-node-first discovery) according to embodiments of the present disclosure.

FIG. 20 illustrates another Step 5 of the third approach (best-node-first discovery) 2000 according to embodiments of the present disclosure. The embodiment of the Step 5 of the third approach (best-node-first discovery) 2000 illustrated in FIG. 20 is for illustration only. FIG. 20 does not limit the scope of this disclosure. As illustrated in FIG. 20, Step 6: Similar to step 5, now node 3 may perform SLS and may discover nodes 2 and 4. Since those nodes have already been discovered the queue won't get updated. The above keeps repeating till all nodes are completely discovered.

Figure 21:
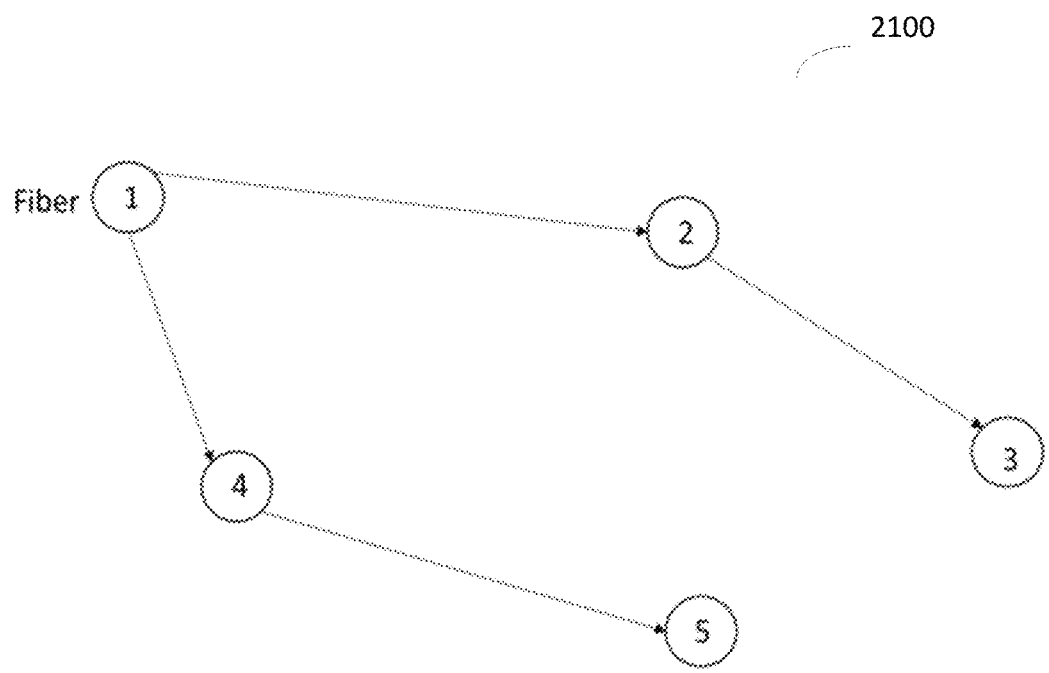
FIG. 21 illustrates a tree generated based on the third approach according to embodiments of the present disclosure.

FIG. 21 illustrates a tree 2100 generated based on the third approach according to embodiments of the present disclosure. The embodiment of the tree 2100 illustrated in FIG. 21 is for illustration only. FIG. 21 does not limit the scope of this disclosure.

Once the algorithm converges a tree is obtained rooted at the fiber node and for a given number of nodes, the number of tree depends on the number of fiber nodes. All the above mentioned signaling information has to be shared with the neighbors and has to carried all the way back to fiber node so that the neighborhood information can be easily received by the network controller node for further processing with respect to link selection and routing.

Figure 22:
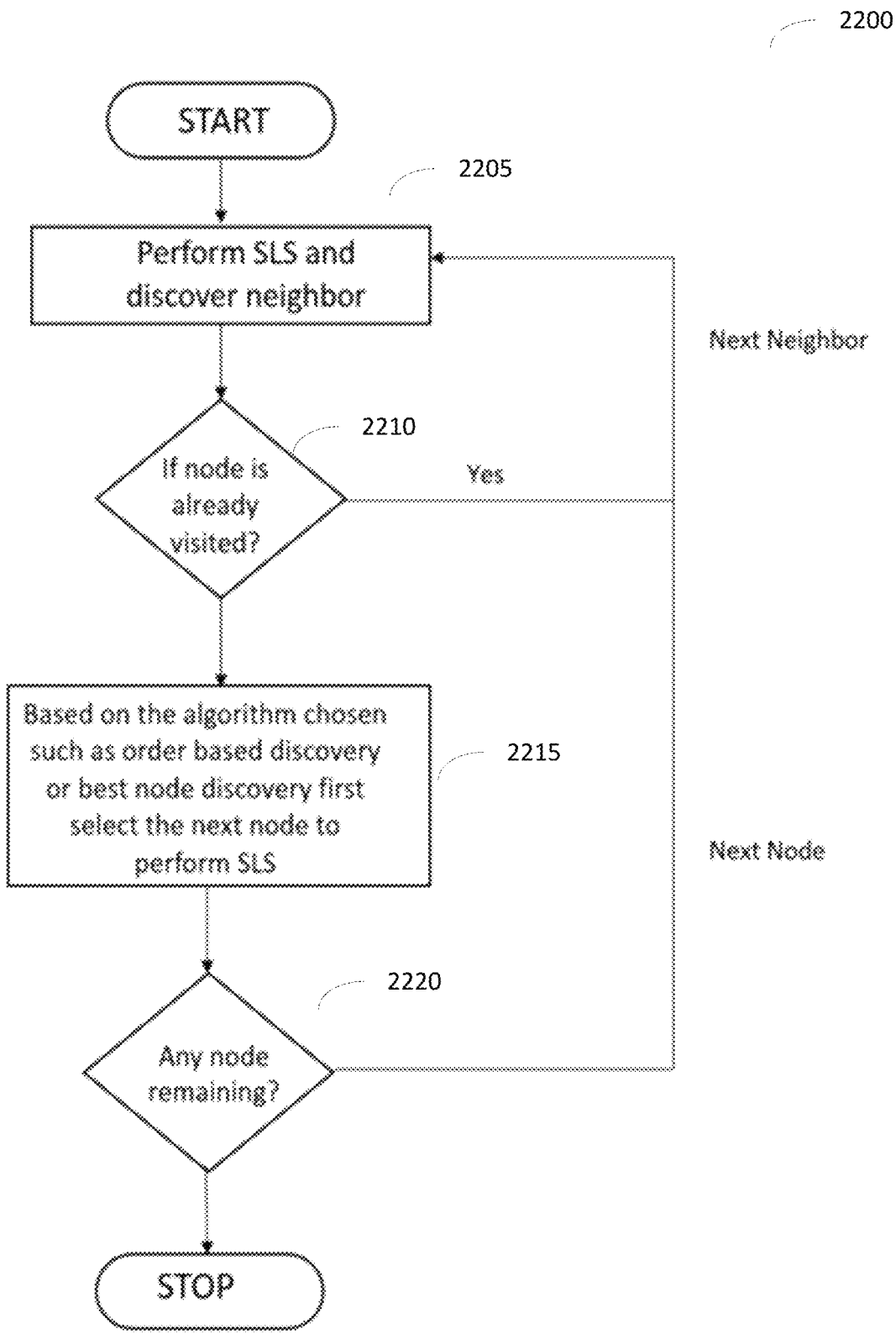
FIG. 22 illustrates a flow chart for the third approach method according to embodiments of the present disclosure.

FIG. 22 illustrates a flow chart for the third approach method 2200 according to embodiments of the present disclosure. The embodiment of the third approach method 2200 illustrated in FIG. 22 is for illustration only. FIG. 22 does not limit the scope of this disclosure.

As illustrated in FIG. 22, at step 2205, SLS is performed and neighbor is discovered. At step 2210, it is determined whether a node is already visited. At step 2210, if the node is not already visited, perform the step 2215. At step 2210, if the node is already visited, perform the step 2220. At step 2215, based on the algorithm chosen such as order based discovery or best node discovery, first select the next node to perform SLS. Finally, at step 2220, it is determined whether any node is remaining. At step 2220, if the node is not remained, the step 2205 is performed.

In one embodiment, different approach can be applied at different phases of the network operation. For example, the second approach can be applied at the network initialization phase. However at the network normal operation or maintenance phase, the first approach can be applied to one or more group of nodes in the network.

In one embodiment, the control signaling input to the relay node is the node type, i.e. transmitter or receiver and the associated configuration information as described in TABLE 3. At each time instance as illustrated in FIGS. 10A to 10E or FIGS. 13A to 13I, a new control signaling is applied to each node. The control signaling can be provided via an out-of-band control channel or via another node that has connection to the relay node.

TABLE 3

Control signaling inputs to relay node and corresponding relay node behavior/outputs

| Node type configuration | Associated configuration info | Corresponding relay node behavior and outputs |
|---|---|---|
| Transmitter | Transmission parameters for the discovery radio signal which are one or more of:<br>a) The node ID (e.g. SSID (for Wi-Fi), cell ID, Synchronization Signal Block (SSB) ID or NR)<br>b) The channel or carrier frequency for transmission (e.g. as channel ID)<br>c) The sectors for transmission (for node with multiple sectors) (e.g. the sector ID(s))<br>d) The number of transmit beams (for each sector)<br>e) The directions of transmit beams or the angular range of the transmit beams<br>f) The transmit power or the range of the transmit beams or sectors<br>g) The transmission signal sequence (e.g. Golay sequence in WiGig beacon, the synchronization signal sequence for LTE/NR)<br>h) The transmission timing information, i.e. when to begin the discovery radio signal transmission with respect to a reference clock (more generally the time-frequency allocation of the discovery radio signal)<br>i) The number of repetitions for each transmit beam instance for improving coverage or for facilitating detention based on directional receive beam | Transmission of discovery radio signal in accordance with the configured transmission parameters. |
| Receiver | Receiver and reporting parameters which are one or more of:<br>a) Discovery radio signal detection threshold (absolute energy level in dBm or SNR in dB) | Detection status of discovery radio signals, the identity of the node detected and the measurement report |

TABLE 3-continued

Control signaling inputs to relay node and corresponding relay node behavior/outputs

| Node type configuration | Associated configuration info | Corresponding relay node behavior and outputs |
|---|---|---|
| | b) Discovery radio signal detection angular range or scanning range<br>c) The detection/measurement channel(s)<br>d) The node(s) (and the corresponding sectors) to be detected (e.g. SSID (for Wi-Fi), cell ID, Synchronization Signal Block (SSB) ID or NR)<br>e) The signal sequence to be detected (e.g. Golay sequence in WiGig beacon, the synchronization signal sequence for LTE/NR)<br>f) Measurement reporting configurations<br>   i) The number of links to be reported (if not all detected links)<br>   ii) The criterion for selecting the links to be reported (e.g. power threshold, minimum beam spatial correlation)<br>   iii) One or more measurement metrics e.g. RSRP, SNR, SINR, RSSI, beam correlation metric (with respect to a reference beam), Angle of Arrival (AoA), Time of Flight (ToF) | according to the measurement configurations |

Figure 23:
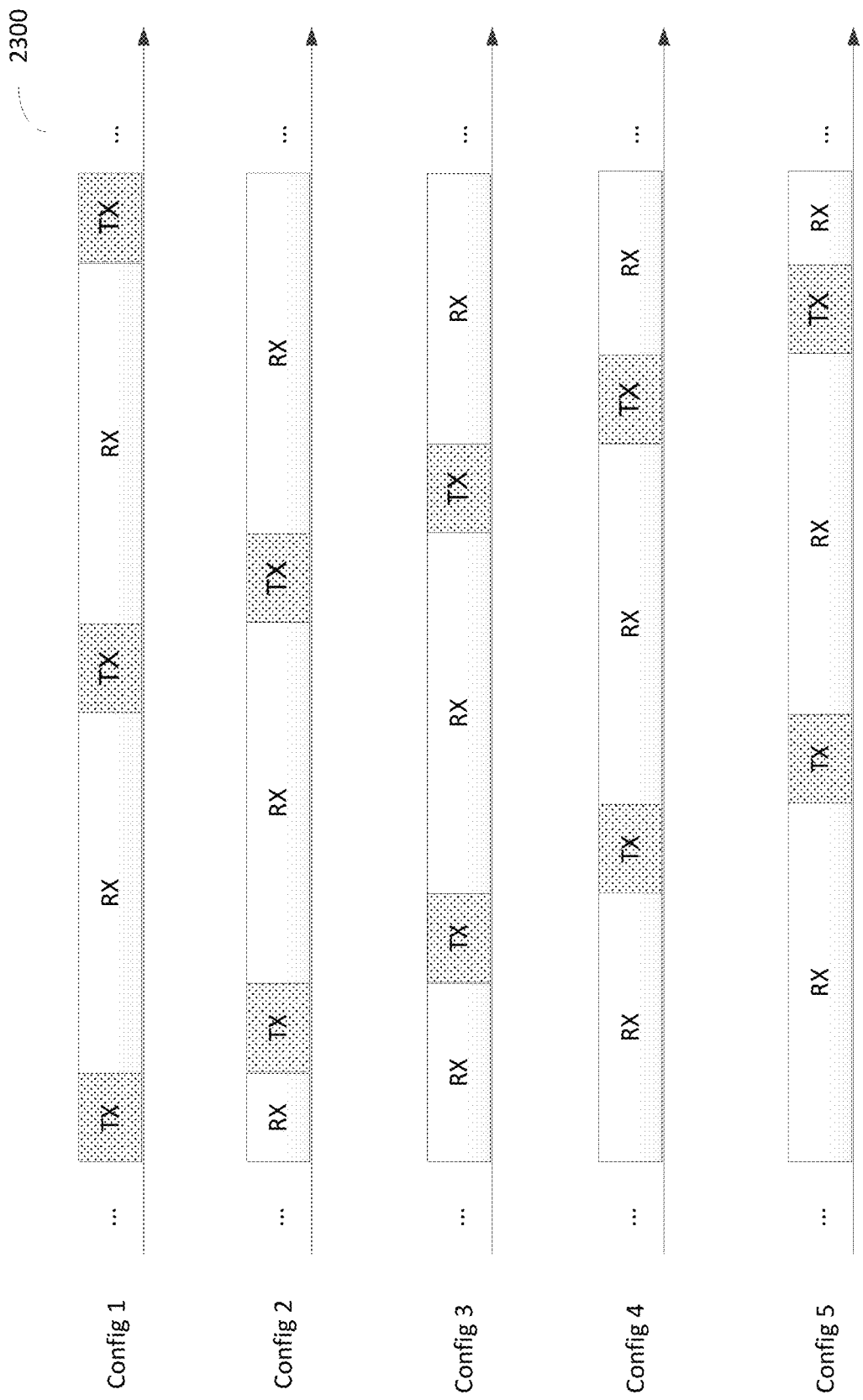
FIG. 23 illustrates configurations of Tx and Rx pattern over time according to embodiments of the present disclosure.

In another embodiment, the node discovery control configuration over a time period can be signaled to all nodes in one time to realize the steps as illustrated in FIGS. 10A to 10E. In particular, a configuration can be defined to specify a discovery radio signal transmission pattern over time (time offset and periodicity) as well as a detection/measurement pattern over time. For example, five configurations can be defined as shown in FIG. 23, and each node in the example of FIGS. 10A to 10E can be signaled with different configuration. After performing the Tx and Rx pattern for a time duration, the measurement results can then be reported.

FIG. 23 illustrates configurations of Tx and Rx pattern 2300 over time according to embodiments of the present disclosure. The embodiment of the configurations of Tx and Rx pattern 2300 illustrated in FIG. 23 is for illustration only. FIG. 23 does not limit the scope of this disclosure.

It is noted that not all parameters are relevant or possible depending on the capability of the physical layer radio technology assumed for the mesh network deployment. Relay nodes may also have different capability depending on the supported version and design. The capability of the nodes can be first reported to the network controller e.g. as part of the node registration message, in order to enable proper node discovery configuration by the network controller.

The objective for link selection is to enable the network to maintain sufficiently small set of links to reduce the operation overhead of maintaining the links subjected to ensuring a minimum robustness, reliability and performance of the network.

Figure 24:
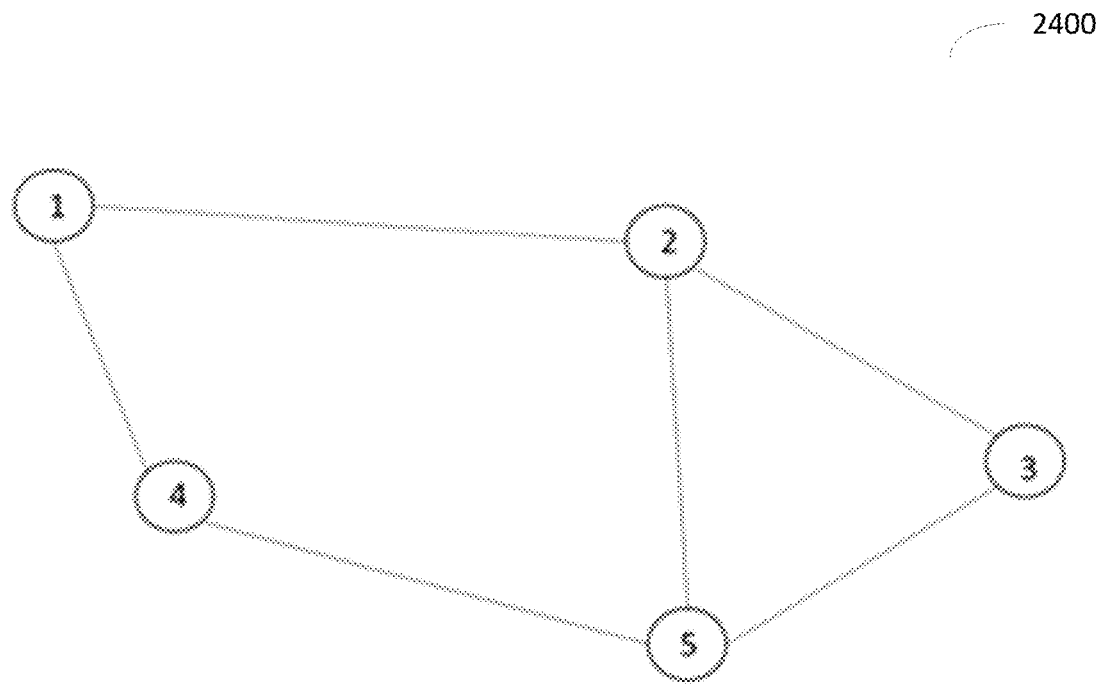
FIG. 24 illustrates a network topology after the first pruning operation according to embodiments of the present disclosure.

FIG. 24 illustrates a network topology 2400 after the first pruning operation according to embodiments of the present disclosure. The embodiment of the network topology 2400 illustrated in FIG. 24 is for illustration only. FIG. 24 does not limit the scope of this disclosure.

In a first method of link selection, the links with qualities that are above a threshold are selected. For the example in TABLE 1E, if the threshold is configured to be 23, the link between node 3 and node 4 is removed, which results in the final network topology as shown in FIG. 24.

TABLE 4

Links after pruning based on link quality

| Nodes<br>{row: TX (AP), column: RX (STA)} | 1 | 2 | 3 | 4 | 5 |
|---|---|---|---|---|---|
| 1 | — | 32.7 | — | 36.3 | — |
| 2 | 31.9 | — | 42.1 | — | 33 |
| 3 | — | 41.4 | — | ~~20.3~~ | 38.6 |
| 4 | 36 | — | ~~19.7~~ | — | 27.3 |
| 5 | — | 32.5 | 38 | 28 | — |

Figure 25:
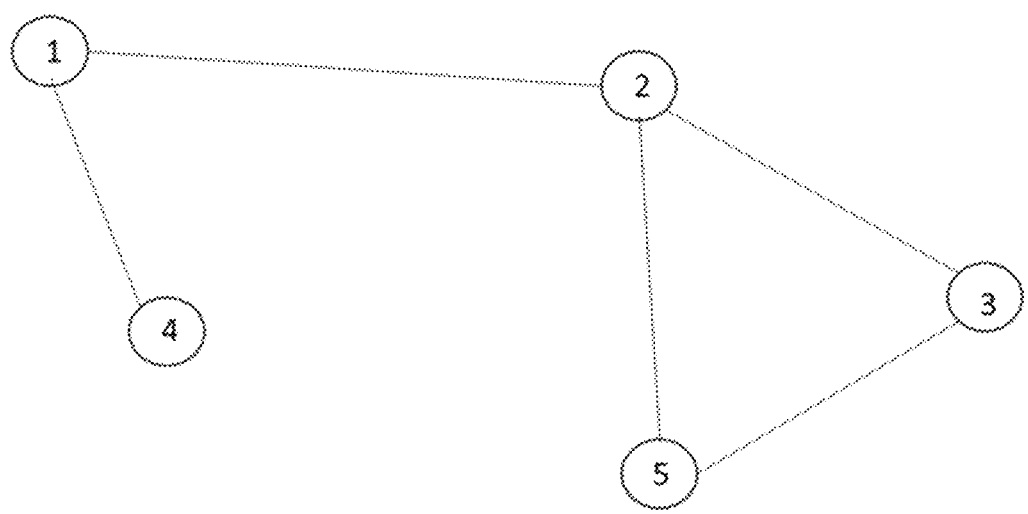
FIG. 25 illustrates an over-pruning according to embodiments of the present disclosure.

FIG. 25 illustrates an over-pruning 2500 according to embodiments of the present disclosure. The embodiment of the over-pruning 2500 illustrated in FIG. 25 is for illustration only. FIG. 25 does not limit the scope of this disclosure.

Careful design consideration for threshold is required or else tree or disjoint set nodes are obtained. For example if the threshold is set to 30, then the link between node 4 and node 5 is removed as shown in FIG. 25.

In a second method of link selection, there is a maximum number of links that can be connected with a node. The link with the best quality is selected first, followed by the second best, and so on, until the maximum number per node is reached. For example, if the maximum number per node is 2, the link from node 3 to node 4, and the link from node 5 to node 2 are removed as shown in TABLE 5.

Figure 26:
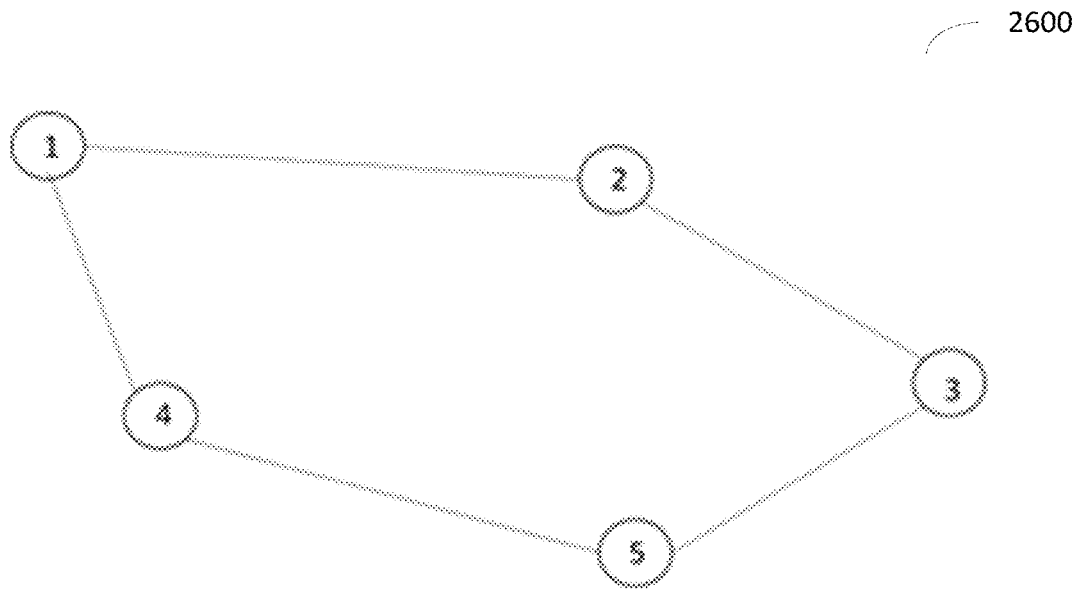
FIG. 26 illustrates a network topology after the second pruning operation according to embodiments of the present disclosure.

FIG. 26 illustrates a network topology 2600 after the second pruning operation according to embodiments of the present disclosure. The embodiment of the network topology 2600 illustrated in FIG. 26 is for illustration only. FIG. 26 does not limit the scope of this disclosure. FIG. 26 illustrates the final network topology outcome.

TABLE 5

Links after pruning based on link quality and the maximum number of links per node

| Nodes {row: TX (AP), column: RX (STA)} | 1 | 2 | 3 | 4 | 5 |
|---|---|---|---|---|---|
| 1 | — | 32.7 | — | 36.3 | — |
| 2 | 31.9 | — | 42.1 | — | 26 |
| 3 | — | 41.4 | — | ~~20.3~~ | 38.6 |
| 4 | 36 | — | ~~19.7~~ | — | 27.3 |
| 5 | — | ~~25.8~~ | 38 | 28 | — |

Although the examples above do not explicitly show the sectors or panels of each node, the protocol can be easily extended to consider node with multiple sectors or panels.

In a third method of link selection, links that are spatially correlated are deprioritized from selection. In other words, links that do not meet a minimum spatial correlation threshold with respect to a stronger link are deprioritized from selection. The benefit of this link selection criterion is to improve spatial diversity such that a signal blockage event is less likely to result in blockage of the other links.

In one embodiment, it can be beneficial to impose a half-duplex constraint to each node, i.e. each node is either transmitting or receiving at any one time but not both. This avoids self-interference where the signal transmission the node interferes with the signal reception of the node. One way of ensuring the half duplex constraint is to set up the network as a bipartite graph (i.e. no odd cycle exists in the graph). In one method of generating the bipartite graph, the donor BS node is assigned as node of tier 0. The nodes that are connected to tier 0 are assigned as tier 1 and so on. The process repeats until all nodes have been assigned a tier index. Only links between adjacent tiers are kept and rest all the links are removed. For example links between nodes of the same tier is removed. The final network may not have any odd cycle. Referring to the network as illustrated in FIG. 24 as an example, the network after performing the aforementioned steps is illustrated in FIG. 27.

Figure 27:
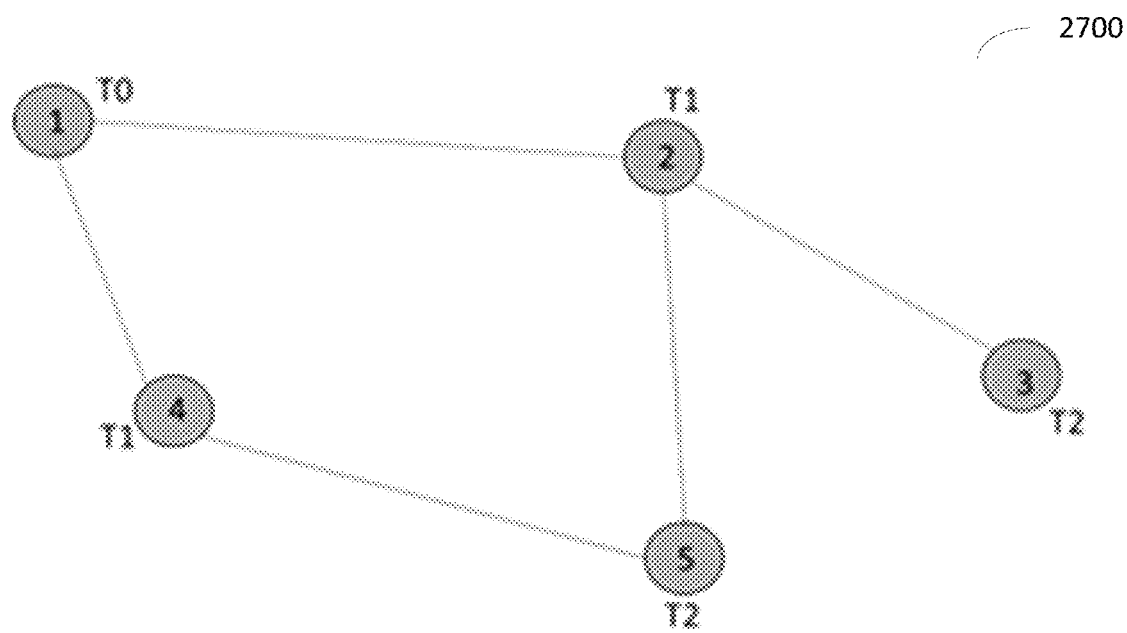
FIG. 27 illustrates another network topology after the second pruning operation according to embodiments of the present disclosure.

FIG. 27 illustrates another network topology 2700 after the second pruning operation according to embodiments of the present disclosure. The embodiment of the network topology 2700 illustrated in FIG. 27 is for illustration only. FIG. 27 does not limit the scope of this disclosure.

Figure 28A:
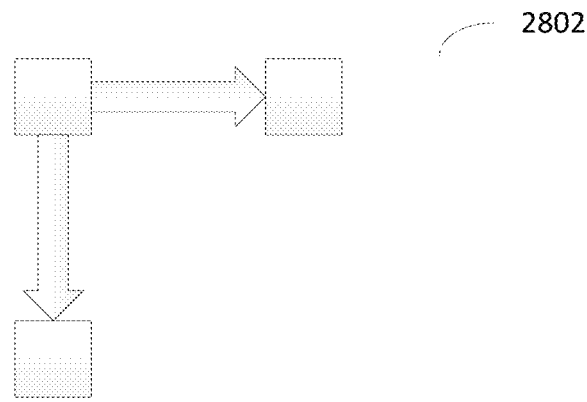
FIG. 28A illustrates different cases of multiple transmission/receptions of Multi-Tx according to embodiments of the present disclosure.

FIG. 28A illustrates different cases of multiple transmission/receptions of Multi-Tx 2802 according to embodiments of the present disclosure. The embodiment of the multiple transmission/receptions of Multi-Tx 2802 illustrated in FIG. 28A is for illustration only. FIG. 28A does not limit the scope of this disclosure.

Figure 28B:
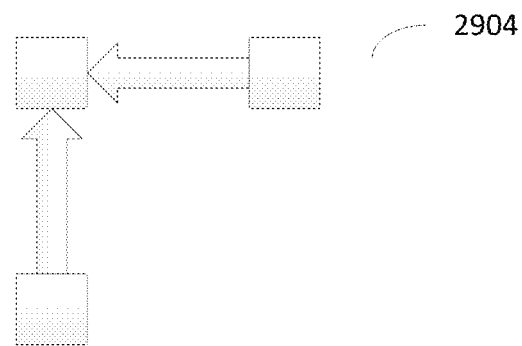
FIG. 28B illustrates different cases of multiple transmission/receptions of Multi-Rx according to embodiments of the present disclosure.

FIG. 28B illustrates different cases of multiple transmission/receptions of Multi-Rx 2804 according to embodiments of the present disclosure. The embodiment of the multiple transmission/receptions of Multi-Rx 2804 illustrated in FIG. 28B is for illustration only. FIG. 28B does not limit the scope of this disclosure.

Figure 28C:
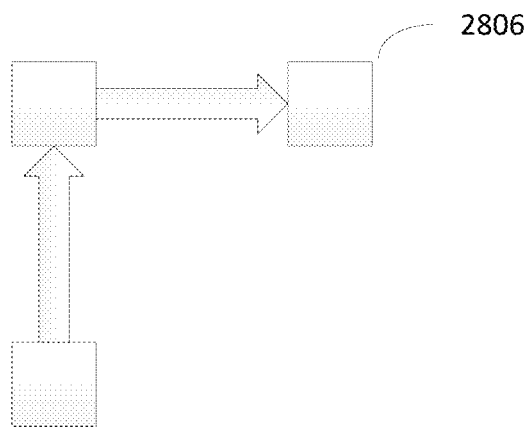
FIG. 28C illustrates different cases of multiple transmission/receptions of Multi-Tx-Rx according to embodiments of the present disclosure.

FIG. 28C illustrates different cases of multiple transmission/receptions of Multi-Tx-Rx 2806 according to embodiments of the present disclosure. The embodiment of the multiple transmission/receptions of Multi-Tx-Rx 2806 illustrated in FIG. 28C is for illustration only. FIG. 28C does not limit the scope of this disclosure.

If there is only one operating channel for a mesh network with multiple radio nodes, self-interference can be a serious issue. To reduce the self-interference, each node can only either transmit or receive at a given time. For example in FIGS. 28A to 28C, FIG. 28A and FIG. 28B are allowed, while FIG. 28C is NOT allowed due to possible large self-interference.

Figure 29A:
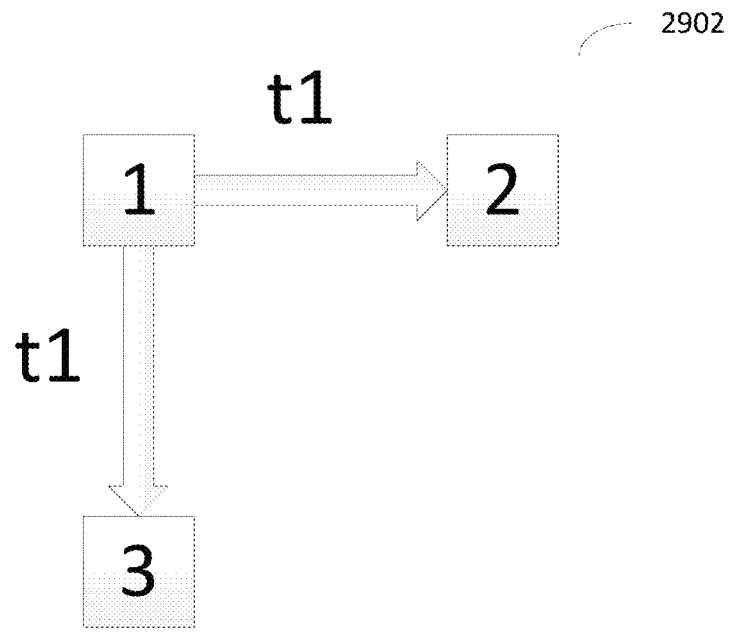
FIG. 29A illustrates a TDD based protocol of Multi-Tx according to embodiments of the present disclosure.

FIG. 29A illustrates a TDD based protocol of Multi-Tx 2902 according to embodiments of the present disclosure. The embodiment of the TDD based protocol of Multi-Tx 2902 illustrated in FIG. 29A is for illustration only. FIG. 29A does not limit the scope of this disclosure.

Figure 29B:
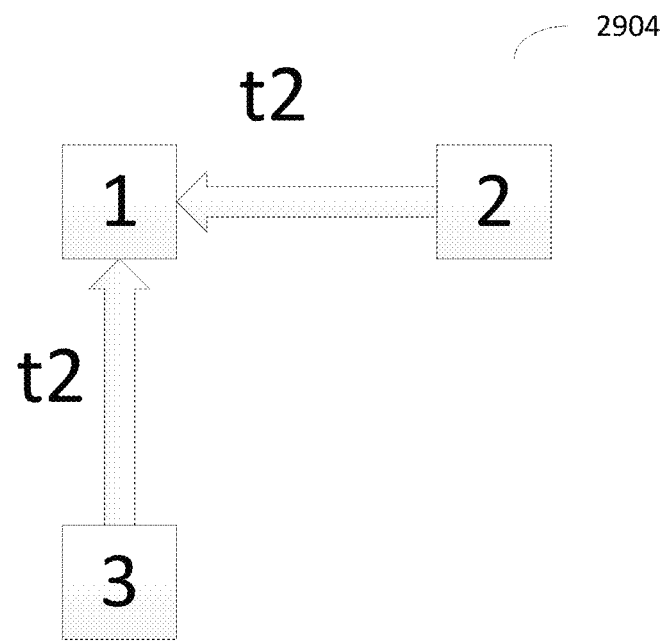
FIG. 29B illustrates a TDD based protocol of Multi-Rx according to embodiments of the present disclosure.

FIG. 29B illustrates a TDD based protocol of Multi-Rx 2904 according to embodiments of the present disclosure. The embodiment of the TDD based protocol of Multi-Rx 2904 illustrated in FIG. 29B is for illustration only. FIG. 29B does not limit the scope of this disclosure.

To reduce the interference, a TDD transmission mode is provided, which is shown in the FIGS. 29A and 29B. In the odd timeslots, all the sectors of node 1 are transmitting while the sectors in node 2 and 3 are receiving. In the even timeslots, all the sectors of node 1 are receiving while the sectors in node 2 and 3 are transmitting. To achieve the TDD mode with the commercial Wi-Fi chipset, there are two problems. First, the CSMA mechanism used in Wi-Fi has to be disabled. Second, the ACK/Block ACK cannot be transmitted immediately and has to be rescheduled to the next suitable timeslot.

If there are multiple operating channels, then the aforementioned problems are no longer relevant. In addition, interference can be reduced and the network capacity can be improved as well. The channel allocation problem can be solved by "edge-coloring" algorithms. The nodes in the mesh network are treated as vertices in a graph while the links between nodes as edges. The "colors" are corresponding to the channels in the mesh networks. The "edge-coloring algorithms" may "color" the edges adjacent to the same vertex with different "colors". In other words, the links connected to the same node are assigned with different channels.

Figure 30:
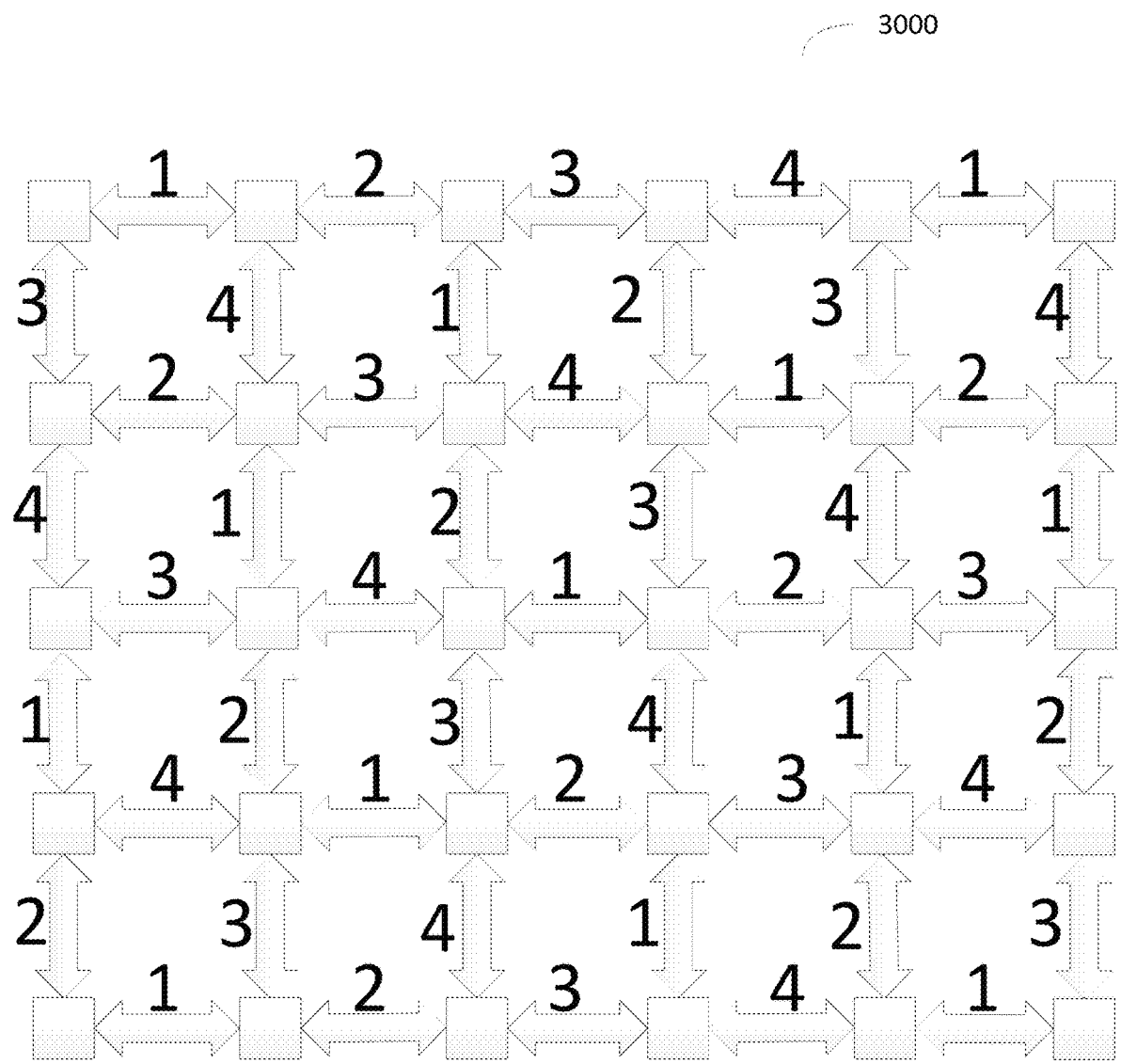
FIG. 30 illustrates a channel allocation in a street grid network according to embodiments of the present disclosure.

FIG. 30 illustrates a channel allocation 3000 in a street grid network according to embodiments of the present disclosure. The embodiment of the channel allocation 3000 illustrated in FIG. 30 is for illustration only. FIG. 30 does not limit the scope of this disclosure.

It is illustrated to allocate channels using an example of a street grid deployment scenario where the nodes are deployed on a square/rectangular grid. Each node is assumed to have four antenna panels. When there are four channels available, a scheme to allocate the channels is shown in FIG. 30, where the numbers in the figure are the channel indices. For each node, different sectors use different channels.

Figure 31:
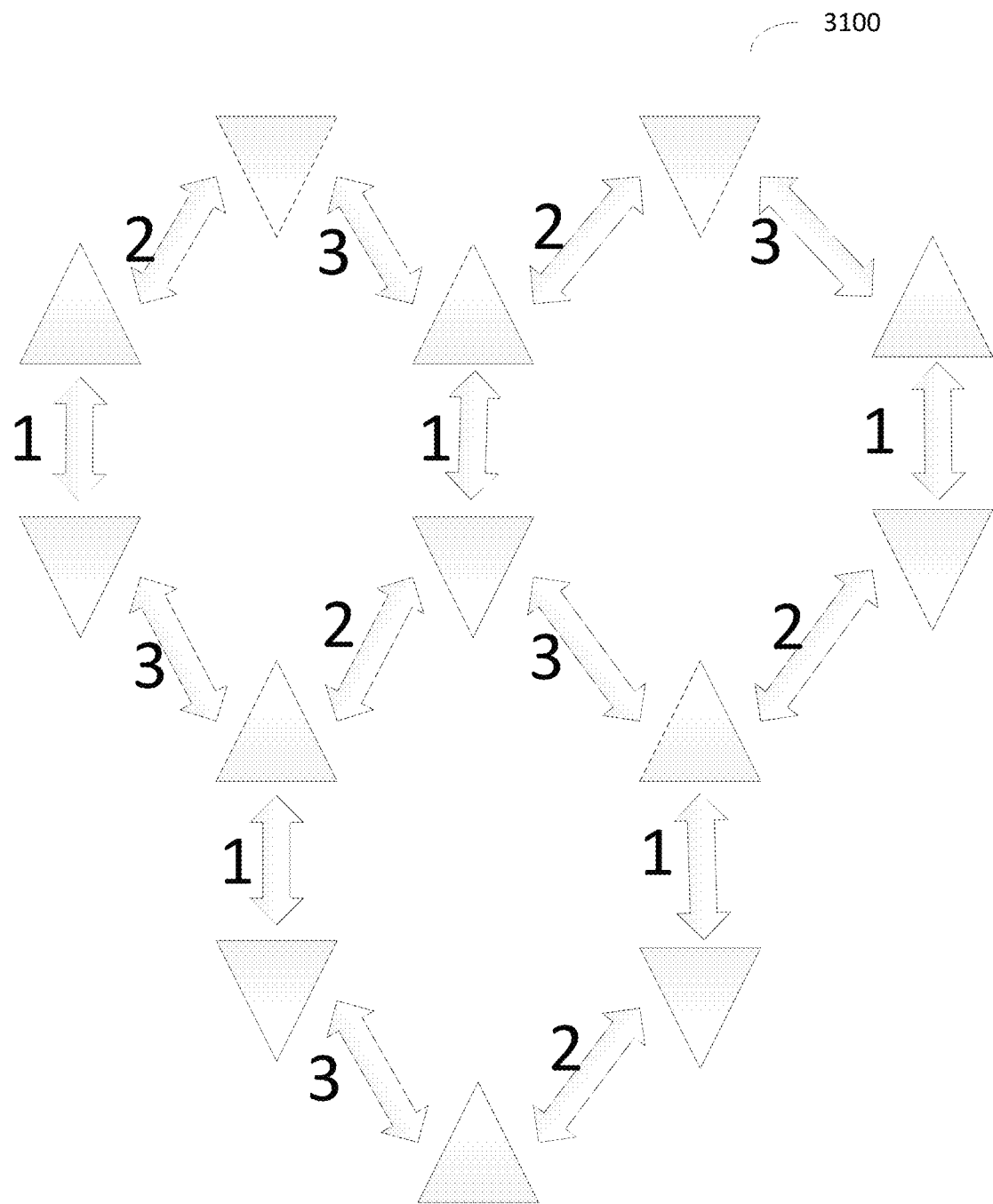
FIG. 31 illustrates a channel allocation in a hexagonal grid network according to embodiments of the present disclosure.

FIG. 31 illustrates a channel allocation 3100 in a hexagonal grid network according to embodiments of the present disclosure. The embodiment of the channel allocation 3100 illustrated in FIG. 31 is for illustration only. FIG. 31 does not limit the scope of this disclosure.

In a second example, nodes have three sectors and are deployed on a hexagonal grid. A provided channel allocation is shown in FIG. 31. Three channels are enough in this example.

An example of an edge coloring algorithm is the greedy algorithm. For edge-coloring, the number of colors cannot be less than the maximum degree $\Delta$ of the graph. In addition, by Vizing's theorem, the edges of every simple undirected graph may be colored using a number of colors that is at most one larger than the maximum degree $\Delta$ of the graph. Therefore, the required number of colors is between $\Delta$ and $\Delta+1$.

Until now, it is assumed that there are enough colors/channels. If a certain node in the mesh network has more sectors than the number of available channels, the edge-coloring algorithm has no solution. In this case, it may be indicated to relax the constraint by allowing the certain node to use the same channel(s) more than once.

The self-interference is mainly due to the side-lobe leakage and the energy of the side-lobe tends to be small when the side-lobe is far away from the main-lobe. Therefore, the sectors of the same node with large angle separation can be allowed to use the same channel. The angle separation threshold can be chosen according to the hardware capability or implementation, the number of channels and the maximum degree of the network. For example, the threshold is infinity in our previous examples where self-interference is not allowed. The channel allocation problem is solved by formulating a vertex-coloring problem. Each link in the mesh network is treated as a vertex.

Figure 32A:
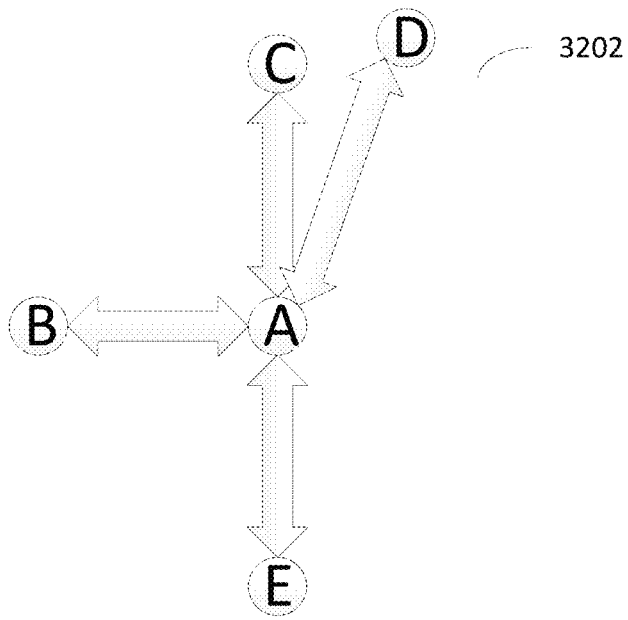
FIG. 32A illustrates an original network topology and corresponding line graphs for two different threshold choices according to embodiments of the present disclosure.

FIG. 32A illustrates an original network topology and corresponding line graphs 3202 for two different threshold choices according to embodiments of the present disclosure. The embodiment of the original network topology and corresponding line graphs 3202 illustrated in FIG. 32A is for illustration only. FIG. 32A does not limit the scope of this disclosure.

Figure 32B:
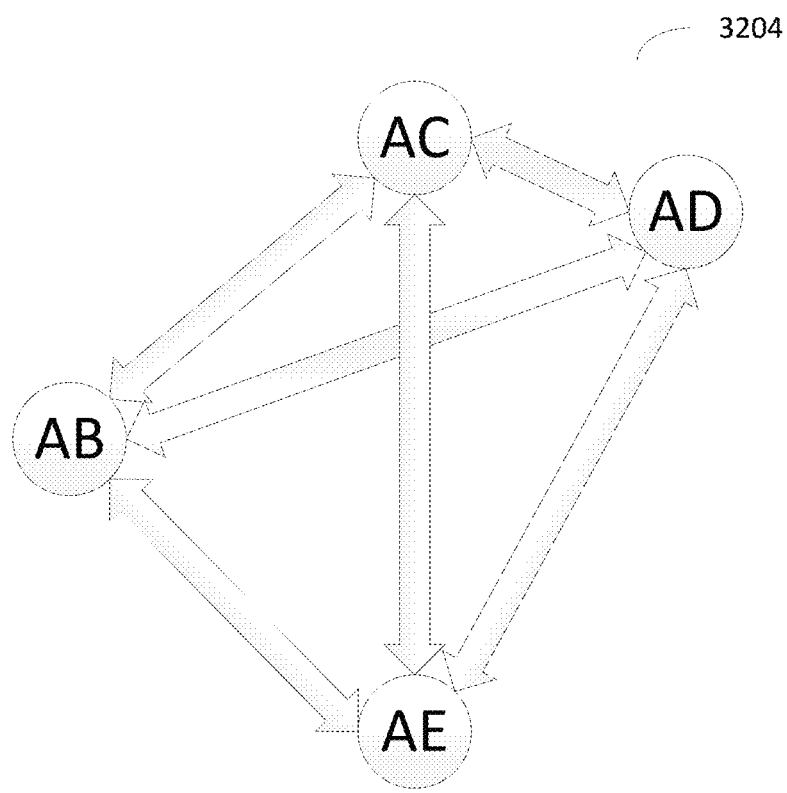
FIG. 32B illustrates another original network topology and corresponding line graphs for two different threshold choices according to embodiments of the present disclosure.

FIG. 32B illustrates another original network topology and corresponding line graphs 3204 for two different threshold choices according to embodiments of the present disclosure. The embodiment of the original network topology and corresponding line graphs 3204 illustrated in FIG. 32B is for illustration only. FIG. 32B does not limit the scope of this disclosure.

Figure 32C:
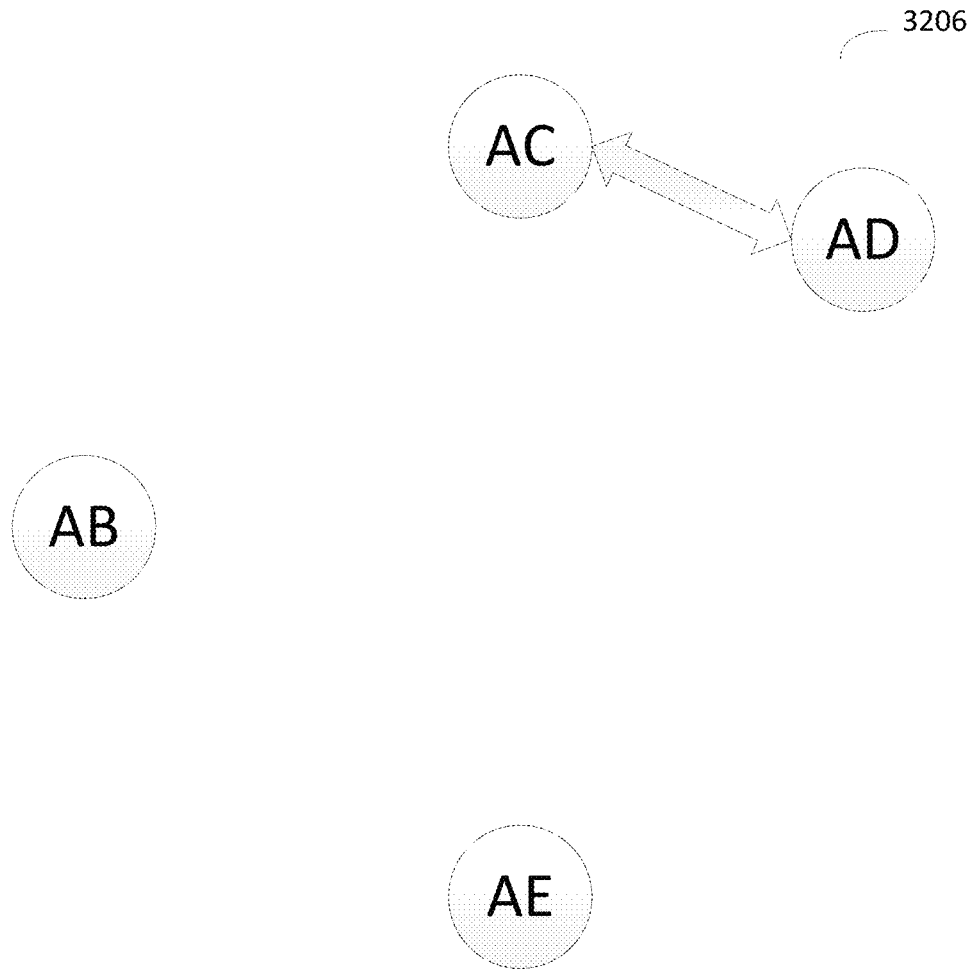
FIG. 32C illustrates yet another original network topology and corresponding line graphs for two different threshold choices according to embodiments of the present disclosure.

FIG. 32C illustrates yet another original network topology and corresponding line graphs 3206 for two different threshold choices according to embodiments of the present disclosure. The embodiment of the original network topology and corresponding line graphs 3206 illustrated in FIG. 32C is for illustration only. FIG. 32C does not limit the scope of this disclosure.

When the angle separation is less than the threshold, there is an edge connecting the two vertices representing the two links. After constructing the graph, then the vertex-coloring algorithm can be used. In the example shown in FIG. 32A, Node A, equipped with four sectors, connects to Node B, C, D and E in the network. To apply vertex coloring algorithm, the network is converted into the corresponding line graphs shown in FIGS. 32B and 32C.

A line graph of a graph G is another graph L(G) that represents the adjacencies between edges of G. In FIGS. 32B and 32C, there are 4 vertices representing the four links A-B, A-C, A-D and A-E. In FIG. 32B, the threshold is 0° and all the four vertices are connected. Therefore, link A-B, A-C, A-D and A-E may be colored with different colors/channels in the following vertex-coloring algorithm. In contrast, there is only one edge in FIG. 32C where the threshold is assumed to be 60°. Therefore, only the link A-C and A-D have to use different colors/channels.

The following figure shows another example of allocating two channels in a street grid network. The links on the horizontal direction are using the channel 1 while the links on the vertical direction are using the channel 2. Note that in this example, the links with 180 degrees separation are transmitting on the same channel.

Figure 33:
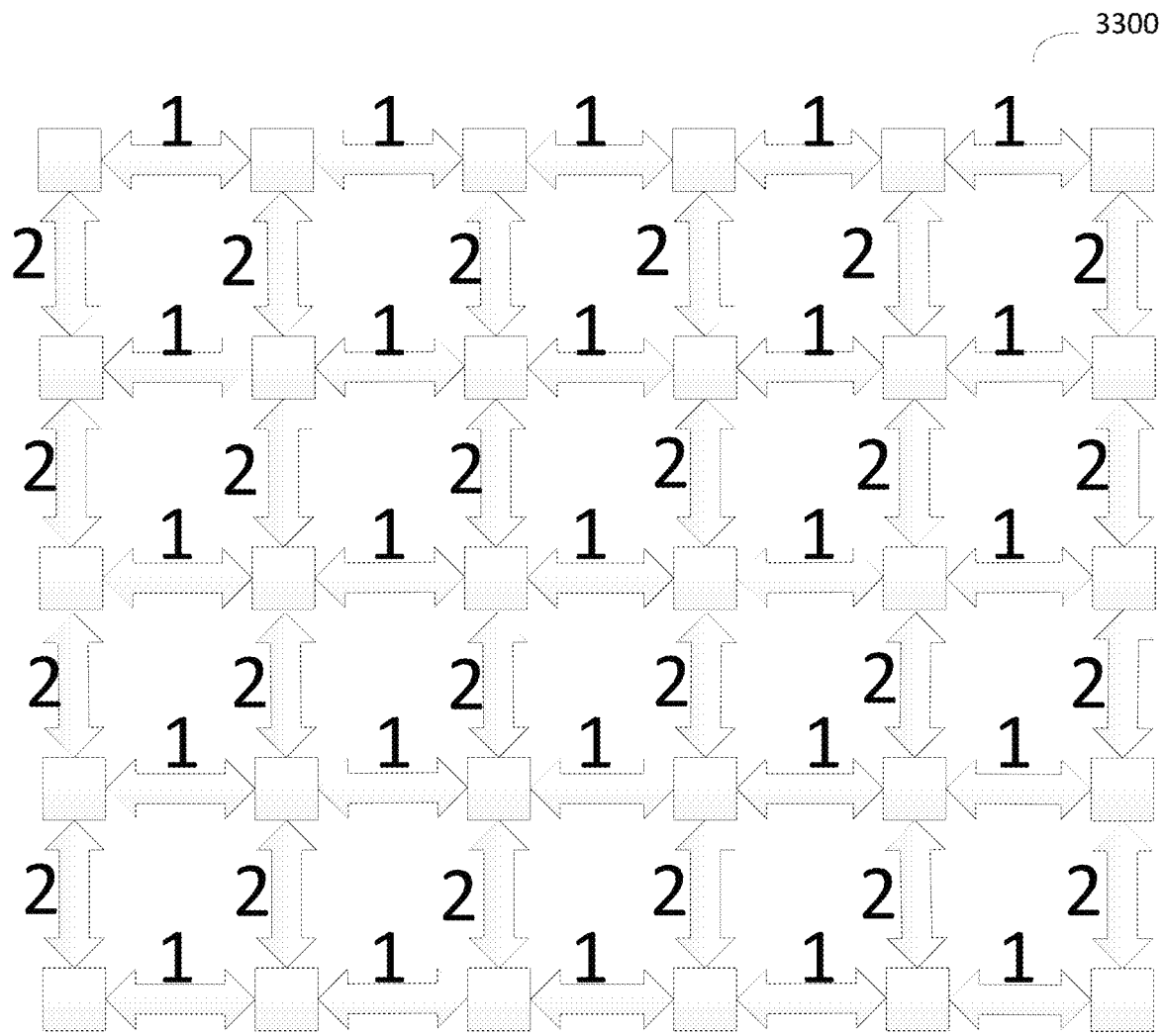
FIG. 33 illustrates a channel allocation in a street grid network with two channels according to embodiments of the present disclosure.

FIG. 33 illustrates a channel allocation 3300 in a street grid network with two channels according to embodiments of the present disclosure. The embodiment of the channel allocation 3300 illustrated in FIG. 33 is for illustration only. FIG. 33 does not limit the scope of this disclosure.

Last, the inputs and outputs of the method can be found in TABLE 6. The number of channels, network topology and threshold angle are the inputs. The method may output whether a feasible solution is found. If found, the channel allocation may be output.

Figure 34:
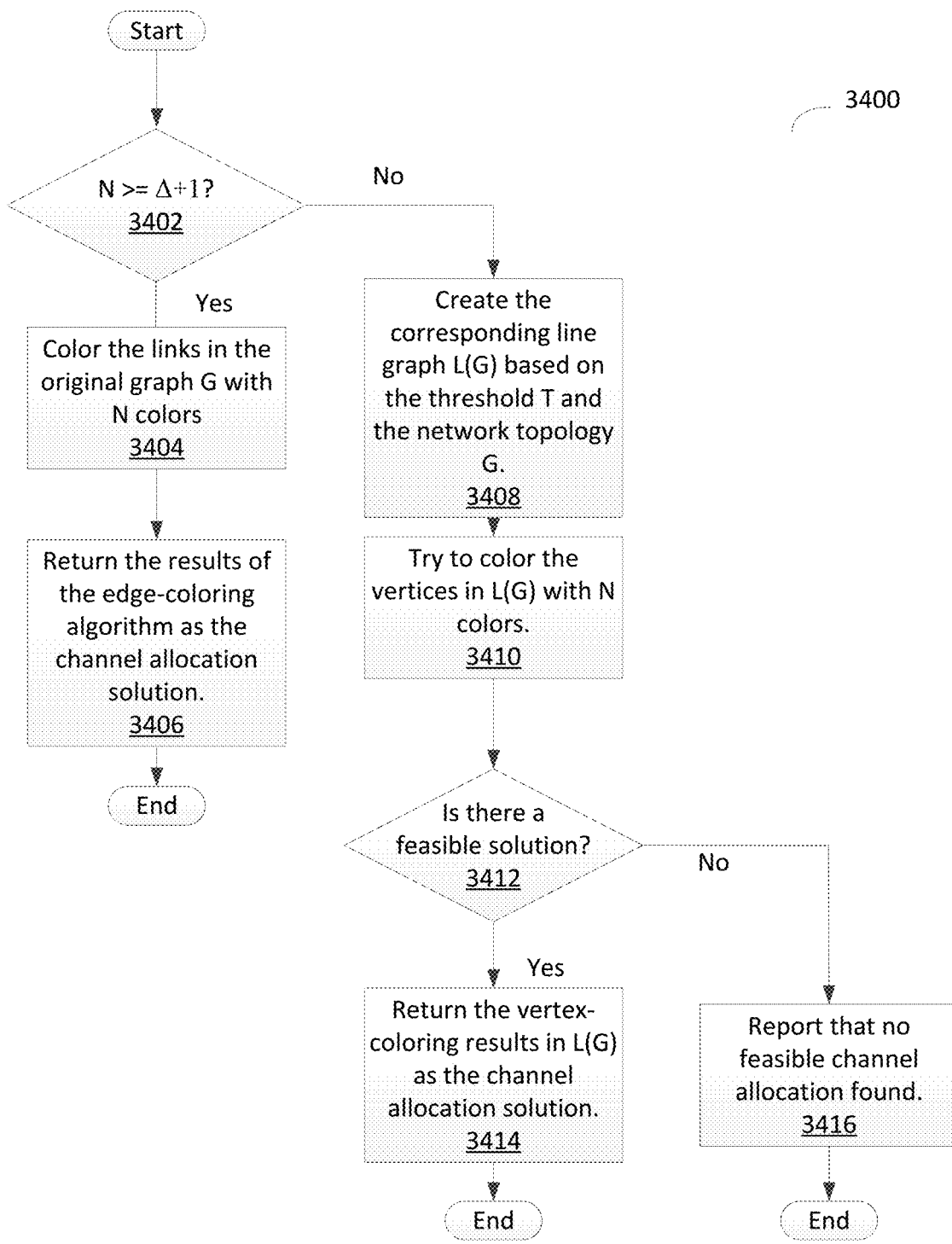
FIG. 34 illustrates a flow chart of a channel allocation method according to embodiments of the present disclosure.

FIG. 34 illustrates a flow chart of a channel allocation method 3400 according to embodiments of the present disclosure. The embodiment of the channel allocation method 3400 illustrated in FIG. 34 is for illustration only. FIG. 34 does not limit the scope of this disclosure.

The channel allocation method is summarized in the flow chart shown in FIG. 34. At step 3402, the method first checks whether N is larger than or equal to Δ+1. If yes, perform step 3404. At step 3404, there is always a feasible channel allocation by Vizing's theorem. At step 3406, the results of the edge-coloring algorithm are returned as the channel allocation solution.

At step 3402, if N is less than Δ+1, perform step 3408. At step 3408, the corresponding line graph L(G) based on the threshold T and the network topology G is created. At step 3410, it is performed to color the vertices in L(G) with N colors. At step 3412, it is determined whether there is a feasible solution. At step 3412, if there is a feasible solution, perform step 3414. At step 3414, the vertex-coloring results in L(G) as the channel allocation solution is returned. At step 3412, if there is no solution, perform step 3416. At step 3416, it is reported that no feasible channel allocation found.

3412 Otherwise, a corresponding graph is created and the vertex-coloring algorithm is performed. The algorithm can be executed in a central controller that controls or manages the mesh network topology. The inputs are collected from the mesh nodes via a control channel which can be an in-band control channel or an out-of-band control channel; the outputs which are the channel allocation decisions are transmitted and configured to each mesh node via the control channel.

TABLE 6

The inputs and outputs of the channel allocation method

| Input: | Output: |
| --- | --- |
| N: Number of channels | Report whether a feasible solution is found. |
| G: Network topology (maximum degree of G is denoted as Δ) | If yes, return the channel allocation for each link in G. |
| T: Threshold angle | |

Figure 35A:
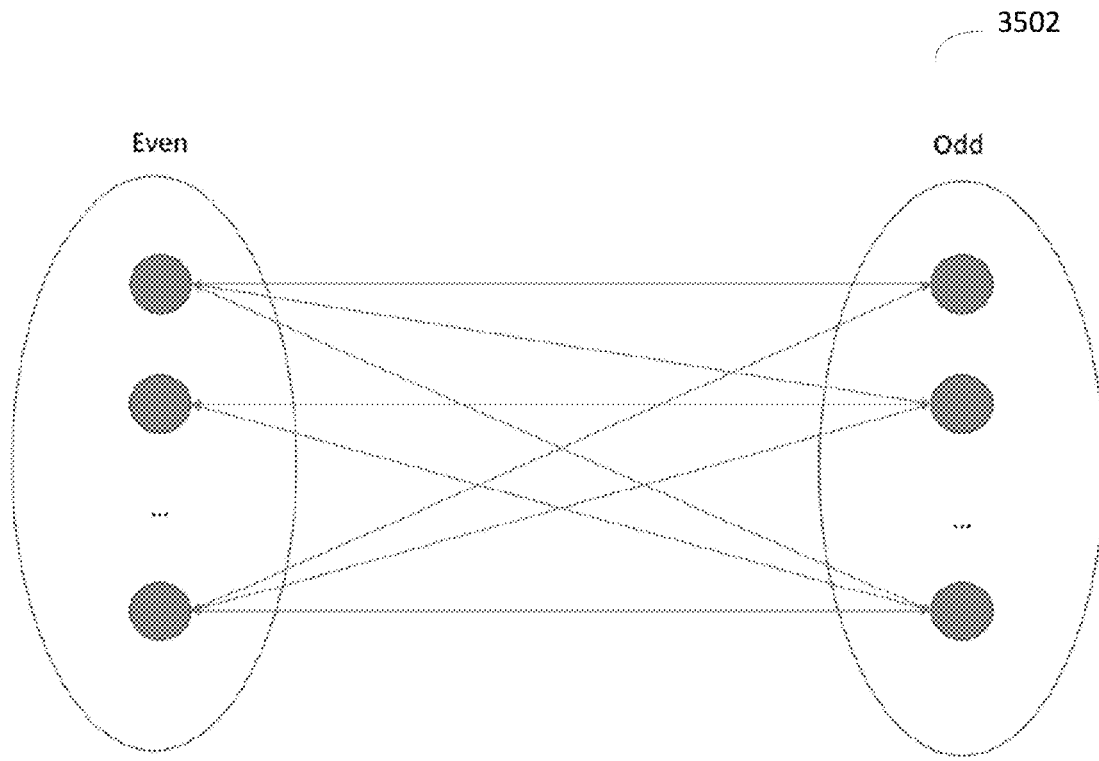
FIG. 35A illustrates a polarity assignment of a mesh network according to embodiments of the present disclosure.

FIG. 35A illustrates a polarity assignment 3502 of a mesh network according to embodiments of the present disclosure. The embodiment of the polarity assignment 3502 illustrated in FIG. 35A is for illustration only. FIG. 35A does not limit the scope of this disclosure.

To reduce the self-interference, a TDD scheme is provided. In the so called 2-Phase (2P) protocol, the nodes in the network are divided into two categories, denoted as even nodes and odd nodes respectively as shown in FIG. 35A.

The even nodes are transmitting at the even timeslots and vice verses. It is called that the process of separation is as polarity assignment. The polarity has to be carefully assigned to make sure that there is no transmission conflict. For example, when two nearby nodes are assigned the same polarity, the communication between them is NOT allowed as the two nearby nodes are synchronized in transmitting/receiving. As a result, the achievable rate of the network may be compromised. To solve this problem, an algorithm is provided. The algorithm is based on the integer linear programming (ILP).

Figure 35B:
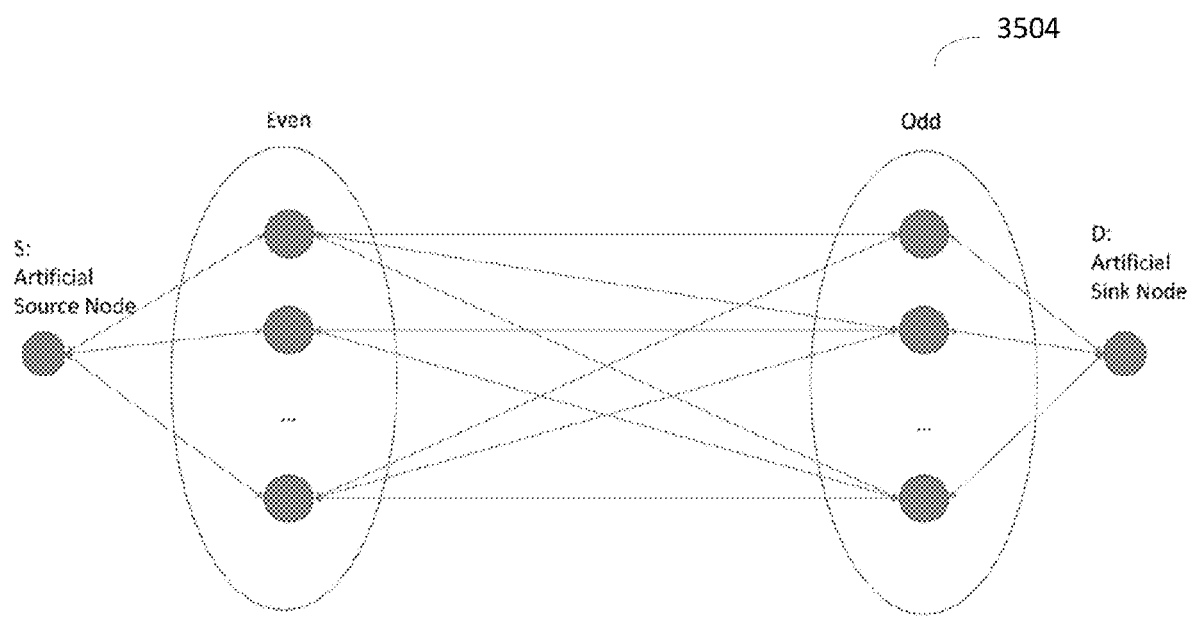
FIG. 35B illustrates a network flow problem with artificial source node and sink node according to embodiments of the present disclosure.

FIG. 35B illustrates a network flow problem 3504 with artificial source node and sink node according to embodiments of the present disclosure. The embodiment of the network flow problem 3504 illustrated in FIG. 35B is for illustration only. FIG. 35B does not limit the scope of this disclosure.

As shown in FIG. 35B, two artificial nodes are created to represent the source node and the sink node. The problem is to maximize the network flow between the source and the sink.

In the formulated optimization problem, the objective is to maximize the flow from the artificial source node to the artificial sink node. A binary variable is used to represent the polarity of the node: $p_i=0$ for even nodes, $p=1$ for odd nodes. $f_{i,j}$ is the flow between node i and j. M is a large enough value which is the rate upperbound of the link between source (sink) and even (odd) nodes. In addition, the link rate between node i and j satisfy $f_{i,j} \leq \min\{p_i+p_j, 2-p_i-p_j\}*C_{i,j}$ where $C_{i,j}$ is the capacity of the wireless link between node i and j. $C_{i,j}$ is computed by assuming no interference. The reason is to decouple the link scheduling and topology building. Note that $\min\{p_i+p_j, 2-p_i-p_j\}$ is equal to zero if $p_i=p_j$ and one otherwise. That means that only the links with different polarities on the two ends are allowed. The integer programming problem can be efficiently solved, for example, by the branch-and-bound algorithm.

The notation of the algorithm is summarized in TABLE 7. As given in the TABLE 7, $\{C_{i,j}\}$ is the input of the algorithm while $\{p_i, f_{i,j}, f_{s,i}, f_{i,d}\}$ is the output. Our interest is on the polarity assignment, i.e., $p_i$.

$$\max \sum_i f_{s,i}$$

$$\text{s.t.,} \quad f_{s,i} \leq (1-p_i)M,$$

$$f_{i,d} \leq p_i M,$$

$$f_{ij} \leq \min(p_i + p_j, 2 - p_i - p_j)C_{ij},$$

$$f_{s,i} + \sum_k f_{ki} - f_{i,d} - \sum_j f_{ij} = 0,$$

$$p_i = 0/1, \ 1 \leq i \leq N.$$

Figure 36:
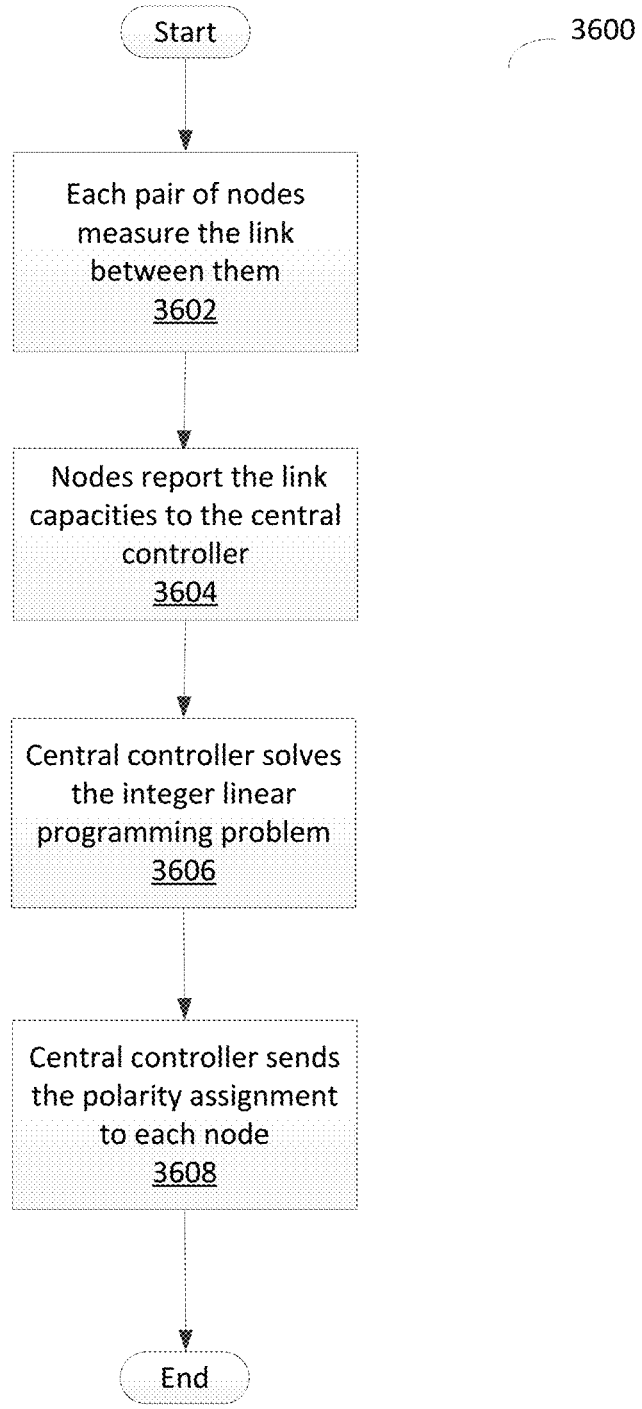
FIG. 36 illustrates a flow chart of polarity assignment method according to embodiments of the present disclosure.

FIG. 36 illustrates a flow chart of polarity assignment method 3600 according to embodiments of the present disclosure. The embodiment of the polarity assignment method 3600 illustrated in FIG. 36 is for illustration only. FIG. 36 does not limit the scope of this disclosure.

This algorithm is a centralized method which can be run at a central controller. At step 3602, each pair of nodes in the network measure the channel capacity between each pair of nodes and reports the measured channel capacity to the central controller. With the global knowledge of for each pair of (i, j) and an assumed large enough M for the artificial links, the central controller then run the integer linear programming algorithm to obtain the values of $p_i$, i.e., the polarity assignment which can then be sent back to the individual mesh node. At step 3604, nodes report the link capacities to the central controller. At step 3606, central controller solves the integer linear programming problem. Finally, at step 3608, central controller sends the polarity assignment to each node. A flow chart of the algorithm is shown in FIG. 36.

TABLE 7

Notations

| Symbol | Definition | Input/output |
|---|---|---|
| $C_{i,j}$ | The capacity of the wireless link between node i and j assuming no interference | Input |
| $p_i$ | Polarity of the node (0/1) | Output |
| S | Artificial source node | |
| D | Artificial sink node | |
| $f_{i,j}$ | The flow between node i and node j | Output |
| $f_{s,i}$ | The flow between the artificial source node s and node i | Output |
| $f_{i,d}$ | The flow between the node i and artificial sink node d | Output |
| M | Rate upperbound of the link between source (sink) and even (odd) nodes, i.e., the artificial links | |
| N | The number of nodes excluding the artificial source and sink node | |

To deploy and operate a wireless mesh network comprising multiple network (NW) nodes, it is beneficial to include a network controller or Cloud Control Center (CCC) which provides functionalities including, but not limited to: network topology and route management given local traffic load and (long term) wireless backhaul link quality; dynamic routing control to overcome dynamic interference and signal blockage; and fast fault detection and recovery through fast discovery of alternative route. There is a need to design the network architecture of the CCC and the NW nodes, as well as the messaging formats.

Figure 37:
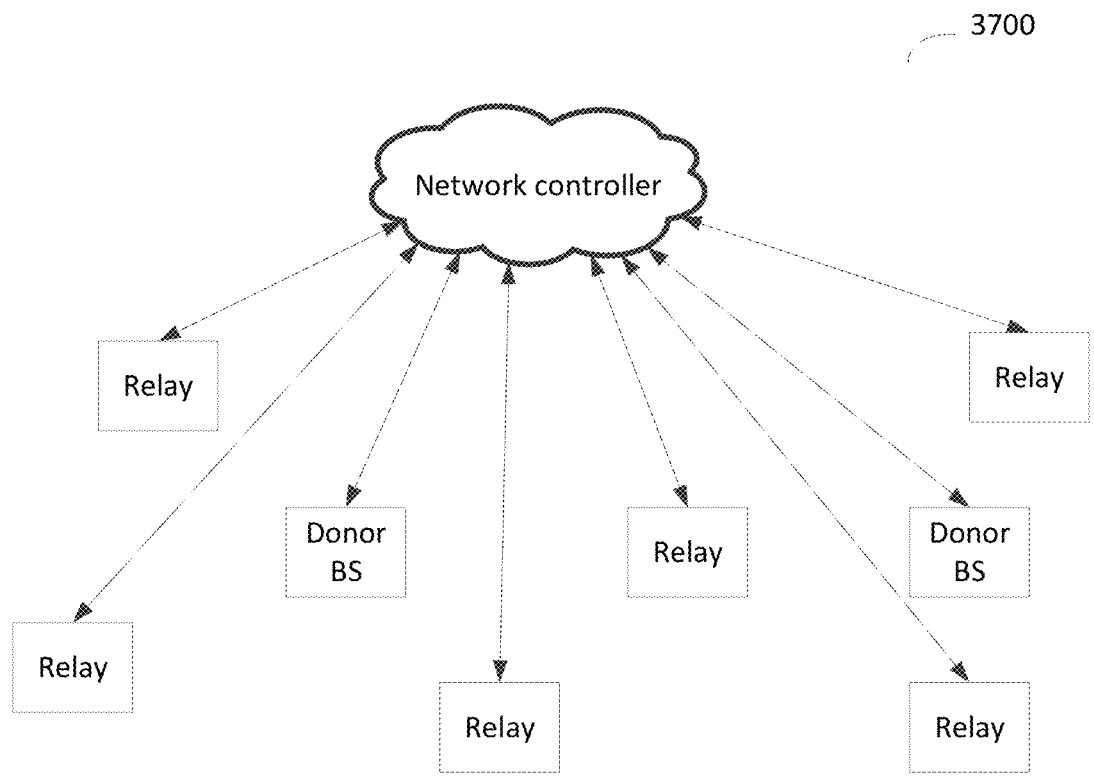
FIG. 37 illustrates a network architecture with direct control channel between the CCC and the NW node according to embodiments of the present disclosure.

FIG. 37 illustrates a network architecture 3700 with direct control channel between the CCC and the NW node according to embodiments of the present disclosure. The embodiment of the network architecture 3700 illustrated in FIG. 37 is for illustration only. FIG. 37 does not limit the scope of this disclosure.

In one embodiment, there is a direct control or messaging channel between the mesh NW node and the CCC. Here the mesh NW node could refer to any communication node with mesh functionality or 60 GHz communication interface. The direct control channel can be provided via Ethernet, Wi-Fi or 3GPP radio access technologies. This network architecture shall be referred to as Architecture A in this disclosure as illustrated in FIG. 37. In this NW, the network controller connects to the relay node and Donor BS through the control channel. Here the relay node and the Donor BS could refer to any communication node with the mesh functionality or 60 GHz communication interference.

Under this architecture, control signaling of the mesh network, for example, topology information, link connection information, routing information etc., may be interchanged through the control channel. The data between mesh nodes are transmitted through the 60 GHz interface. Under this architecture, the main network level functionalities for the mesh network are conducted in the network controller. For example, routing calculation, network topology formulation, link connection checking etc., are calculated in the network controller. The network controller could be a PC, or a server, or a cloud.

Figure 38:
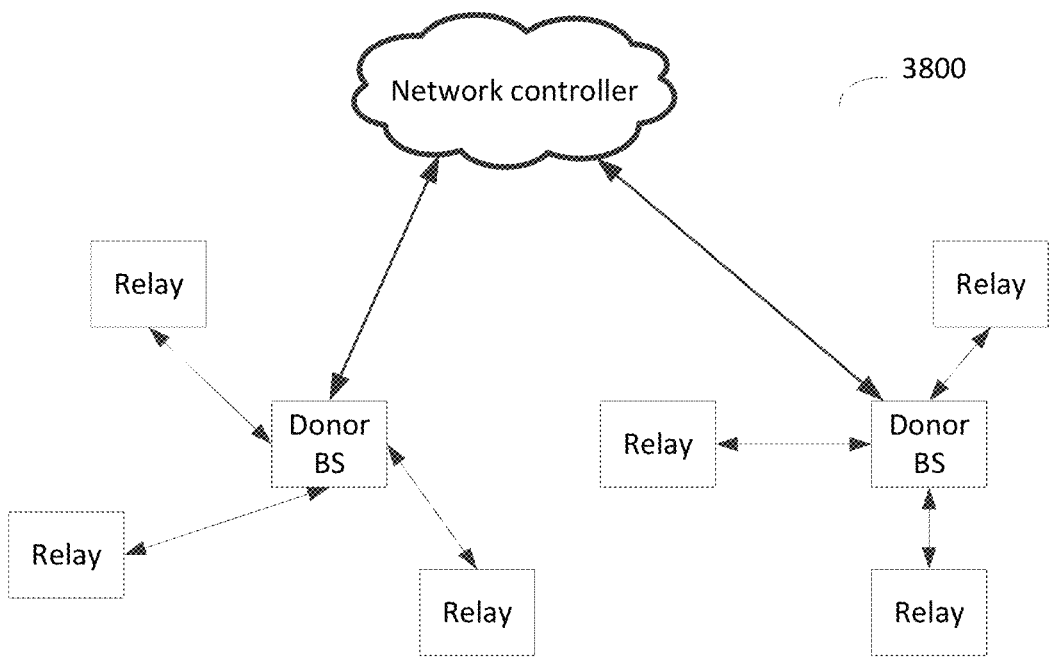
FIG. 38 illustrates a network architecture without direct control channel between the CCC and the NW node according to embodiments of the present disclosure.

FIG. 38 illustrates a network architecture 3800 without direct control channel between the CCC and the NW node according to embodiments of the present disclosure. The embodiment of the network architecture 3800 illustrated in FIG. 38 is for illustration only. FIG. 38 does not limit the scope of this disclosure.

In another embodiment, there is a direct control or messaging channel between the donor node and the CCC, but there is no direct control channel between a relay node and the CCC. The control messages in between the CCC and the relay node are routed via the donor node and potentially other relay nodes in the mesh network. The direct control channel between the donor node and the CCC can be provided via Ethernet, Wi-Fi or 3GPP radio access technologies. The control channel between the NW nodes is based on the RAT of the mesh network. This network architecture shall be referred to as Architecture B in this disclosure as illustrated in FIG. 38.

In Architecture B, network controller may exchange control signal directly with Donor B Ss. While donor BS and relay node may have a communication for both control signal and data through the RAT. In Architecture B, before the network could transmit data, the network may first transmit/broadcast control information to collect topology information, routing information etc., to form the network. After collecting the network information, the routing/topology formation can be addressed either distributed at each node or can be addressed centralized in the control center.

In one embodiment for the network controller design, one of the functions of the network controller is to determine network topology based on the measurement data from the NW nodes. Another function is to decide the routing table of the network.

Figure 39:
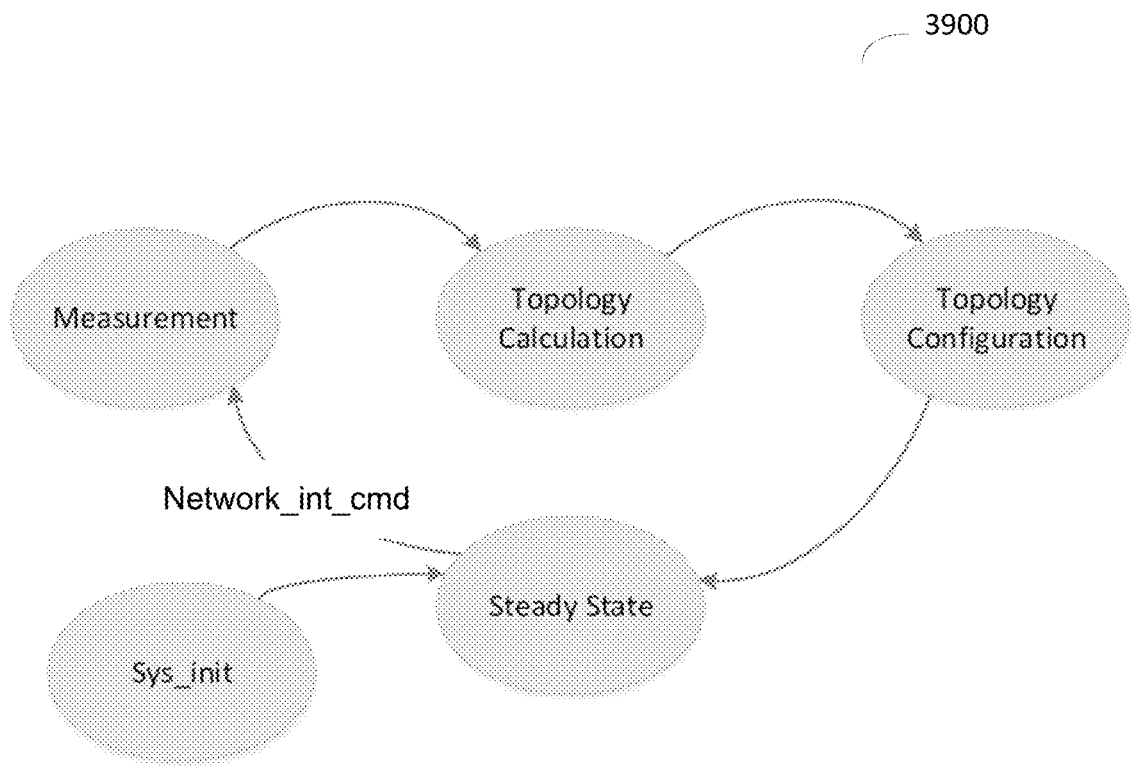
FIG. 39 illustrates a state machine for network topology management according to embodiments of the present disclosure.

FIG. 39 illustrates a state machine for network topology management 3900 according to embodiments of the present disclosure. The embodiment of the state machine for network topology management 3900 illustrated in FIG. 39 is for illustration only. FIG. 39 does not limit the scope of this disclosure.

One of schemes for network topology management is to through network measurement as shown in FIG. 39. The control center may first send out command to ask each node to conduct measurements. The measurement here could be the received signal/power strength, and/or throughput, and/or packet error rate etc. After receiving the measurement commands from the control center, each node may conduct the measurement according to the measurement command. After collecting the measurements, the control center may conduct the topology calculation. After the control center gets the topology, the control center may send out the node configuration command to each node. The command could include the following information: AP/STA configuration, the channel to work on, and/or the AP to connect to if the node is configured as STA node etc.

Figure 40:
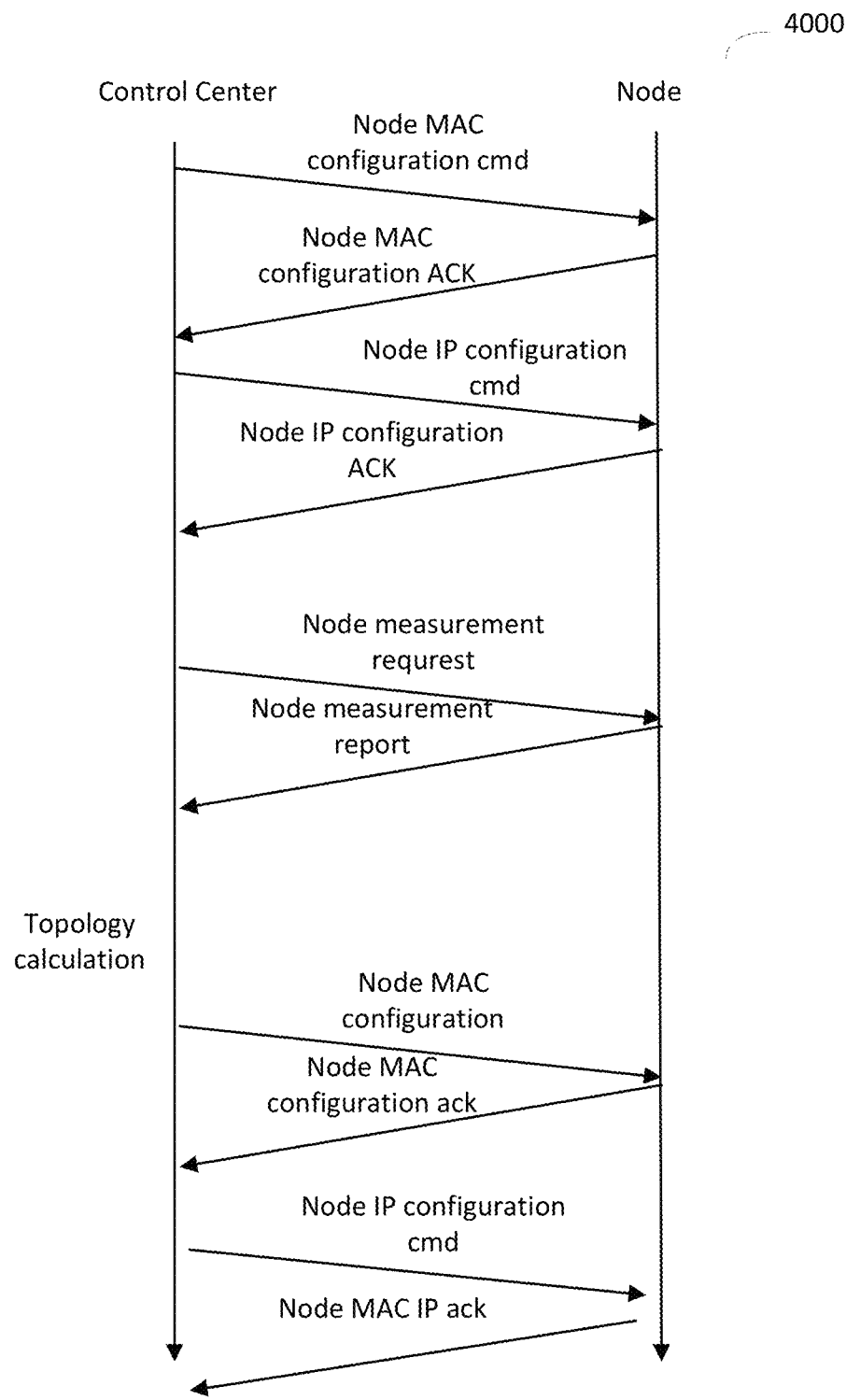
FIG. 40 illustrates a signaling flow between control center and mesh node for topology calculation according to embodiments of the present disclosure.

FIG. 40 illustrates a signaling flow 4000 between a control center and a mesh node for topology calculation according to embodiments of the present disclosure. The embodiment of the signaling flow 4000 illustrated in FIG. 40 is for illustration only. FIG. 40 does not limit the scope of this disclosure.

FIG. 40 shows one example of signaling scheme between a control center and a mesh node for topology formation. In order to collect the measurement, the control center may first send out the command to configure the MAC address as well as the role of the mesh node, i.e., either the mesh node is an AP node or a STA node. After receiving the configuration command, each mesh node may conduct the command and send out the ACK information after finish the command. The control center may send out the IP layer configuration command to each mesh node after collecting all or part of the MAC layer ACK. Each mesh node may configure each mesh's IP address according to the command received.

After finishing the IP configuration, each mesh node may send out the IP configuration ACK packet to the control center. After receiving all or part of the IP configuration ACK packet, the control center may send out the measurement command to each mesh node. The mesh node may conduct/collect measurement and sent them out to the control center. The control center then may conduct the topology calculation and send out the topology command to each of the mesh node. The topology command including the mesh node MAC layer configuration command and IP layer configuration command as shown previously.

Figure 41:
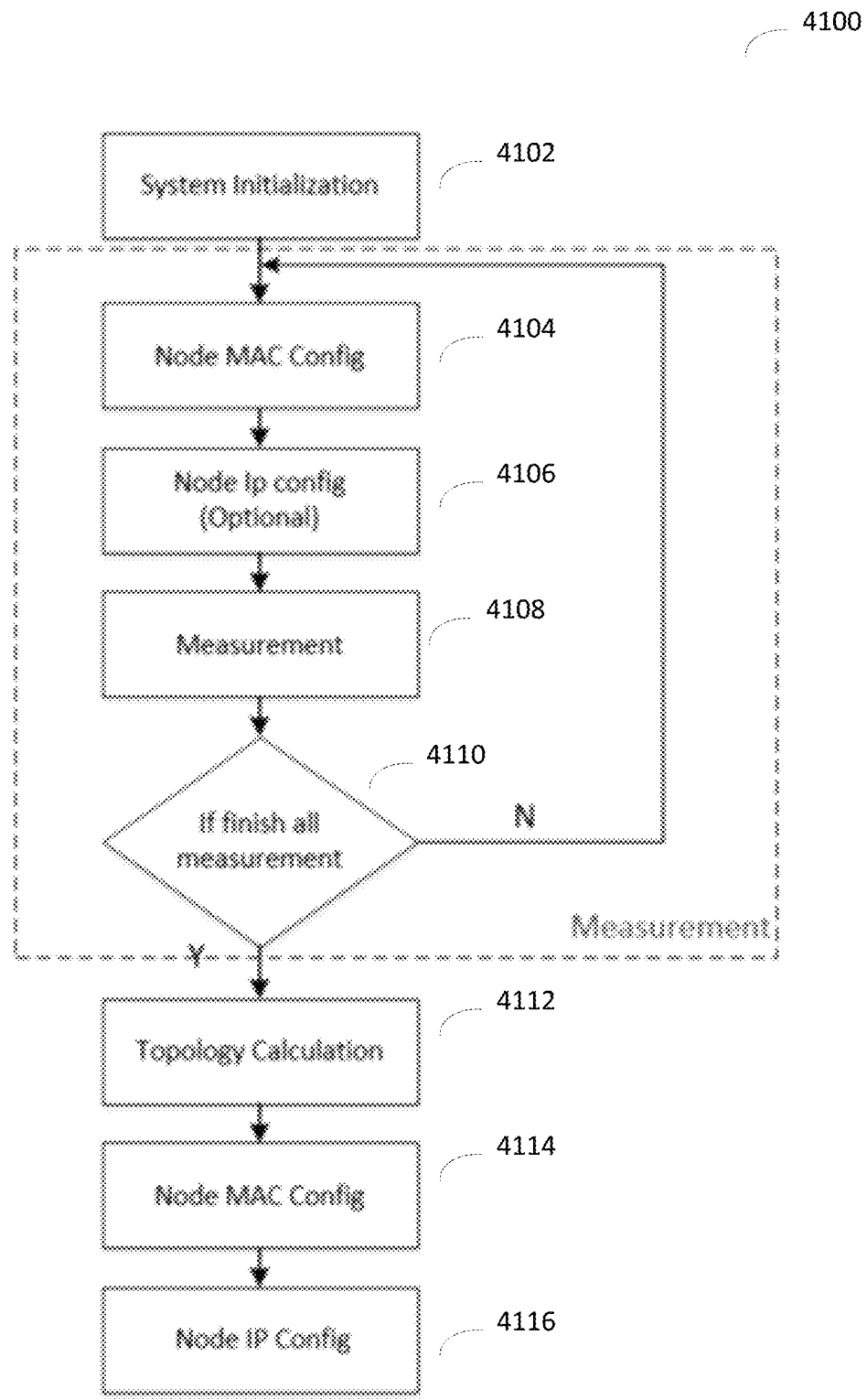
FIG. 41 illustrates a network topology function flow diagram at CCC according to embodiments of the present disclosure.

FIG. 41 illustrates a network topology function flow diagram 4100 at CCC according to embodiments of the present disclosure. The embodiment of the network topology function flow diagram 4100 illustrated in FIG. 41 is for illustration only. FIG. 41 does not limit the scope of this disclosure. As illustrated in FIG. 41, at step 4102, system is initialized. At step 4104, Node MAC is configured and Node IP is configured at step 4106. At step 4108, measurement is performed. At step, it is determined whether the measurement is finished, if not, step 4104 is repeated. If the measurement is finished at step 4110, a topology is calculated at step 4112. At step 4114, Node MAC is configured. Finally, at step 4116, Node IP is configured.

Figure 42:
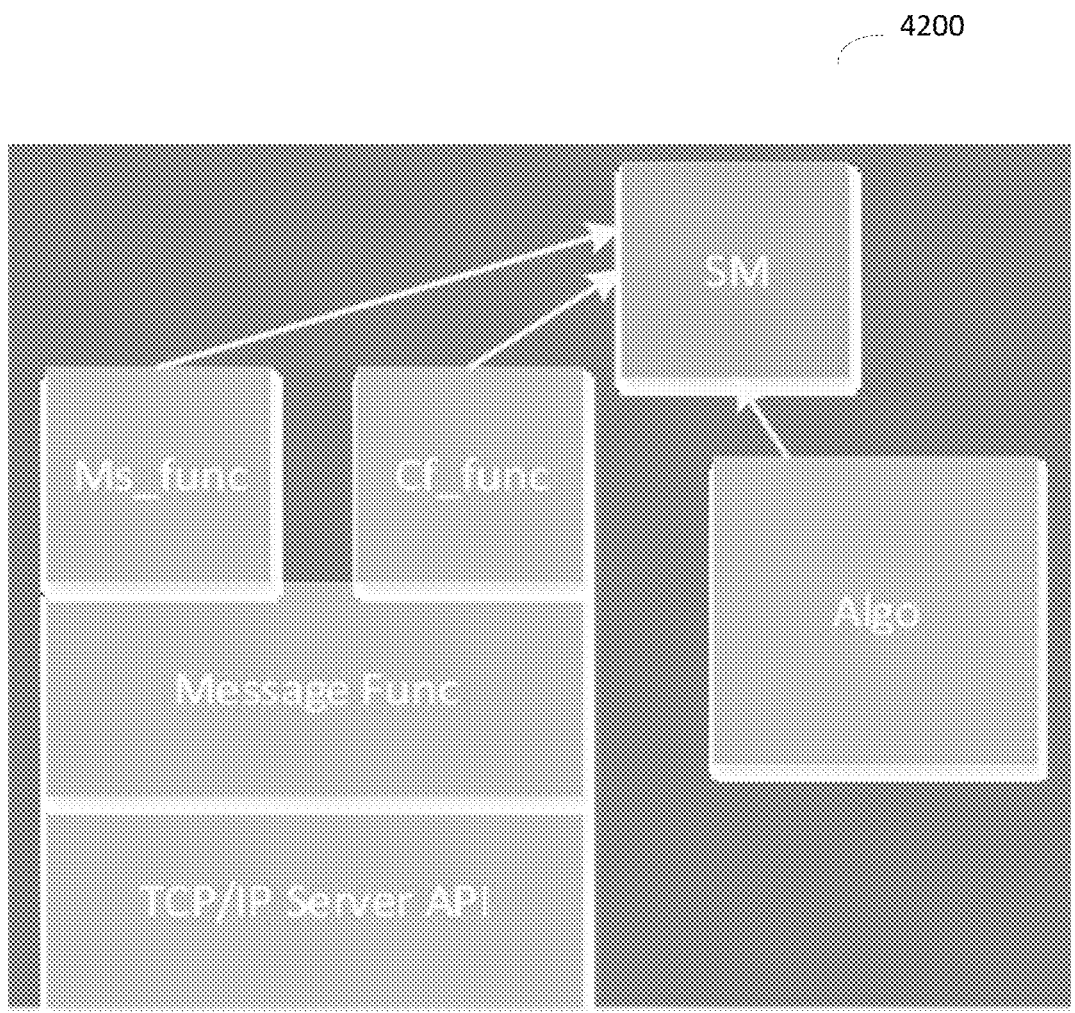
FIG. 42 illustrates a network topology function block diagram at CCC according to embodiments of the present disclosure.

FIG. 42 illustrates a network topology function block diagram 4200 at CCC according to embodiments of the present disclosure. The embodiment of the network topology function block diagram 4200 illustrated in FIG. 42 is for illustration only. FIG. 42 does not limit the scope of this disclosure.

FIG. 41 shows one of the examples on the detailed flow chart for the processing process in the control center part for the topology formulation.

FIG. 42 shows one of the examples on the implementation structure of the control center. In the network layer, TCP/IP server API is used. On top of the TCP/IP layer is the message protocol including configuration command and the measurement commands. After the topology/routing algorithm finish calculating the topology/routing, the control center may use the message protocol to send the command/configuration to each of the mesh node.

Figure 43A:
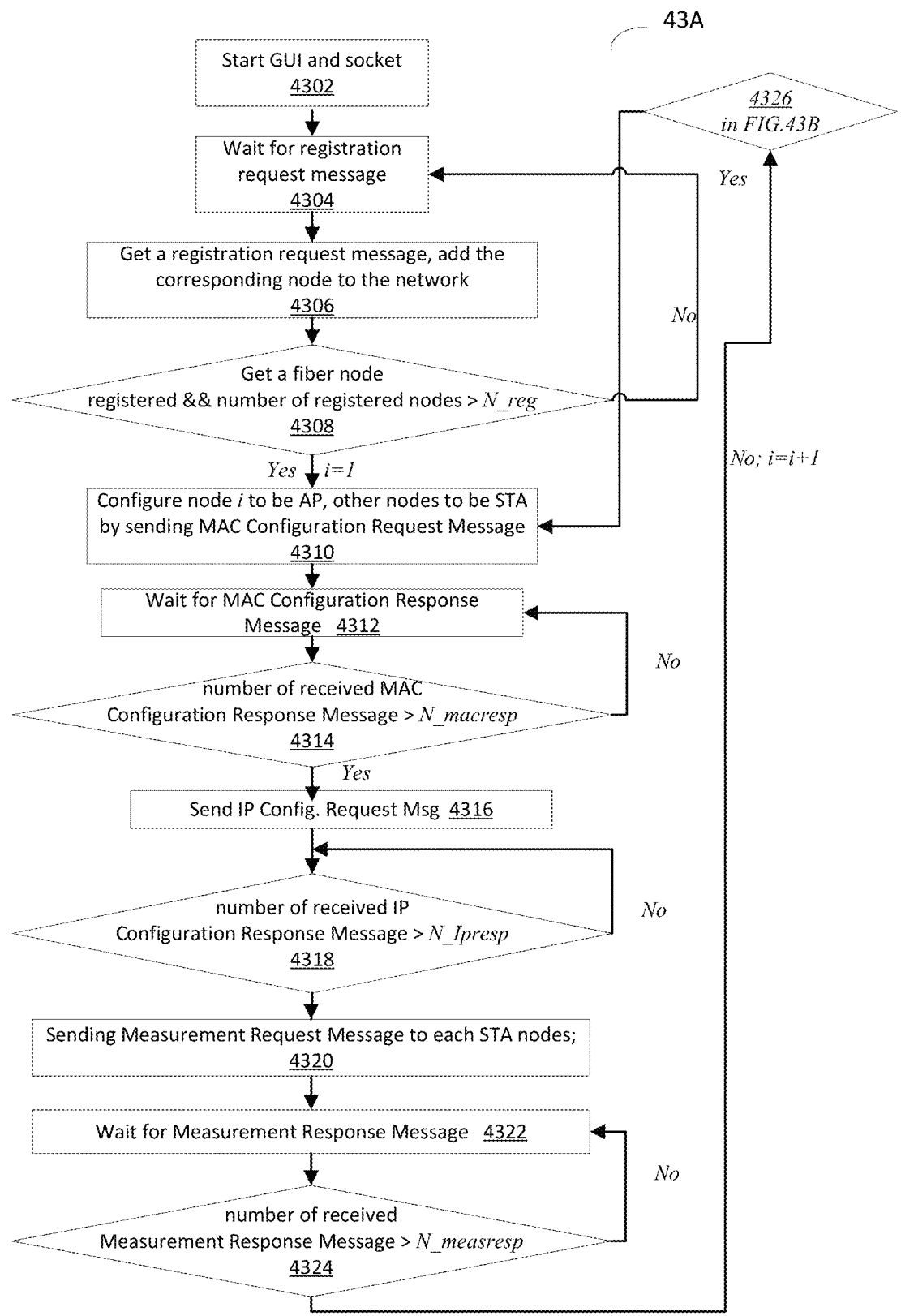
FIG. 43A illustrates a flow chart at the control center for the whole routing and topology formulation according to embodiments of the present disclosure.

FIG. 43A illustrates a flow chart 4300 at the control center for the whole routing and topology formulation according to embodiments of the present disclosure. The embodiment of the flow chart 4300 illustrated in FIG. 43A is for illustration only. FIG. 43A does not limit the scope of this disclosure.

Figure 43B:
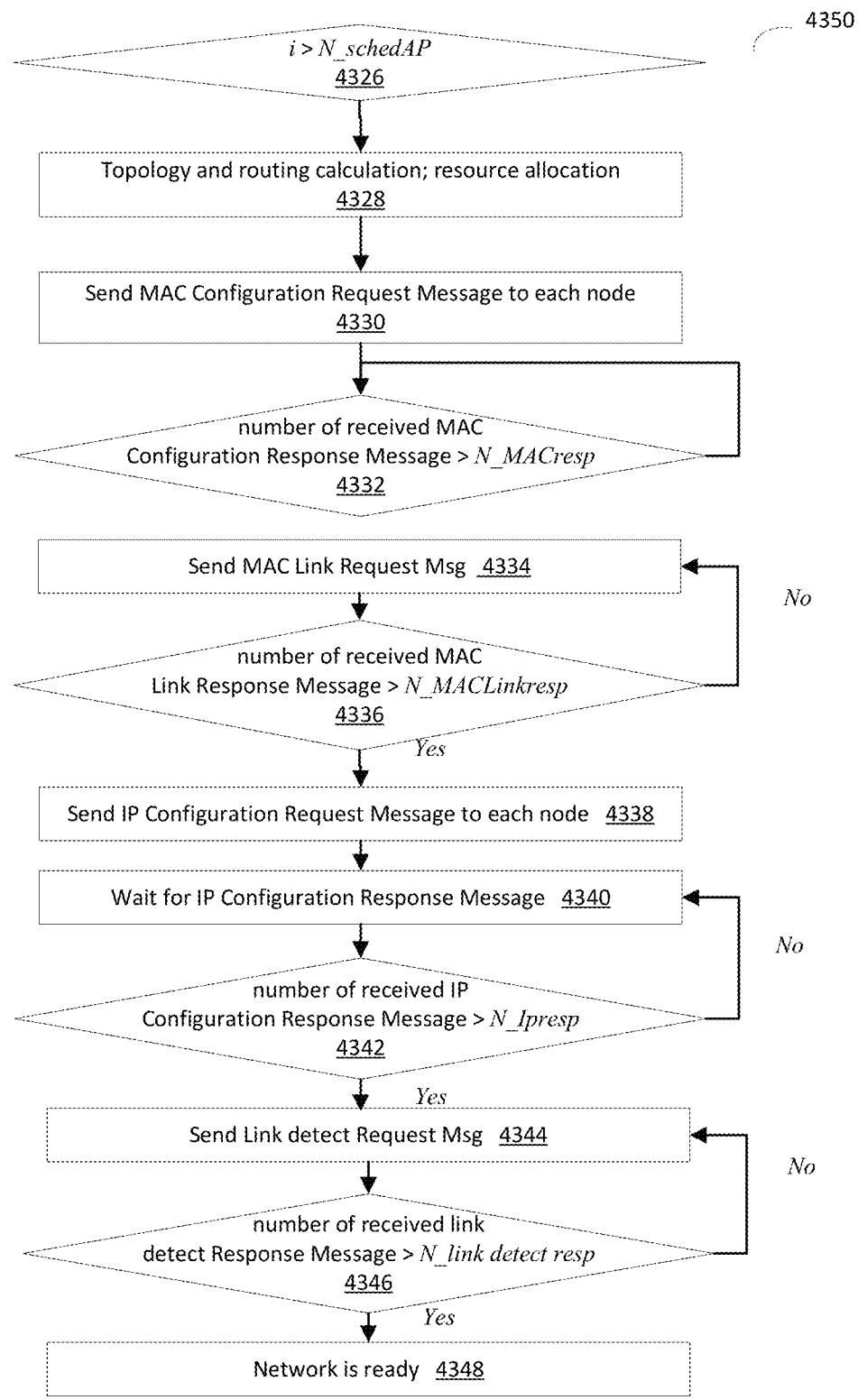
FIG. 43B illustrates a flow chart at the control center for the whole routing and topology formulation according to embodiments of the present disclosure.

FIG. 43B illustrates a flow chart 4350 at the control center for the whole routing and topology formulation according to embodiments of the present disclosure. The embodiment of the flow chart 4350 illustrated in FIG. 43B is for illustration only. FIG. 43B does not limit the scope of this disclosure.

FIGS. 43A and 43B show the flow chart at the control center for the whole routing and topology formulation.

As illustrated in FIGS. 43A and 43B, at step 4302, GUI and socket are started. At step 4304, a control center waits for registration request message. The control center gets a registration request message and adds the corresponding node to the network at step 4306. At step 4308, the control center determine whether to get a fiber node registered and number of registered nodes is greater than N_reg. At step 4310, the control center configures a node i to be an AP, other nodes to be an STA by sending MAC configuration request message. At step 4312, the control center waits for a MAC configuration response message. At step 4314, the control center determines whether a number of received MAC configuration response message is greater than N_macresp. At step 4316, the control center sends an IP configuration request message. At step 4318, the control center determines whether a number of received IP configuration response message is greater than N_IPresp. At step 4320, the control center sends a measurement request message to each STA nodes. At step 4322, the control center waits for a measurement response message. At step 4334, the control center determines whether a number of received measurement response message is greater than N_measresp. At step 4326, the control center determines whether i>N_schedAP. At step 4328, the control center calculates topology and routes for resource allocation. At step 4330, the control center sends a MAC configuration request message to each node. At step 4332, the control center determines whether a number of received MAC configuration response message is greater than N_MACresp. At step 4334, the control center sends a MAC link request message. At step 4336, the control center determines a number of received MAC link response message is greater than N_MACLinkresp. At step 4338, the control center sends an IP configuration request message to each node. At step 4340, the control center waits for an IP configuration response message. At step 4342, the control center determines whether a number of received IP configuration response message is greater than N_IPresp. At step 4344, the control center sends a link detect request message. At step 4346, the control center determines a number of received link detect response message is greater than N_link detect resp. At step 4348, the control center configures that a network is ready.

Figure 44:
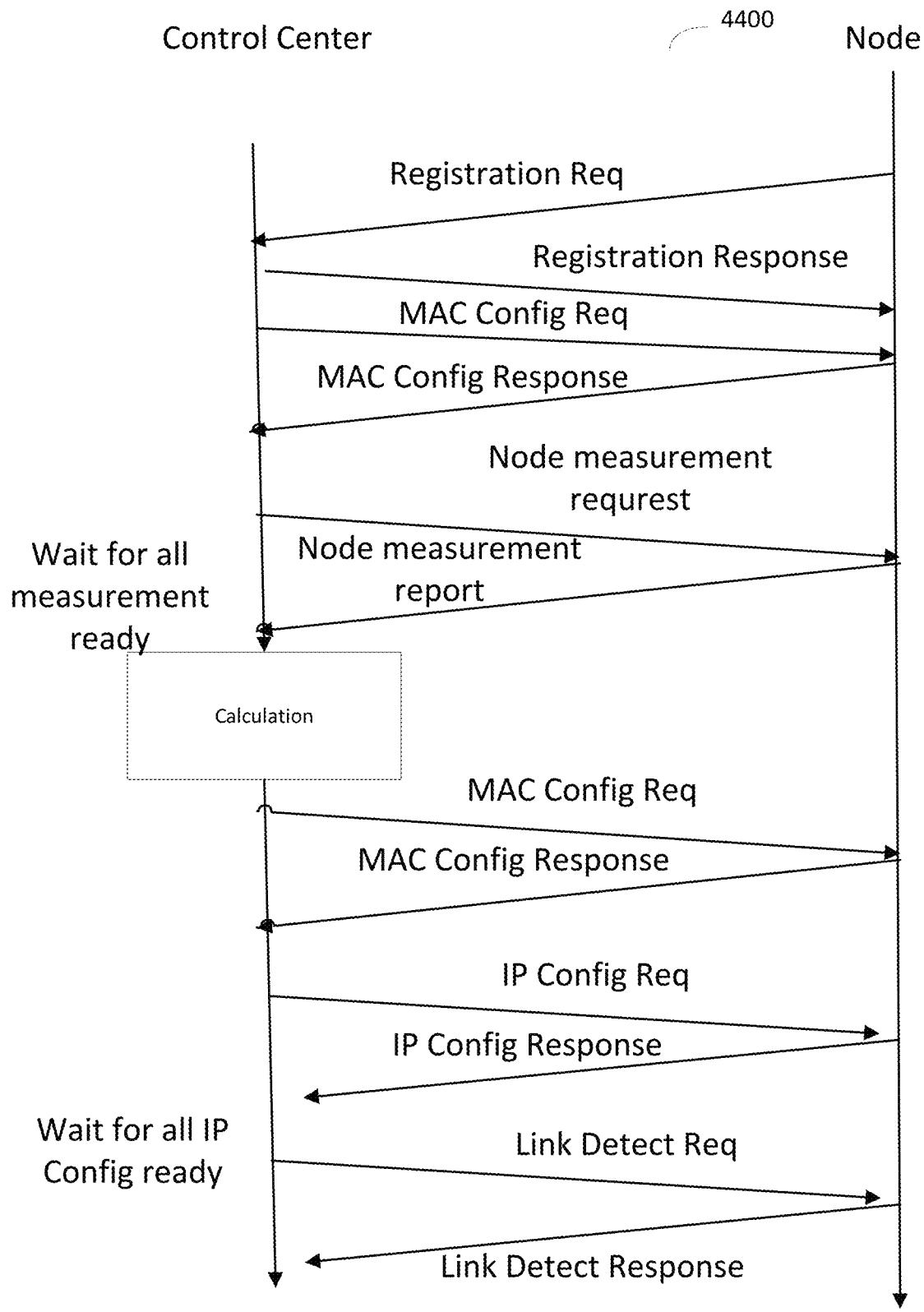
FIG. 44 illustrates a signaling flow chart between Control center and mesh node for routing and topology according to embodiments of the present disclosure.

FIG. 44 illustrates a signaling flow 4400 chart between Control center and mesh node for routing and topology according to embodiments of the present disclosure. The embodiment of the signaling flow 4400 illustrated in FIG. 44 is for illustration only. FIG. 44 does not limit the scope of this disclosure.

Figure 45:
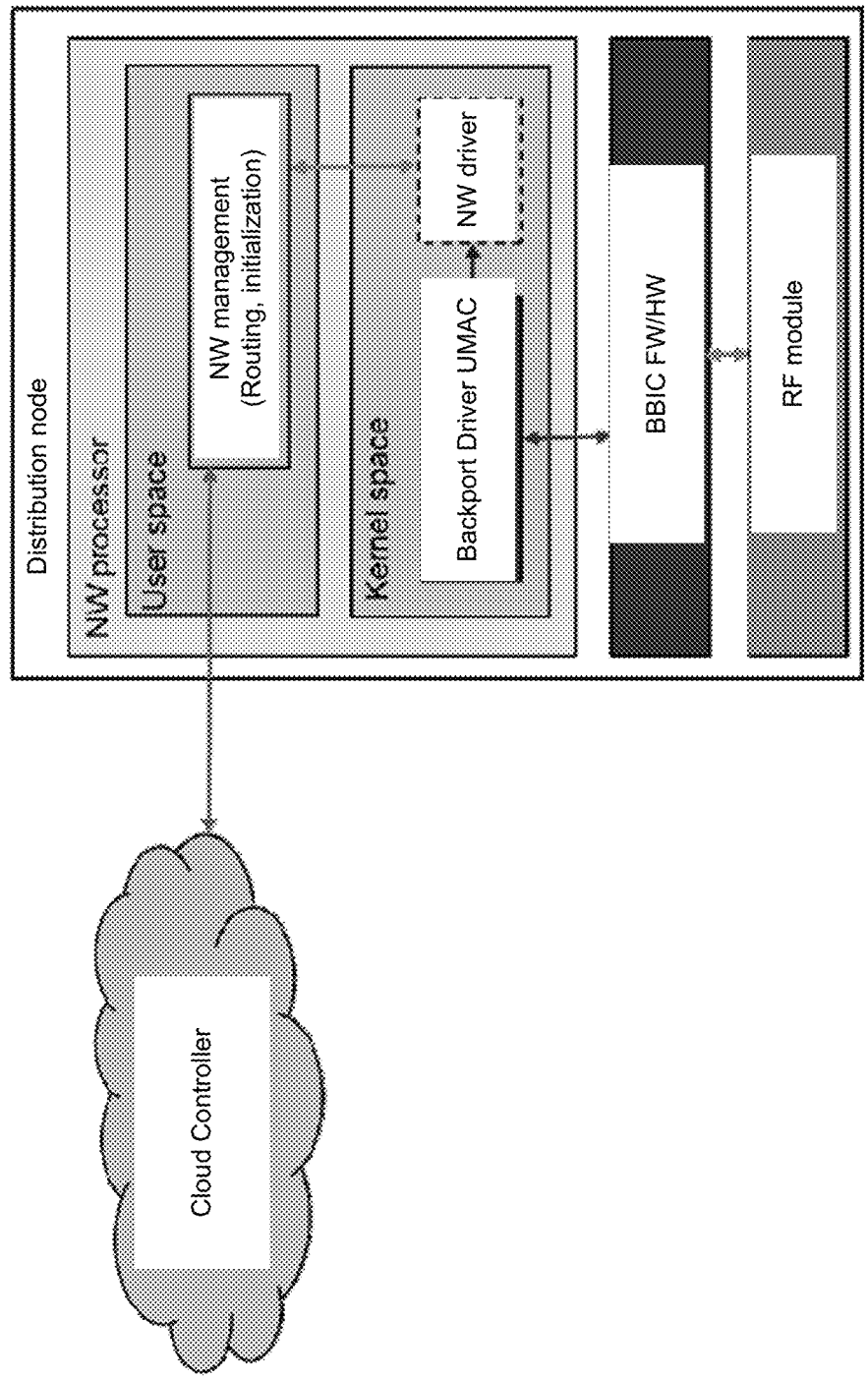
FIG. 45 illustrates a mesh node software architecture according to embodiments of the present disclosure.

FIG. 45 illustrates a mesh node software architecture 4500 according to embodiments of the present disclosure. The embodiment of the mesh node software architecture 4500 illustrated in FIG. 45 is for illustration only. FIG. 45 does not limit the scope of this disclosure.

In one embodiment, schemes on design of mesh node are presented. In the present disclosure, the mesh node can refer to the communication node with mmWave and beamforming capability. The running of the network management locates at the user space of the software. The NW management could be responsible for the communication with the control center. For example, the NW management could receive routing command from the control center and conjuration the routing table. In the kernel side, low level driver is added to further accelerate the control of the mesh chipset. Between the NW management and the low-level driver, the information is interchanged through the system call.

For example, when the mesh node receives measurement commands from the network control center, the command may first go to the NW management. Then the network management may call the low level driver to get the right measurement information. This measurement information may then be sent back to the control center throughout the NW management.

Figure 46:
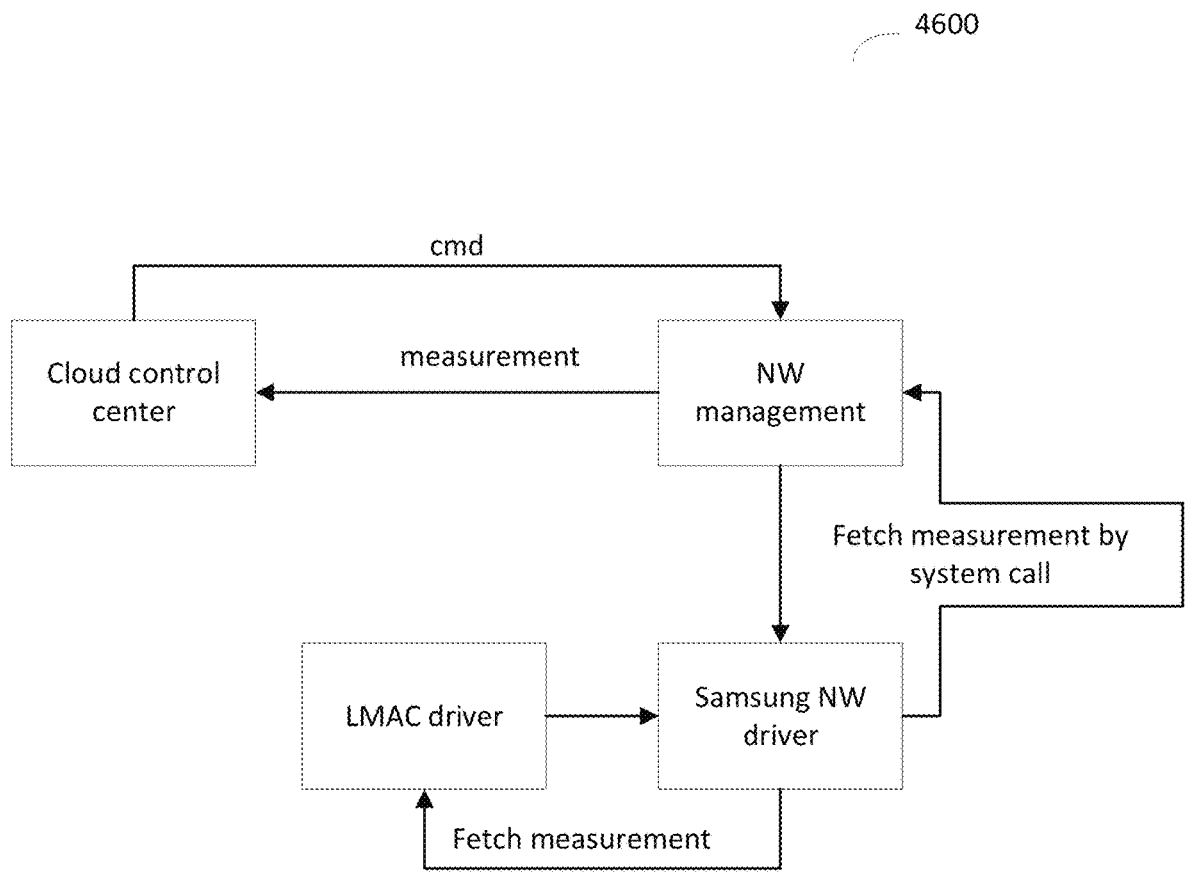
FIG. 46 illustrates an information flow between control center and mesh node according to embodiments of the present disclosure.

FIG. 46 illustrates an information flow 4600 between a control center and a mesh node according to embodiments of the present disclosure. The embodiment of the information flow 4600 illustrated in FIG. 46 is for illustration only. FIG. 46 does not limit the scope of this disclosure.

If the NW low level driver does not have the information, the NW driver may further send the command to the LMAC driver to get the information. This process is shown in FIG. 46.

Figure 47:
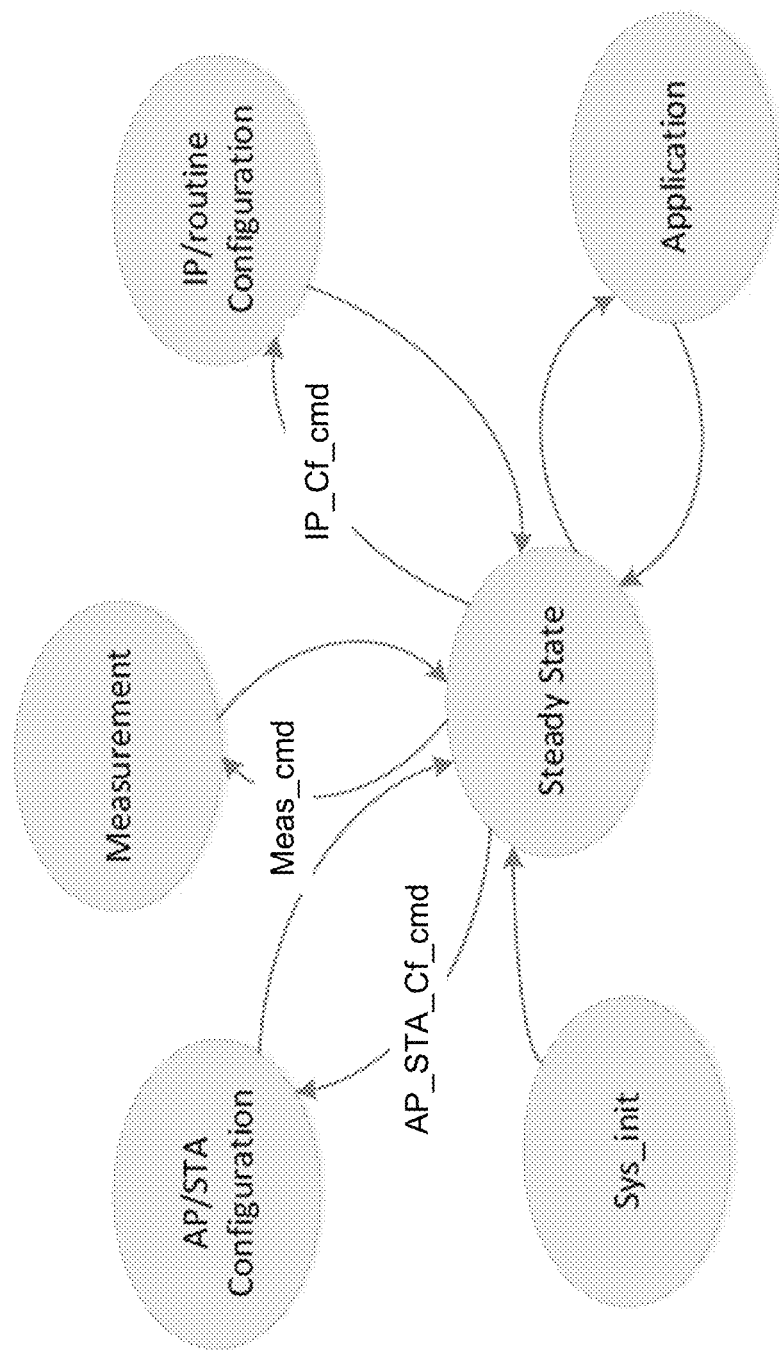
FIG. 47 illustrates a NW node architecture (state machine) according to embodiments of the present disclosure.

FIG. 47 illustrates a NW node architecture 4700 (state machine) according to embodiments of the present disclosure. The embodiment of the NW node architecture 4700 illustrated in FIG. 47 is for illustration only. FIG. 47 does not limit the scope of this disclosure.

In one example, NW management is implemented as shown in FIG. 47. After initialization, the node may go to AP/STA configuration state, measurement state, IP/Configuration station and application state. The stage transition could be triggered by the network control center or triggered by the node itself.

Figure 48:
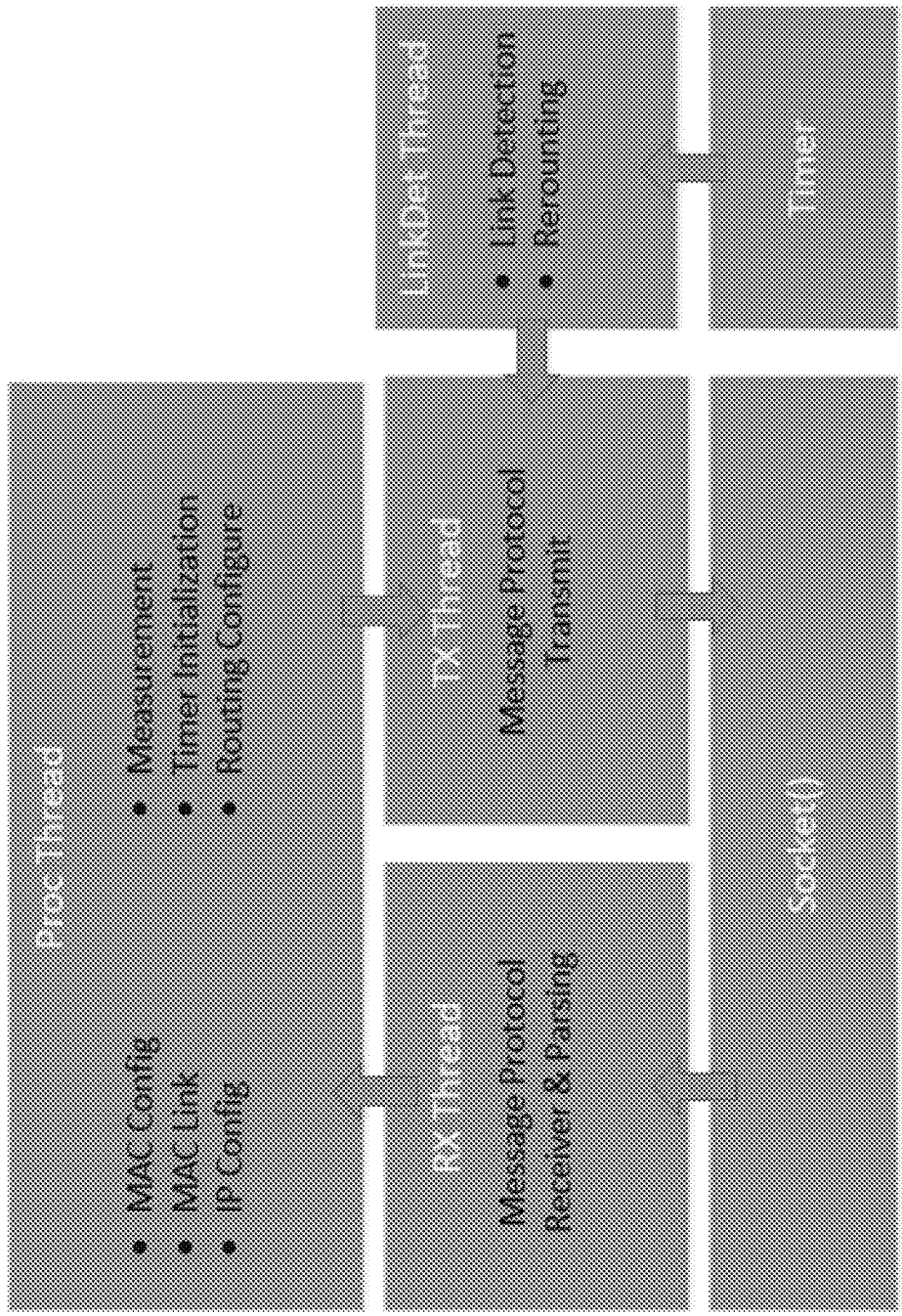
FIG. 48 illustrates a multi-thread architecture of the NW management according to embodiments of the present disclosure.

FIG. 48 illustrates a multi-thread architecture 4800 of the NW management according to embodiments of the present disclosure. The embodiment of the multi-thread architecture 4800 illustrated in FIG. 48 is for illustration only. FIG. 48 does not limit the scope of this disclosure.

FIG. 48 shows one of the examples of the software architecture of the NW management. In the low level is the socket thread. On top of the socket thread is the message receive and transmit thread. Rx/Tx thread is responsible for the message processing for the protocol. Additionally, there is a periodic Link detection thread to detect the link failure information.

In one embodiment, details of the communication protocol for the mesh network are described. These messages are designed to collect information, send commands and measurements between control center and mesh node. The following messages are used for communication between the CCC and the NW node: a registration request message; a registration response message; a MAC configuration request message; a MAC configuration response message; a MAC link request message; a MAC link response message; a measurement request message; a measurement response message; an IP configuration request message; an IP configuration response message; an IP link detection request message; an IP link detection response message; and/or a hello message/IP link report message.

TABLE 8

Message design

| Message | Source, Target | Message content |
| --- | --- | --- |
| Registration Request Message | NW node, CCC | Node ID<br>Location (e.g. Longitude, Latitude)<br>Hardware configuration<br>Number of baseband (BB) modules, N<br>Hardware configuration information of each BB module (e.g. antenna configuration, number of tiles, boresight direction)<br>Software version |
| Registration Response Message | CCC, NW node | Node ID<br>Registration status: Accept or Decline |
| MAC Configuration Request Message | CCC, NW node | Node ID<br>Hardware command for each BB module<br>AP_STA_indicator: AP or STA<br>If AP_STA _indicator is AP:<br>SSID/CH<br>beam<br>If AP_STA_indicator is STA:<br>SSID (optional) |
| MAC Configuration Response Message | NW node, CCC | Node ID<br>Status: Success or Fail |
| Measurement Request Message | CCC, NW node | Node ID<br>Measurement Request ID<br>Measurement Request Capability (e.g. RSSI, beam)<br>BB module selection |
| Measurement Response Message | NW node, CCC | Node ID<br>Measurement Request ID<br>Measurement Request Capability (e.g. RSSI) |

TABLE 8-continued

Message design

| Message | Source, Target | Message content |
|---|---|---|
| | | Measurement data from each BB module |
| | | Number of measurements on BB module |
| | | RSSI_1, SSID_1, Channel_1, beam |
| | | RSSI_2, SSID_2, Channel_2, beam |
| | | ... |
| IP Configuration Request Message | CCC, NW node | Node ID Tuning Request ID Tuning decisions Routing table, beam |
| IP Configuration Response Message | NW node, CCC | Node ID Tuning Request ID Work mode ready indicator |
| IP Link Detection Request message | NW node, CCC | Node ID, Link status information |
| Hello Message | NW node, CCC | Node ID Throughput and measurement information |

In the following, it is shown one example of the implementation of the protocol.

In one example of a registration request message, the registration request message is from node to the control center; each node sends the registration request message to the control center after powering up to tell the control center that this node is in the network, the configuration of this node. Each message is implemented as a subclass of the message, the subclass may define the fields and the offset of the fields, for example.

TABLE 9

Fields and description of the registration request message

| Fields | Size | Description |
|---|---|---|
| MSG ID | 1 B | The ID of the message |
| Node ID | 4 B | The ID of the node |
| Location | 8 B (3 m accuracy) | The location of the node; 4 bytes for longitude, 4 bytes for latitude |
| BB Selection | 1 B | Baseband configuration of this node. Possible value for this field is 1, 3, 5, 7 |
| BB1(Tile, dir) | 1 B | Baseband configuration for BB1 |
| BB2(Tile, dir) | 1 B | Baseband configuration for BB2 |
| BB3(Tile, dir) | 1 B | Baseband configuration for BB3 |
| BB4(Tile, dir) | 1 B | Baseband configuration for BB4 |
| SW Version | 2 B | Software version |
| Node type | 1 B | Type of this node (indicate whether this node is a fiber node or not) |

In one example of registration response message, the registration response message is from the control center to each node. After receiving the registration request message, the control center may send a response message to the node

TABLE 10

Fields and description of a registration response message

| Fields | Size | Description |
|---|---|---|
| MSG ID | 1 B | The ID of this message |
| Node ID | 4 B | The ID of the node |
| Reg Stat | 1 B | Registration status to indicate whether the registration successful or not |

In one example of a configuration request message, a control center use this message to indicate how a node may configure the node's MAC layer, for example, whether the node is an AP node or a STA node, which channel the node may work on; if the node is AP node, what is the SSD for this AP.

TABLE 11

Fields and description of a configuration request message.

| Fields | Size | Description |
|---|---|---|
| MSG ID | 1 B | The ID of this message |
| Node ID | 4 B | The ID of this node |
| BB Sel | 1 B | The selected based band module, possible value is 1, 3, 5, 7 |
| BB1 AP_STA | 1 B | Whether BB1 is AP or STA |
| BB1 SSID | 32 B | If BB1 is AP, the SSID of this AP |
| BB1 CH | 1 B | Channel configuration of this AP, possible value is 1, 2, 3 |
| BB2 | 34 B | Settings for BB2, following the same format as BB1 |
| BB3 | 34 B | Settings for BB3, following the same format as BB1 |
| BB4 | 34 B | Settings for BB4, following the same format as BB1 |

In one example of MAC configuration response message, each node after receiving the mac configuration request message may send the response message to the control center to indicate whether the configuration is successful or not.

TABLE 12

Fields and description of MAC Configuration Response Message

| Fields | Size | Description |
|---|---|---|
| MSG ID | 1 B | The ID of this message |
| Node ID | 4 B | The ID of this node |
| MAC Stat | 1 B | The status of the MAC configuration |

In one example of a MAC link request message, the MAC link request message is transmitted from a control center to each node, to ask the node (if the node is a STA node) to connect to the node's AP.

TABLE 13

Fields and description of a MAC link request message

| Fields | Size | Description |
|---|---|---|
| MSG ID | 1 B | The ID of this message |
| Node ID | 4 B | The ID of this node |
| Req ID | 1 B | The ID of this request |

In one example of a MAC link response message, the MAC link response message is transmitted from each node to the control center to indicate whether the mac layer connection is successful or not.

TABLE 14

Fields and description of a MAC link response message

| Fields | Size | Description |
|---|---|---|
| MSG ID | 1 B | The ID of this message |
| Node ID | 4 B | The ID of this node |
| Stat | 1 B | Whether the connection is success or not |

In one example of a measurement request message, the measurement request message is transmitted from control center to each node to ask each node to do measurement.

TABLE 15

Fields and description of a measurement request message

| Fields | Size | Description |
|---|---|---|
| MSG ID | 1 B | The ID of this message |
| Node ID | 4 B | The ID of this node |
| Meas Req ID | 1 B | Measurement request ID |
| BB selection | 1 B | Indicate which base band(s) may do the measurement; possible value is 1 3 5 7 |

In one example of a measurement response message, the measurement response message is transmitted from each node to the control center to report the measurement results to the control center. Note: the size of the measurement response message is dynamic which is based on how many Aps in the field

TABLE 16

Fields and description of measurement response message

| Fields | Size | Description |
|---|---|---|
| MSG ID | 1 B | The ID of this message |
| Node ID | 4 B | The ID of the node |
| Total Bytes | 2 B | The total bytes of this message; this is dynamic |
| Meas Req ID | 1 B | The ID of the message request ID |
| BB Selection | 1 B | The measured base band module |
| BB1 MEA NUM | 1 B | How many number of measurement collected in based band module 1 |
| BB1 SSID | 32 B | The SSID for the first measurement |
| BB1 CH | 1 B | The channel for the first measurement |
| BB1 RSSI | 1 B | The measured RSSI for the first measurement (Note follow this field, there might be second/third . . . measurement on BB1) |
| BB2 | X BYTE | Measurements results for BB2, following the same format as BB1 (Note, the total number of measurements on BB2 might be different from that on BB1) |
| BB3 | X BYTE | Measurements results for BB3, following the same format as BB1 (Note, the total number of measurements on BB3 might be different from that on BB1) |
| BB4 | X BYTE | Measurements results for BB3, following the same format as BB1 (Note, the total number of measurements on BB3 might be different from that on BB1) |

In one example of an IP configuration request message, the IP configuration request message is message is transmitted from the control center to each node to ask each node to configure each node's IP address, routing table etc.

TABLE 17

Fields and description of an IP Configuration Request Message

| Fields | Size | Description |
|---|---|---|
| MSG ID | 1 B | The ID of this message |
| Node ID | 4 B | The ID of this node |
| Total Byte | 2 B | Total bytes of this message |
| BB selection | 1 B | Base band selection indication |
| BB1 IP | 4 B | IP address of BB1 |
| BB2 IP | 4 B | IP address of BB2 |
| BB3 IP | 4 B | IP address of BB3 |
| BB4 IP | 4 B | IP address of BB4 |
| Num GW | 1 B | Number of next hop |
| Routing Table total page | 4 B | How many messages the routing table has |
| Current page | 4 B | The current message number of the whole routing table |

TABLE 17-continued

Fields and description of an IP Configuration Request Message

| Fields | Size | Description |
|---|---|---|
| Page size | 4 B | Size of the current routing table, number of routing table items |
| GW | MX4 B | IP address of next hop set; number M is indicated by Num GW |
| Table content | Nx30 B | Routing table contents; number N is indicated by page size |

Note: the structure of the table content is as following. Note: The IP address follows the following format: 192.168.1.XXX; the IP address for each BB module is 4×(node ID−1)+index of BB.

In one example of an IP Configuration Response Message, each node may response the IP configuration message to the control center.

TABLE 18

Fields and description of an IP Configuration Response Message

| Fields | Size | Description |
|---|---|---|
| MSG ID | 1 B | The ID of this message |
| Node ID | 4 B | ID of this node |
| Status | 1 B | IP configure status |
| Routing table page confirm | 4 B | Routing table confirm, which page have been sent, ccc may send remaining routing table based on this information |

In one example of an IP link detection request message, a control center sends this message to each node to ask the node to do IP link detection.

TABLE 19

Fields and description of an IP link detection request message

| Fields | Size | Description |
|---|---|---|
| MSG ID | 1 B | ID of this message |
| Node ID | 4 B | ID of this node |
| Req ID | 1 B | ID of this request |

In one example of an IP link detection response message, each node may response the IP link detection request message.

In one example of an IP link report message, each node may send out the report message to a control center to indicate that a link failure is detected.

TABLE 20

Fields and function of an IP link report message

| Fields | Size | Description |
|---|---|---|
| MSG ID | 1 B | ID of this message |
| Node ID | 4 B | ID of this node |
| Source IP | 4 B | Source IP address of the link failure |
| Next Hop IP | 4 B | Next hop address of the link failure |
| Status | 1 B | Status of the message |

Figure 49:
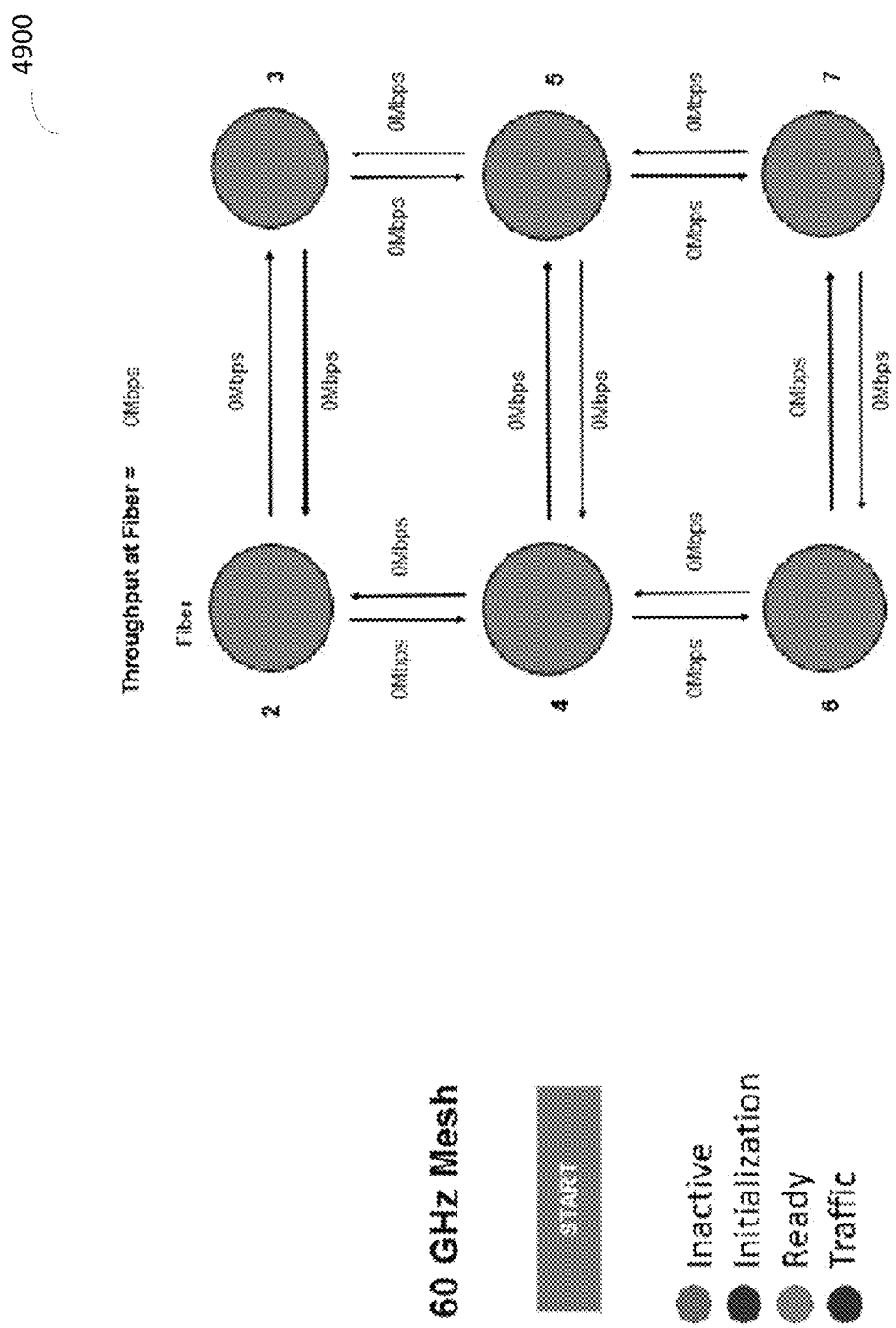
FIG. 49 illustrates a GUI for mesh network according to embodiments of the present disclosure.

FIG. 49 illustrates a GUI 4900 for mesh network according to embodiments of the present disclosure. The embodiment of the GUI 4900 illustrated in FIG. 49 is for illustration only. FIG. 49 does not limit the scope of this disclosure.

In one embodiment, a GUI is designed to monitor the network topology, routing and throughput. Each node has four state shown in the GUI. Inactive state means the node is not activated, i.e., not registered in the network. Initialization state means the node is conducting initialization, i.e., Rx/Tx control information with control center. Ready state means the node has finish the routing and configuration is ready to be a relay node and ready for the traffic. Traffic state means the node is transmitting some application traffic.

In one example, some experiment results of mesh network are shown. To verify the performance of the mesh network, a real proof of concept system is implemented.

Figure 50:
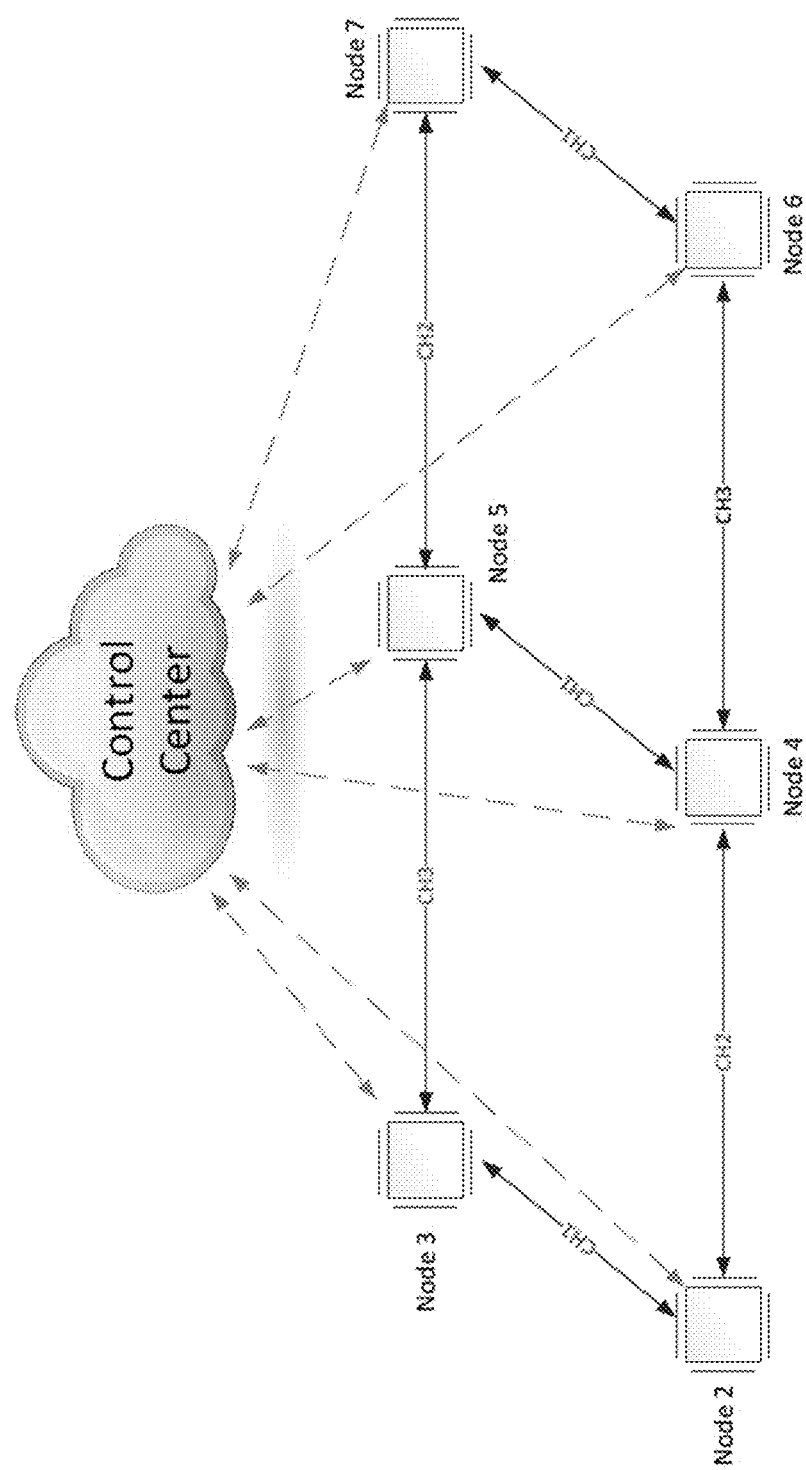
FIG. 50 illustrates a system architecture example of the mesh network according to embodiments of the present disclosure.

FIG. 50 illustrates a system architecture 5000 example of the mesh network according to embodiments of the present disclosure. The embodiment of the system architecture 5000 illustrated in FIG. 50 is for illustration only. FIG. 50 does not limit the scope of this disclosure.

From the TABLES 21, 22, and 23, it is shown that the mesh network could achieve around 1.7 Gbps for single hop transmission, 1.7 Gbps for multiple hop communication. In addition, a single node could achieve aggregated 5.4 Gbps throughput.

TABLE 21

Single link single hop throughput

| Link (Data Flow) | Num Hops | Throughput |
|---|---|---|
| Node 2 -> 3 | 1 | 1.7 Gbps |

TABLE 22

Single link multi-hop throughput

| Link (Data Flow) | Num Hops | Throughput |
|---|---|---|
| Node 7 -> 5 -> 4 -> 2 | 3 | 1.7 Gbps |

TABLE 23

Multiple link throughput

| Link (Data Flow) | Num Hops | Throughput | Aggregated Throughput | Aggregated Throughput |
|---|---|---|---|---|
| Node 2 -> 3 | 1 | 1.7 Gbps | Node 2 3.4 Gbps | |
| Node 2 -> 4 -> 6 | 2 | 1.7 Gbps | | Node 4 5.1 Gbps |
| Node 4 -> 5 -> 7 | 2 | 1.7 Gbps | | In: 1.7 Gbps Out: 3.4 Gbps |

Figure 51A:
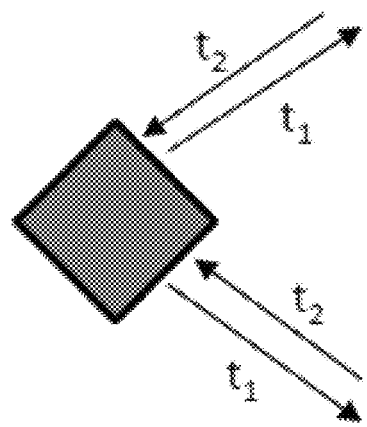
FIG. 51A illustrates a TDD solution for intra-node interferences according to embodiments of the present disclosure.

FIG. 51A illustrates a TDD solution 5100 for intra-node interferences according to embodiments of the present disclosure. The embodiment of the TDD solution 5100 illustrated in FIG. 51A is for illustration only. FIG. 51A does not limit the scope of this disclosure. As illustrated in FIG. 51A, incoming and outgoing links use different timeslots.

Figure 51B:
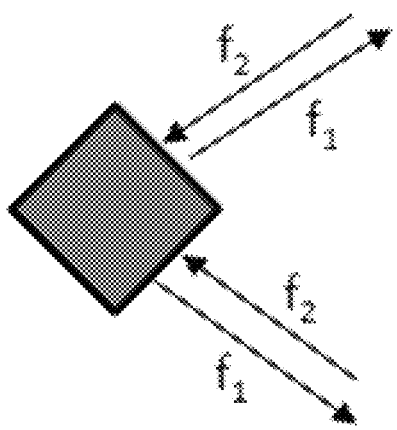
FIG. 51B illustrates an FDD solution for intra-node interferences according to embodiments of the present disclosure.

FIG. 51B illustrates an FDD solution 5120 for intra-node interferences according to embodiments of the present disclosure. The embodiment of the FDD solution 5120 illustrated in FIG. 51B is for illustration only. FIG. 51B does not limit the scope of this disclosure. As illustrated in FIG. 51B, incoming and outgoing links use different channels.

Figure 51C:
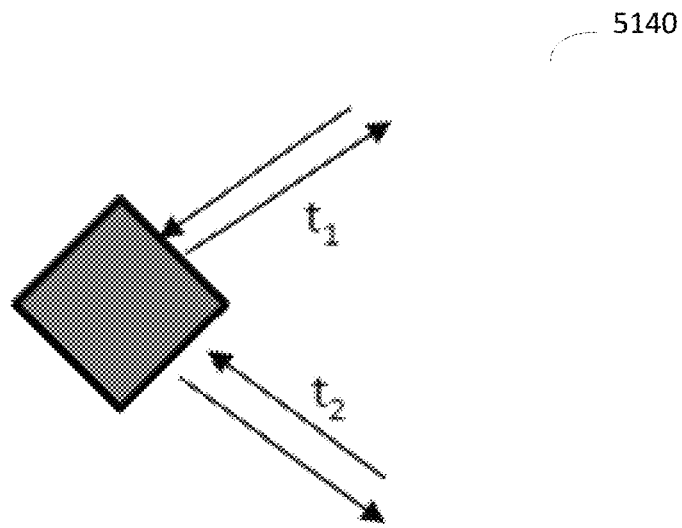
FIG. 51C illustrates a TDMA solution for intra-node interferences according to embodiments of the present disclosure.

FIG. 51C illustrates a TDMA solution 5140 for intra-node interferences according to embodiments of the present disclosure. The embodiment of the TDMA solution 5140 illustrated in FIG. 51C is for illustration only. FIG. 51C does not limit the scope of this disclosure. As illustrated in FIG. 51C, only single sector is active at each timeslot.

Figure 51D:
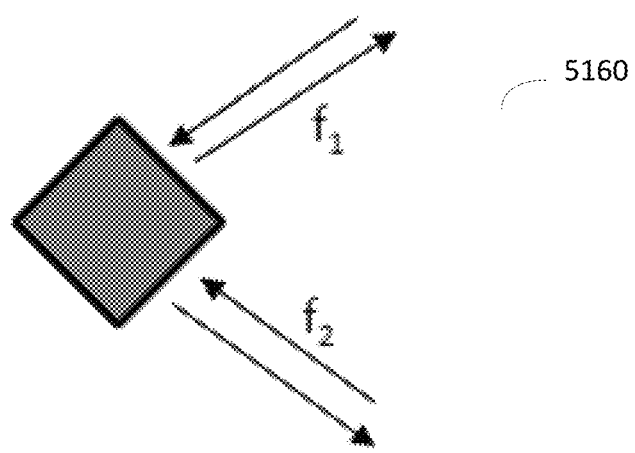
FIG. 51D illustrates an FDMA solution for intra-node interferences according to embodiments of the present disclosure.

FIG. 51D illustrates an FDMA solution 5160 for intra-node interferences according to embodiments of the present disclosure. The embodiment of the FDMA solution 5160 illustrated in FIG. 51D is for illustration only. FIG. 51D does not limit the scope of this disclosure. As illustrated in FIG. 51D, each sector uses a different channel. It may not have enough channels if one node many sectors.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A network entity for communicating with a mesh network, the network entity comprising:
a transceiver configured to:
receive, from a communication node, a registration request message for the mesh network; and
a processor operably connected to the transceiver, the processor configured to:
register the communication node as a member node of the mesh network based on the registration request message;
determine whether a number of the member nodes of the mesh network is greater than a predetermined number of registered nodes;
identify at least one of the number of the member nodes of the mesh network as an access point (AP), wherein other member nodes of the mesh network are identified as stations (STAs); and
generate medium access control (MAC) configuration request messages to configure the member nodes as identified,
wherein the transceiver is further configured to:
transmit, to the AP and the STAs in the mesh network, the MAC configuration request messages, routing table information, beamforming and channel information, measurement information, and routing repair information; and
receive, from the AP and the STAs in the mesh network, MAC configuration response messages, IP configuration response messages, measurement response messages, and routing repair response messages which corresponding to the MAC configuration request message, an IP configuration request message, a measurement request message, and a routing repair request message, respectively.

2. The network entity of claim 1, wherein:
the processor is further configured to:
receive 8-byte location information, 4-byte hardware configuration information including a number of baseband circuits, antenna configuration information, a number of antenna tiles, and a boresight direction for each antenna, one-byte communication node type information, a one-byte node identification (ID) value, and one-byte baseband circuit selection information from the registration request message, determine, at a beginning of a measurement period, each selected baseband circuit of a fiber node as an AP and basebands in other communication nodes as STAs, and determine, according to the one-byte node ID value, each selected baseband circuit of a non-fiber node as an AP and basebands in the other communication nodes as STAs; and the transceiver is further configured to:
transmit, to communication nodes in the mesh network, the MAC configuration request messages to configure the communication node in an AP mode or an STA mode, and receive, from the AP and the STAs in the mesh network, the MAC configuration response messages corresponding to the MAC configuration request messages for a MAC configuration in the mesh network.

3. The network entity of claim 1, wherein:
the processor is further configured to determine whether a number of received MAC configure response messages is greater than a predetermined number of thresholds; and the transceiver is further configured to:
transmit, to the AP and the STAs in the mesh network, MAC link request messages, and
receive, from the AP and the STAs in the mesh network, MAC link response messages corresponding to the MAC link request messages.

4. The network entity of claim 1, wherein:
the processor is further configured to determine whether a number of received MAC link response messages or a number of IP link configuration response messages is greater than a predefined number of thresholds; and the transceiver is further configured to:
transmit, to the AP and the STAs in the mesh network, measurement request messages, and
receive, from the AP and the STAs in the mesh network, measurement response messages corresponding to the measurement request messages.

5. The network entity of claim 1, wherein the processor is further configured to:
determine channel information based on received signal strength indicator (RSSI) measurement and selected baseband circuit information based on a measurement response message received from each communication node;

determine a connection graph (G) of the mesh network by constructing a vertex based on each baseband circuit, and by constructing an edge between two vertexes if the RSSI measurement is larger than a threshold;

determine whether a number of received measurement response messages is greater than a predetermined number of measurement response messages; and calculate a topology, channel allocation information, and routing information of the mesh network for a resource allocation based on the number of received measurement response messages.

6. The network entity of claim 5, wherein:
the processor is further configured to:
construct a conflict graph (CG) based on the RSSI measurement and a network topology for the mesh network, determine channel allocation for the mesh network based on a graph coloring algorithm on top of the constructed CG for the mesh network, and determine a routing table and a backup routing table for the mesh network based on Dijkstra algorithm on the network topology and connection graph (G); and the transceiver is further configured to:
transmit, to each communication node, the routing table, the backup routing table, and channel allocation information through IP configuration request messages including a four-byte IP address and one-byte of next hop gateway information, and one-byte channel allocation information for each baseband circuit, and receive, from each communication node, the IP configuration response messages.

7. The network entity of claim 1, wherein:
the processor is further configured to:
determine whether a number of the received IP configuration response messages is greater than a predetermined number of IP configuration response messages, and generate IP link detection request messages based on the number of the received IP configuration response messages; and the transceiver is further configured to:
transmit, to the AP and the STAs in the mesh network, the IP link detection request messages,
receive, from the AP and the STAs in the mesh network, IP link detection response messages corresponding to the IP link detection request messages, and
receive, from problematic nodes in the mesh network, IP link report messages when IP links are unstable.

8. The network entity of claim 1, wherein the processor is further configured to:
determine whether a number of received IP link detection response messages is greater than a predetermined number of IP link detection response messages;
update a network topology based on IP link report messages;
remove an edge between a source node and a destination node from a connection graph (G); and
perform a communication with the mesh network including the AP and the STAs when the number of the received IP link detection response message is greater than the predetermined number of IP link detection response messages.

9. A method of a network entity for communicating with a mesh network, the method comprising:
receiving, from a communication node, a registration request message for the mesh network;
registering the communication node as a member node of the mesh network based on the registration request message;
determining whether a number of the member nodes of the mesh network is greater than a predetermined number of registered nodes;
identifying at least one of the number of the member nodes of the mesh network as an access point (AP), wherein other member nodes of the mesh network are identified as stations (STAs);
generating medium access control (MAC) configuration request messages to configure the member nodes as identified;
transmitting, to the AP and the STAs in the mesh network, the MAC configuration request messages, routing table information, beamforming and channel information, measurement information, and routing repair information; and receiving, from the AP and the STAs in the mesh network, MAC configuration response messages, IP configuration response messages, measurement response messages, and routing repair response messages which corresponding to the MAC configuration request message, an IP configuration request message, a measurement request message, and a routing repair request message, respectively.

10. The method of claim 9, further comprising:
receiving 8-byte location information, 4-byte hardware configuration information including a number of baseband circuits, antenna configuration information, a number of antenna tiles, and a boresight direction for each antenna, one-byte communication node type information, a one-byte node identification (ID) value, and one-byte baseband circuit selection information from the registration request message;
determining, at a beginning of a measurement period, each selected baseband circuit of a fiber node as an AP and basebands in other communication nodes as STAs;
determining, according to the one-byte node ID value, each selected baseband circuit of a non-fiber node as an AP and basebands in the other communication nodes as STAs;
transmitting, to communication nodes in the mesh network, the MAC configuration request messages to configure the communication node an AP mode or an STA mode; and
receiving, from the AP and the STAs in the mesh network, the MAC configuration response messages corresponding to the MAC configuration request messages for a MAC configuration in the mesh network.

11. The method of claim 9, further comprising:
determining whether a number of received MAC configure response messages is greater than a predetermined number of thresholds;
transmitting, to the AP and the STAs in the mesh network, MAC link request messages; and
receiving, from the AP and the STAs in the mesh network, MAC link response messages corresponding to the MAC link request messages.

12. The method of claim 9, further comprising:
determining whether a number of received MAC link response messages or a number of IP link configuration response messages is greater than a predefined number of thresholds;
transmit, to the AP and the STAs in the mesh network, measurement request messages; and
receiving, from the AP and the STAs in the mesh network, measurement response messages corresponding to the measurement request messages.

13. The method of claim 9, further comprising:
determining channel information based on received signal strength indicator (RSSI) measurement and selected baseband circuit information based on a measurement response message received from each communication node;
determining a connection graph (G) of the mesh network by constructing a vertex based on each baseband circuit, and by constructing an edge between two vertexes if the RSSI measurement is larger than a threshold;
determining whether a number of received measurement response messages is greater than a predetermined number of measurement response messages; and
calculating a topology, channel allocation information, and routing information of the mesh network for a resource allocation based on the number of received measurement response messages.

14. The method of claim 13, further comprising:
constructing a conflict graph (CG) based on the RSSI measurement and a network topology for the mesh network;
determining channel allocation for the mesh network based on a graph coloring algorithm on top of the constructed CG for the mesh network;
determining a routing table and a backup routing table for the mesh network based on Dijkstra algorithm on the network topology and connection graph (G);
transmitting, to each communication node, the routing table, the backup routing table, and channel allocation information through IP configuration request messages including a four-byte IP address and one-byte of next hop gateway information, and one-byte channel allocation information for each baseband circuit; and
receive, from each communication node, the IP configuration response messages.

15. The method of claim 9, further comprising:
determining whether a number of the received IP configuration response messages is greater than a predetermined number of IP configuration response messages;
generating IP link detection request messages based on the number of the received IP configuration response messages;
transmitting, to the AP and the STAs in the mesh network, the IP link detection request messages,
receiving, from the AP and the STAs in the mesh network, IP link detection response messages corresponding to the IP link detection request messages; and
receiving, from problematic nodes in the mesh network, IP link report messages when IP links are unstable.

16. The method of claim 9, further comprising:
determining whether a number of received IP link detection response messages is greater than a predetermined number of IP link detection response messages;
updating a network topology based on IP link report messages;
removing an edge between a source node and a destination node from a connection graph (G); and
performing a communication with the mesh network including the AP and the STAs when the number of the received IP link detection response message is greater than the predetermined number of IP link detection response messages.

17. A communication node for communicating with a mesh network, the communication node comprising:
a processor; and
a transceiver operably connected to the processor, the transceiver configured to transmit, to a network entity, a registration request message for the mesh network, wherein:
the communication node is registered as a member node of the mesh network based on the registration request message;
whether a number of the member nodes of the mesh network is greater than a predetermined number of registered nodes is determined;
at least one of the number of the member nodes of the mesh network is identified as an access point (AP), other member nodes of the mesh network being identified as stations (STAs); and medium access control (MAC) configuration request messages is generated to configure the member nodes as identified.

18. The communication node of claim 17, wherein:
the transceiver is further configured to:
  receive, from the network entity in the mesh network, the MAC configuration request messages to configure the communication node as an AP mode or an STA mode, and
  transmit 8-byte location information, 4-byte hardware configuration information including a number of baseband circuits, antenna configuration information, a number of antenna tiles, and a boresight direction for each antenna, one-byte communication node type information, a one-byte node identification (ID) value, and one-byte baseband circuit selection information to the network entity; and
the processor is further configured to:
  configure each selected baseband circuit of a fiber node as an AP and basebands in other communication nodes as STAs is determined at a beginning of a measurement period; and
  configure each selected baseband circuit of a non-fiber node as an AP and basebands in the other communication nodes as STAs is determined according to the one-byte node ID value.

19. The communication node of claim 17, wherein:
the processor is further configured to detect radio link quality after receiving an IP link detection request; and
the transceiver is further configured to transmit, to the network entity, a radio link quality response message including a source node IP address of a failure link, a next hop address of the failure link, and a status of the message.

20. The communication node of claim 19, wherein:
the transceiver is further configured to:
  receive, from the network entity, routing table information, backup routing table information, and channel allocation information through IP configuration request messages including a four-byte IP address and one-byte of next hop gateway information, and one-byte channel allocation information for each baseband circuit, and
  transmit, to the network entity, node measurement response messages including a node ID, a measurement request ID, a measurement request capability (type), measurement data for each base band circuit, the measurement data for each base band circuit comprising a number of measurements on each base band circuit, measurement results, measured AP information, channel information, and beam information; and
the processor is further configured to recalculate the routing table after receiving the failure link from an IP link report message.

* * * * *